US012372982B2

(12) United States Patent
Whitman et al.

(10) Patent No.: US 12,372,982 B2
(45) Date of Patent: *Jul. 29, 2025

(54) CONSTRAINED MOBILITY MAPPING

(71) Applicant: Boston Dynamics, Inc., Waltham, MA (US)

(72) Inventors: Eric Whitman, Waltham, MA (US); Gina Christine Fay, Waltham, MA (US); Alex Khripin, Waltham, MA (US); Max Bajracharya, Waltham, MA (US); Matthew Malchano, Waltham, MA (US); Adam Komoroski, Waltham, MA (US); Christopher Stathis, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/811,840

(22) Filed: Jul. 11, 2022

(65) Prior Publication Data
US 2022/0374024 A1 Nov. 24, 2022

Related U.S. Application Data

(63) Continuation of application No. 16/573,284, filed on Sep. 17, 2019, now Pat. No. 11,416,003.
(Continued)

(51) Int. Cl.
G05D 1/606 (2024.01)
B25J 9/16 (2006.01)
(Continued)

(52) U.S. Cl.
CPC ............ G05D 1/606 (2024.01); B25J 9/1666 (2013.01); B25J 9/1697 (2013.01); B25J 13/089 (2013.01);
(Continued)

(58) Field of Classification Search
CPC .. G05D 1/0251; G05D 1/0214; G05D 1/0219; G05D 1/0238; G05D 1/0253;
(Continued)

(56) References Cited

U.S. PATENT DOCUMENTS 5,111,401 A 5/1992 Everett et al.
5,307,271 A 4/1994 Everett et al.
(Continued)

FOREIGN PATENT DOCUMENTS

CA 2928262 A1 7/2012
CN 114499733 A 5/2011
(Continued)

OTHER PUBLICATIONS

NPL, Lourenco et al., "A volumetric representation for obstacle detection in vegetated terrain", Date of Conference: Dec. 2014, Date uploaded to IEEE: Apr. 2015, Retrieved from web Jun. 2024, URL: <https://ieeexplore.ieee.org/document/7090344?source=IQplus> (Year: 2015).*
(Continued)

Primary Examiner — Jason Holloway
Assistant Examiner — Benjamin J Brosh
(74) Attorney, Agent, or Firm — Knobbe, Martens, Olson & Bear, LLP

(57) ABSTRACT

A method of constrained mobility mapping includes receiving from at least one sensor of a robot at least one original set of sensor data and a current set of sensor data. Here, each of the at least one original set of sensor data and the current set of sensor data corresponds to an environment about the robot. The method further includes generating a voxel map including a plurality of voxels based on the at least one original set of sensor data. The plurality of voxels includes at least one ground voxel and at least one obstacle voxel. The method also includes generating a spherical depth map
(Continued)

based on the current set of sensor data and determining that a change has occurred to an obstacle represented by the voxel map based on a comparison between the voxel map and the spherical depth map. The method additional includes updating the voxel map to reflect the change to the obstacle.

22 Claims, 32 Drawing Sheets

Related U.S. Application Data

(60) Provisional application No. 62/883,310, filed on Aug. 6, 2019.

(51) Int. Cl.
| | | |
|---|---|---|
| *B25J 13/08* | (2006.01) | |
| *B62D 57/032* | (2006.01) | |
| *G05D 1/243* | (2024.01) | |
| *G05D 1/622* | (2024.01) | |
| *G05D 111/67* | (2024.01) | |

(52) U.S. Cl.
CPC ......... *B62D 57/032* (2013.01); *G05D 1/2435* (2024.01); *G05D 1/622* (2024.01); *G05D 2111/67* (2024.01)

(58) Field of Classification Search
CPC .... G05D 1/2464; G05D 1/2465; G05D 1/622; G05D 1/633; B25J 9/1666; B25J 9/1697; B25J 13/089; B25J 9/1676; B62D 57/032; G06T 15/08; G06T 15/405
See application file for complete search history.

(56) References Cited

U.S. PATENT DOCUMENTS

| | | | |
|---|---|---|---|
| 5,378,969 | A | 1/1995 | Haikawa |
| 7,211,980 | B1 | 5/2007 | Bruemmer et al. |
| 7,769,491 | B2 | 8/2010 | Fukuchi et al. |
| 7,865,267 | B2 | 1/2011 | Sabe et al. |
| 7,912,583 | B2 | 3/2011 | Gutmann et al. |
| 8,270,730 | B2 | 9/2012 | Watson |
| 8,346,391 | B1 | 1/2013 | Anhalt et al. |
| 8,548,734 | B2 | 10/2013 | Barbeau et al. |
| 8,849,494 | B1 | 9/2014 | Herbach et al. |
| 8,930,058 | B1 | 1/2015 | Quist et al. |
| 9,352,470 | B1 | 5/2016 | da Silva et al. |
| 9,395,726 | B1 | 7/2016 | Rizzi et al. |
| 9,561,592 | B1 | 2/2017 | Silva et al. |
| 9,586,316 | B1 | 3/2017 | Swilling |
| 9,594,377 | B1 | 3/2017 | Perkins et al. |
| 9,717,387 | B1 | 8/2017 | Szatmary et al. |
| 9,789,607 | B1 | 10/2017 | Whitman |
| 9,868,210 | B1 | 1/2018 | Whitman |
| 9,908,240 | B1 | 3/2018 | da Silva et al. |
| 9,933,781 | B1 | 4/2018 | Bando et al. |
| 9,969,086 | B1 | 5/2018 | Whitman |
| 9,975,245 | B1 | 5/2018 | Whitman |
| 10,017,218 | B1 | 7/2018 | Swilling et al. |
| 10,059,392 | B1 | 8/2018 | Fay et al. |
| 10,081,098 | B1 | 9/2018 | Nelson et al. |
| 10,081,104 | B1 | 9/2018 | Swilling |
| 10,144,465 | B1 | 12/2018 | Swilling et al. |
| 10,196,104 | B1 | 2/2019 | Kagami et al. |
| 10,226,870 | B1 | 3/2019 | Silva et al. |
| 10,266,220 | B2 | 4/2019 | Swilling et al. |
| 10,399,621 | B2 | 9/2019 | Swilling et al. |
| 11,059,532 | B1 | 7/2021 | Fay et al. |
| 11,073,842 | B1 | 7/2021 | Whitman et al. |
| 11,123,869 | B2 | 9/2021 | Whitman et al. |
| 11,175,664 | B1 | 11/2021 | Boyraz |
| 11,268,816 | B2 | 3/2022 | Fay et al. |
| 11,287,826 | B2 | 3/2022 | Whitman et al. |
| 11,319,005 | B2 | 5/2022 | Swilling et al. |
| 11,383,381 | B2 | 7/2022 | Whitman et al. |
| 11,416,003 | B2 * | 8/2022 | Whitman ............. G05D 1/2465 |
| 11,447,195 | B2 | 9/2022 | Whitman |
| 11,465,281 | B2 | 10/2022 | Whitman et al. |
| 11,480,974 | B2 | 10/2022 | Lee et al. |
| 11,518,029 | B2 | 12/2022 | Cantor et al. |
| 11,548,151 | B2 | 1/2023 | Whitman et al. |
| 11,599,128 | B2 | 3/2023 | Whitman et al. |
| 11,660,752 | B2 | 5/2023 | Whitman et al. |
| 11,691,292 | B2 | 7/2023 | Klingensmith et al. |
| 11,712,802 | B2 | 8/2023 | Chestnutt et al. |
| 11,774,237 | B2 | 10/2023 | Fay et al. |
| 11,851,120 | B2 | 12/2023 | Fay et al. |
| 11,927,961 | B2 | 3/2024 | Fay et al. |
| 11,999,423 | B2 | 6/2024 | Whitman |
| 12,038,752 | B1 | 7/2024 | Blanton et al. |
| 12,235,652 | B2 | 2/2025 | Whitman et al. |
| 2005/0131581 | A1 | 6/2005 | Sabe et al. |
| 2006/0025888 | A1 | 2/2006 | Gutmann et al. |
| 2006/0167621 | A1 | 7/2006 | Dale |
| 2007/0282564 | A1 | 12/2007 | Sprague et al. |
| 2008/0009966 | A1 | 1/2008 | Bruemmer et al. |
| 2008/0027590 | A1 | 1/2008 | Phillips et al. |
| 2008/0086241 | A1 | 4/2008 | Phillips et al. |
| 2009/0099689 | A1 | 4/2009 | Takenaka et al. |
| 2009/0125225 | A1 | 5/2009 | Hussain et al. |
| 2010/0066587 | A1 | 3/2010 | Yamauchi et al. |
| 2010/0172571 | A1 | 7/2010 | Yoon et al. |
| 2011/0172850 | A1 | 7/2011 | Paz-Meidan et al. |
| 2012/0089295 | A1 | 4/2012 | Ahn et al. |
| 2012/0182392 | A1 | 7/2012 | Kearns et al. |
| 2013/0141247 | A1 | 6/2013 | Ricci |
| 2013/0231779 | A1 | 9/2013 | Purkayastha et al. |
| 2013/0325244 | A1 | 12/2013 | Wang et al. |
| 2014/0188325 | A1 | 7/2014 | Johnson et al. |
| 2015/0158182 | A1 | 6/2015 | Farlow et al. |
| 2015/0253775 | A1 | 9/2015 | Jacobus et al. |
| 2015/0355638 | A1 | 12/2015 | Field et al. |
| 2015/0362921 | A1 | 12/2015 | Hanaoka et al. |
| 2017/0131102 | A1 | 5/2017 | Wirbel et al. |
| 2017/0168488 | A1 * | 6/2017 | Wierzynski .......... G05D 1/0212 |
| 2017/0176990 | A1 | 6/2017 | Keller et al. |
| 2017/0197311 | A1 | 7/2017 | Garcia et al. |
| 2017/0203446 | A1 | 7/2017 | Dooley et al. |
| 2018/0173242 | A1 | 6/2018 | Lalonde et al. |
| 2018/0218513 | A1 * | 8/2018 | Ho .......................... G06T 7/579 |
| 2018/0364717 | A1 * | 12/2018 | Douillard .............. G01S 17/931 |
| 2019/0079523 | A1 | 3/2019 | Zhu et al. |
| 2019/0080463 | A1 | 3/2019 | Davison et al. |
| 2019/0100306 | A1 * | 4/2019 | Pohl ....................... B64D 47/08 |
| 2019/0138029 | A1 * | 5/2019 | Ryll ............................ G06T 7/73 |
| 2019/0171911 | A1 | 6/2019 | Greenberg |
| 2019/0187703 | A1 | 6/2019 | Millard et al. |
| 2019/0213896 | A1 | 7/2019 | Gohi et al. |
| 2019/0258737 | A1 * | 8/2019 | Wang .................. G06F 16/2379 |
| 2019/0318277 | A1 | 10/2019 | Goldman et al. |
| 2020/0117198 | A1 | 4/2020 | Whitman et al. |
| 2020/0117214 | A1 | 4/2020 | Jonak et al. |
| 2020/0192388 | A1 | 6/2020 | Zhang et al. |
| 2020/0249033 | A1 | 8/2020 | Gelhar |
| 2020/0333790 | A1 | 10/2020 | Kobayashi et al. |
| 2020/0409382 | A1 | 12/2020 | Herman et al. |
| 2021/0041243 | A1 | 2/2021 | Fay et al. |
| 2021/0041887 | A1 | 2/2021 | Whitman et al. |
| 2021/0141389 | A1 | 5/2021 | Jonak et al. |
| 2021/0147017 | A1 | 5/2021 | Swilling et al. |
| 2021/0158544 | A1 * | 5/2021 | Steinmeyer ........... G01S 13/867 |
| 2021/0331754 | A1 | 10/2021 | Whitman |
| 2022/0024034 | A1 | 1/2022 | Wei et al. |
| 2022/0083062 | A1 | 3/2022 | Jaquez et al. |
| 2022/0137637 | A1 | 5/2022 | Baldini et al. |
| 2022/0155078 | A1 | 5/2022 | Fay et al. |
| 2022/0179420 | A1 | 6/2022 | Whitman et al. |
| 2022/0193898 | A1 | 6/2022 | Aghasadeghi et al. |
| 2022/0194245 | A1 | 6/2022 | Gonano et al. |
| 2022/0276654 | A1 | 9/2022 | Lee et al. |
| 2022/0324104 | A1 | 10/2022 | Whitman et al. |
| 2022/0342421 | A1 | 10/2022 | Kearns et al. |

(56) References Cited

U.S. PATENT DOCUMENTS

| | | |
|---|---|---|
| 2022/0388170 A1 | 12/2022 | Merewether |
| 2022/0390950 A1 | 12/2022 | Yamauchi |
| 2022/0390952 A1 | 12/2022 | Yu et al. |
| 2022/0390954 A1 | 12/2022 | Klingensmith |
| 2022/0410390 A1 | 12/2022 | Whitman et al. |
| 2023/0008677 A1 | 1/2023 | Whitman et al. |
| 2023/0143315 A1 | 5/2023 | Whitman et al. |
| 2023/0234229 A1 | 7/2023 | Fay et al. |
| 2023/0286167 A1 | 9/2023 | Klingensmith et al. |
| 2023/0321830 A1 | 10/2023 | Fay et al. |
| 2023/0400307 A1 | 12/2023 | Fay et al. |
| 2023/0415343 A1 | 12/2023 | Whitman |
| 2024/0075998 A1 | 3/2024 | Fay et al. |
| 2024/0174310 A1 | 5/2024 | Whitman |

FOREIGN PATENT DOCUMENTS

| | | |
|---|---|---|
| CN | 103413313 A | 11/2013 |
| CN | 203371557 | 1/2014 |
| CN | 106662646 A | 5/2017 |
| CN | 107169986 A | 9/2017 |
| CN | 108052103 | 5/2018 |
| CN | 111604916 | 9/2020 |
| CN | 211956515 | 11/2020 |
| CN | 112034861 | 12/2020 |
| CN | 113168184 | 7/2021 |
| CN | 113633219 | 11/2021 |
| CN | 114503043 A | 5/2022 |
| CN | 114234967 B | 10/2023 |
| JP | H 02127180 A | 5/1990 |
| JP | H09134217 | 11/2003 |
| JP | 2005088189 | 4/2005 |
| JP | 2006011880 | 1/2006 |
| JP | 2006239844 | 9/2006 |
| JP | 2007041656 A | 2/2007 |
| JP | 2008072963 | 4/2008 |
| JP | 2009223628 | 10/2009 |
| JP | 2009271513 A | 11/2009 |
| JP | 2010253585 | 11/2010 |
| JP | 2013250795 | 12/2013 |
| JP | 2014123200 | 7/2014 |
| JP | 2014151370 | 8/2014 |
| JP | 2016081404 | 5/2016 |
| JP | 2016103158 | 6/2016 |
| JP | 2022504039 | 1/2022 |
| JP | 2022543997 A | 10/2022 |
| JP | 7219812 | 2/2023 |
| KR | 10-1121763 | 3/2012 |
| KR | 20120019893 A | 3/2012 |
| KR | 20130002834 A | 1/2013 |
| KR | 20180004151 A | 1/2018 |
| KR | 20220083666 A | 6/2022 |
| KR | 10-2023-0019497 | 2/2023 |
| KR | 10-2533690 | 5/2023 |
| KR | 102492242 | 6/2023 |
| WO | WO 2007/051972 | 5/2007 |
| WO | WO 2017/090108 | 6/2017 |
| WO | WO 2018231616 A1 | 12/2018 |
| WO | WO 2020/076418 | 4/2020 |
| WO | WO 2021025708 A1 | 2/2021 |
| WO | WO 2022/256812 A1 | 12/2022 |

OTHER PUBLICATIONS

International Preliminary Report on Patentability (Chapter I of the Patent Cooperation Treaty), PCT/US2019/051511, Feb. 8, 2022, 11 pages.

International Search Report and Written Opinion, PCT/US/2019/051511, Jul. 1, 2020, 15 pages.

Invitation to Pay Fees Notification with Annex Communication Relating to the Results of the Partial International Search, PCT/US2019/051511, May 6, 2020, 14 pages.

Japanese Office Action received in Japanese Application No. JP 2022-502057, dated Feb. 27, 2023, 8 pages.

Abraham et al., "A Topological Approach of Path Planning for Autonomous Robot Navigation in Dynamic Environments", The 2009 IEEE/RSJ International Conference on Intelligent Robots and Systems, Oct. 11-15, 2009.

Alkautsar, "Topological Path Planning and Metric Path Planning", https://medium.com/@arifmaulanaa/topological-path-planning-and-metric-path-planning-5c0fa7f107f2, downloaded Feb. 13, 2023, 3 pages.

Bajracharya et al., "High fidelity day/night stereo mapping with vegetation and negative obstacle detection for vision-in-the-loop walking," 2013 IEEE/RSJ International Conference on Intelligent Robots and Systems, Nov. 3, 2013; pp. 3663-3670.

Boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.

Buchegger et al., "An Autonomous Vehicle for Parcel Delivery in Urban Areas" International Conference on Intelligent Transportation Systems (ITSC) Nov. 2018.

Cao, "Topological Path Planning for Crowd Navigation", https://www.ri.cmu.edu/app/uploads/2019/05/thesis.pdf, May 2019, 24 pages.

Collins et al. "Efficient Planning for High-Speed MAV Flight in Unknown Environments Using Online Sparse Topological Graphs" IEEE International Conference on Robotics and Automation (ICRA) Aug. 2020.

Fermin-Leon et al., "TIGRE: Topological Graph based Robotic Exploration", 2017 European Conference on Mobile Robots (ECMR), Paris, France, 2017, pp. 1-6.

Github.com, "cartographer-project/cartographer", https://github.com/cartographer-project/cartographer, downloaded Feb. 1, 2023, 4 pages.

Hines et al., "Virtual surfaces and attitude aware planning and behaviours for negative navigation," IEEE Robotics and Automation Letters, Apr. 2021, vol. 6, No. 2, pp. 4048-4055.

Karunasekera et al., "Stereo vision based negative obstacle detection," 2017 13th IEEE International Conference on Control & Automation (ICCA), Jul. 3, 2017; pp. 834-838.

Kuipers et al. "A Robot Exploration and Mapping Strategy Based on a Semantic Hierarchy of Spatial Representations" Journal of Robotics & Autonomous Systems vol. 8, 1991, pp. 47-63.

Larson et al., "Lidar based off-road negative obstacle detection and analysis," IEEE 14th Conference on Intelligent Transportation Systems, Washington, D.C., Oct. 5-7, 2011, 8 pages.

McCammon et al., "Topological path planning for autonomous information gathering", Auton Robot 45, 821-842 (2021). https://doi.org/10.1007/s10514-021-10012-x.

Mendes et al., "ICP-based pose-graph Slam", International Symposium on Safety, Security and Rescue Robotics (SSRR), Oct. 2016, Lausanne, Switzerland. pp. 195-200, ff10.1109/SSRR.2016.7784298, hal-01522248.

Poncela et al., "Efficient integration of metric and topological maps for directed exploration of unknown environments", Robotics and Autonomous Systems, Elsevier BV, Amsterdam, NL, vol. 41, No. 1, Oct. 31, 2002 (Oct. 31, 2002), p. 21-39.

Tang, "Introduction to Robotics", The Wayback Machine, https://web.archive.org/web/20160520085742/http://www.cpp.edu:80/~ftang/courses/CS521/, downloaded Feb. 3, 2023, 58 pages.

Thrun et al, "The GraphSLAM Algorithm with Applications to Large-Scale Mapping of Urban Structures", The International Journal of Robotics Research, vol. 25, No. 5-6, May-Jun. 2006, pp. 403-429.

Video game, "Unreal Engine 5", https://docs.unrealengine.com/5.0/en-US/basic-navigation-in-unreal-engine/, downloaded Feb. 1, 2023, 15 pages.

Whelan et al, "ElasticFusion: Dense Slam Without a Pose Graph", http://www.roboticsproceedings.org/rss11/p01.pdf, downloaded Feb. 1, 2023, 9 pages.

Wikipedia.org, "Buffer (GIS)", http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.

Wikipedia.org, "Probabilistic roadmap", https://en.wikipedia.org/wiki/Probabilistic_roadmap, downloaded Feb. 1, 2023, 2 pages.

(56) References Cited

OTHER PUBLICATIONS

Wikipedia.org, "Rapidly-exploring random tree", https://en.wikipedia.org/wiki/Rapidly-exploring_random_tree, downloaded Feb. 1, 2023, 7 pages.
Wikipedia.org, "Visibility graph", https://en.wikipedia.org/wiki/Visibility_graph, downloaded Feb. 1, 2023, 3 pages.
Yamauchi et al. "Place Recognition in Dynamic Environments" Journal of Robotic Systems, Special Issue on Mobile Robots, vol. 14, No. 2, Feb. 1997, pp. 107-120.
Yamauchi et al. "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, pp. 496-505.
International Search Report and Written Opinion, PCT/US2019/046646, Oct. 31, 2019, 9 pages.
International Search Report and Written Opinion, PCT/US2022/072704, Sep. 28, 2022, 17 pages.
"AlphaDog Proto," video screen shots taken from https://www.youtube.com/watch?v=SSbZrQp-HOk, Sep. 29, 2011, downloaded Aug. 14, 2023, 24 pages.
"Atlas Update," video screen shots taken from https://www.youtube.com/watch?v=SD6Okylclb8, Oct. 3, 2013, downloaded Aug. 14, 2023, 18 pages.
"BigDog Overview (Updated Mar. 2010)," video screen shots taken from https://www.youtube.com/watch?v=cNZPRsrwumQ, Apr. 22, 2010, downloaded Aug. 14, 2023, 25 pages.
"BigDog Reflexes," video screen shots taken from https://www.youtube.com/watch?v=3gi6Ohnp9x8, Jan. 27, 2009, downloaded Aug. 14, 2023, 15 pages.
"Boston Dynamics BigDog Robot," video screen shots taken from https://www.youtube.com/watch?v=b2bExqhhWRI, Jul. 17, 2007, downloaded Oct. 5, 2023, 13 pages.
Boston Dynamics, "LS3—Legged Squad Support System," video screen shots taken from https://www.youtube.com/watch?v=R7ezXBEBE6U&t=1s, Sep. 10, 2012, downloaded Feb. 2, 2024, 5 pages.
Boston Dynamics, "Introducing Spot Classic (previously Spot)," video screen shots taken from https://www.youtube.com/watch?v=M8YjvHYbZ9w, Feb. 9, 2015, downloaded Aug. 10, 2023, 14 pages.
Boston Dynamics, "Introducing Spot (Previously SpotMini)," video screen shots taken from https://www.youtube.com/watch?v=tf7IEVTDjng, Jun. 23, 2016, downloaded Jul. 31, 2023, 10 pages.
Boston Dynamics, "The New Spot," video screen shots taken from https://www.youtube.com/watch?v=kgaO45SyaO4, Nov. 13, 2017, downloaded Jul. 31, 2023, 3 pages.
Boston Dynamics, "Testing Robustness," video screen shots taken from https://www.youtube.com/watch?v=aFuA50H9uek, Feb. 20, 2018, downloaded Jul. 31, 2023, 3 pages.
Boston Dynamics, "Spot Autonomous Navigation," video screen shots taken from https://www.youtube.com/watch?v=Ve9kWX_KXus, May 10, 2018, downloaded Sep. 5, 2023, 11 pages.
Boston Dynamics, "SpotMini", The Wayback Machine, http://web.archive.org/web/20171118145237/https://bostondynamics.com/spot-mini, downloaded Jul. 31, 2023, 3 pages.
"Petman Prototype," video screen shots taken from https://www.youtube.com/watch?v=67CUudkjEG4, Oct. 26, 2009, downloaded Aug. 14, 2023, 10 pages.
"Petman," video screen shots taken from https://www.youtube.com/watch?v=mclbVTIYG8E, Oct. 30, 2011, downloaded Aug. 14, 2023, 12 pages.
Redacted Presentation from IAP Event at Massachusetts Institute of Technology, Jan. 31, 2018, 10 pages.
Stanford, "BigDog, the Rough-Terrain Robot," video screen shots taken from https://www.youtube.com/watch?v=-Bi-tPO0OPs, Aug. 27, 2010, downloaded Apr. 26, 2024, 12 pages.
Video embedded in PowerPoint Presentation for IAP Event at Massachusetts Institute of Technology on Jan. 31, 2018, video screen shots taken at 1 second intervals, 47 pages.
Chinese Office Action received in Chinese Application No. 2019800100707.0 dated Apr. 26, 2024 in 41 pages.
Chinese Office Action received in Chinese Application No. 2019800100707.0 dated Sep. 14, 2024 in 11 pages.
Korean Office Action received in Korean Application No. 10-2022-7006639, dated Nov. 19, 2024, 5 pages.
International Partial Search Report mailed Feb. 5, 2025, for International Application No. PCT/US2024/059844, 80 pages.

\* cited by examiner

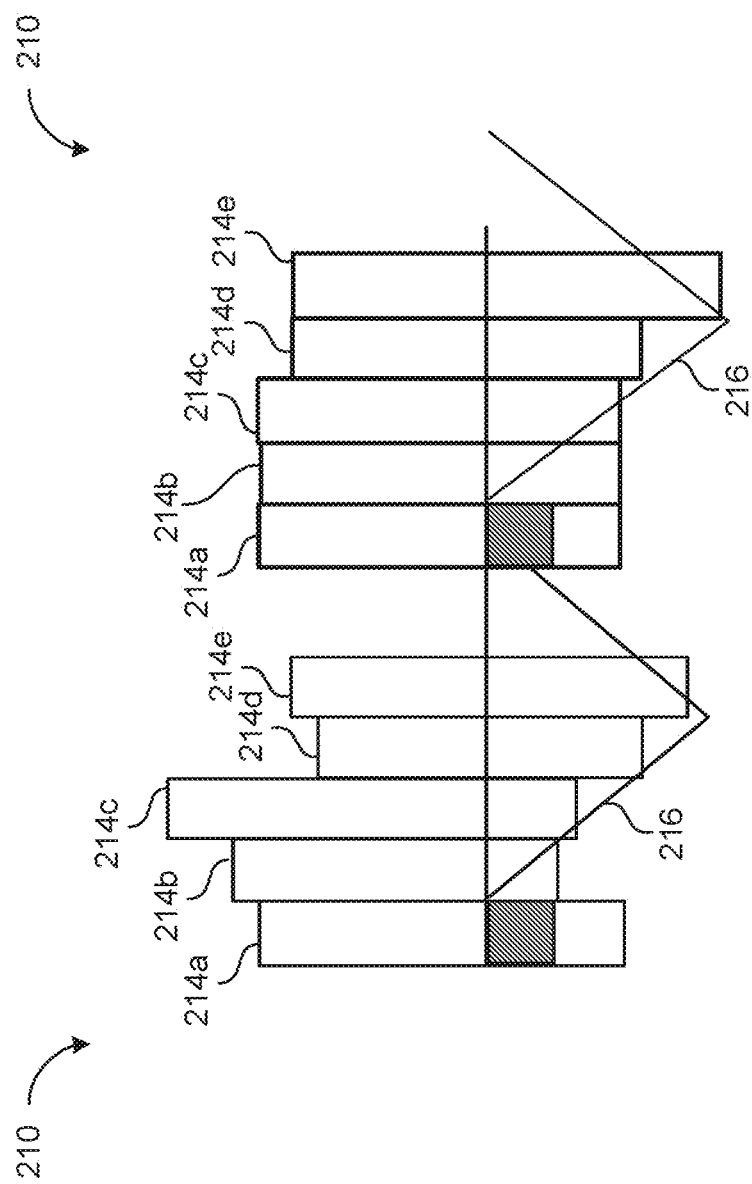

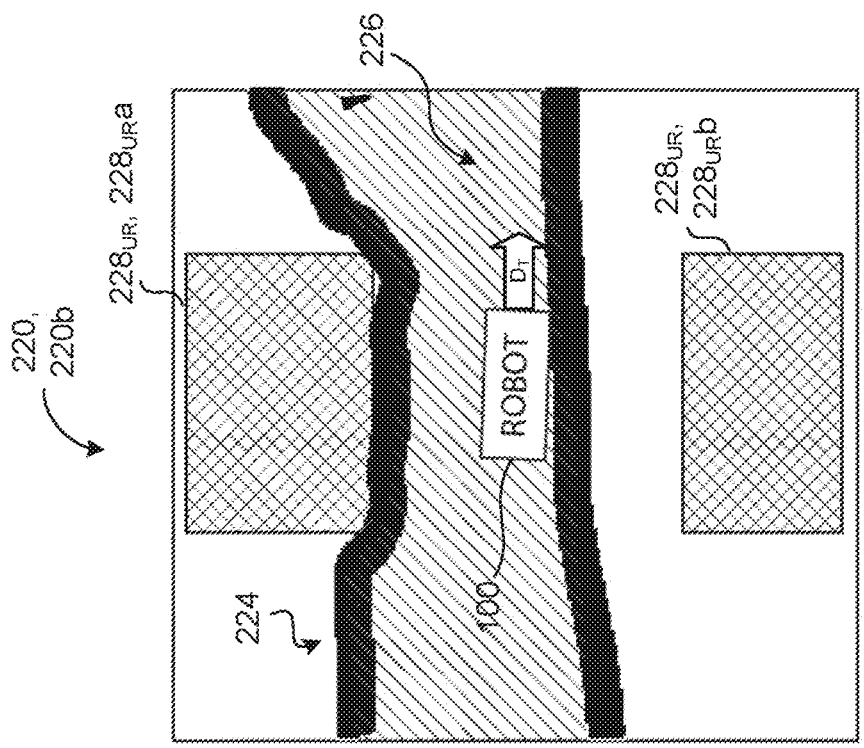
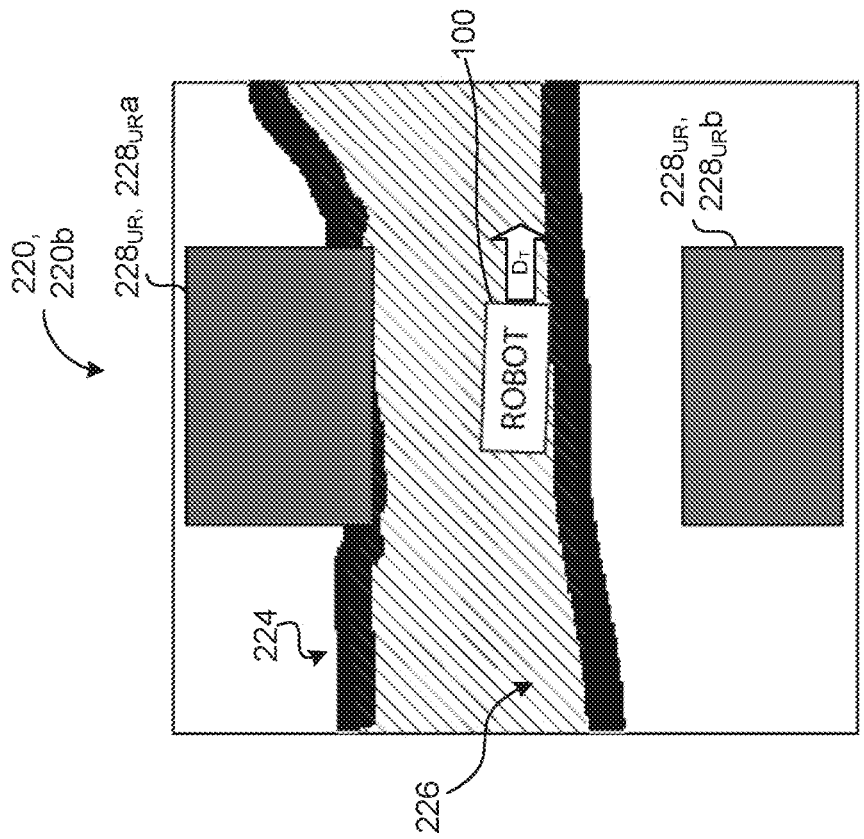
FIG. 3F
FIG. 3E

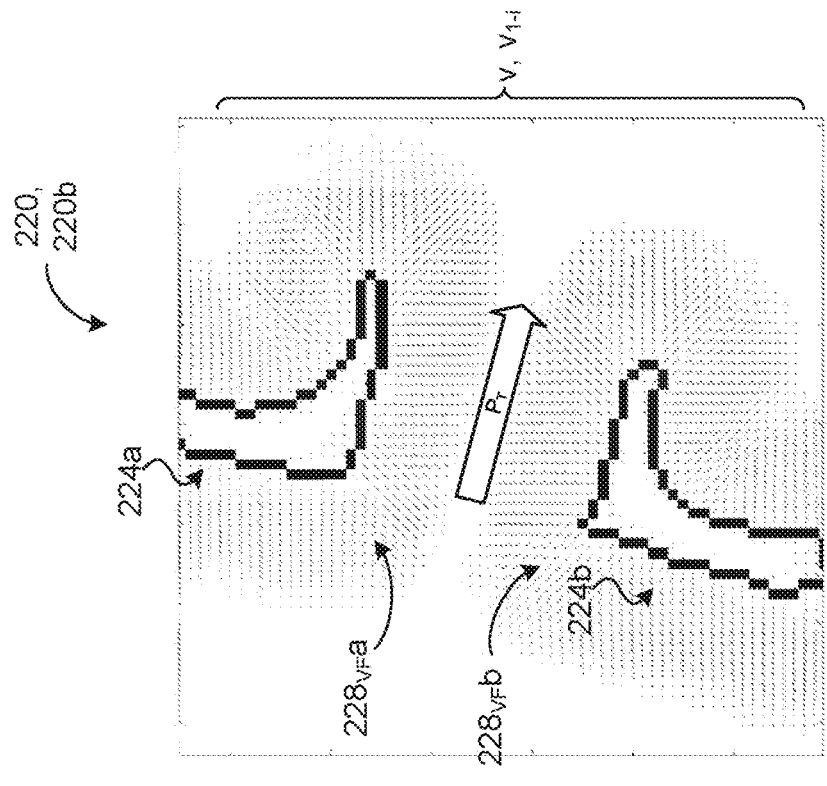
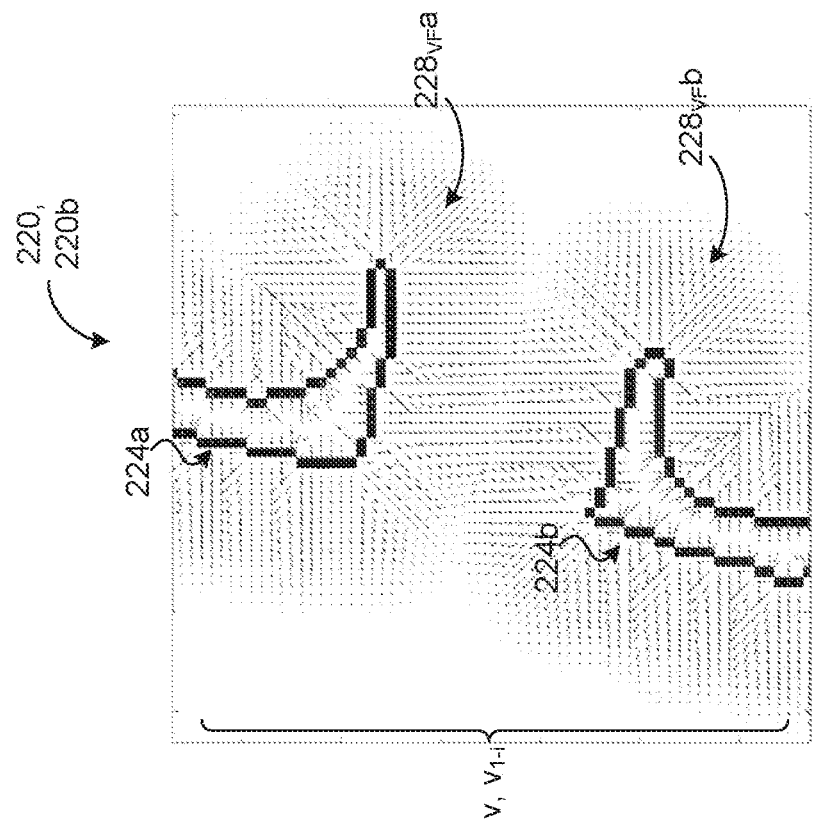
FIG. 3L
FIG. 3K

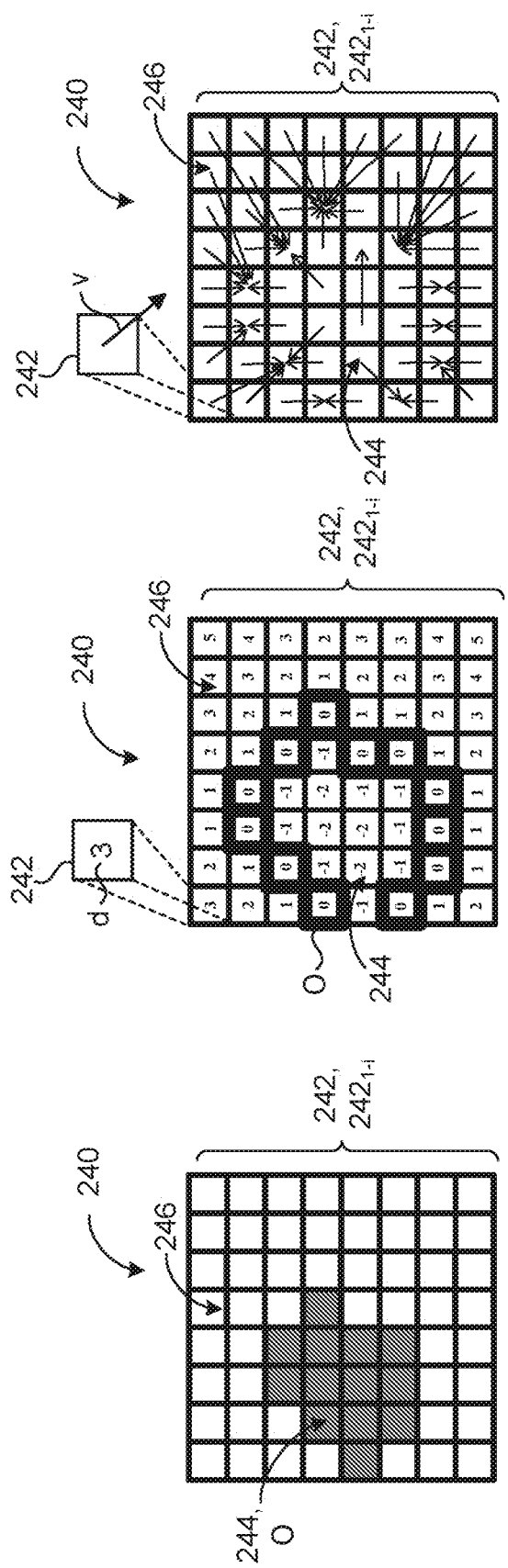

CONSTRAINED MOBILITY MAPPING

CROSS REFERENCE TO RELATED APPLICATIONS

This U.S. patent application is a continuation of U.S. patent application Ser. No. 16/573,284, filed on Sep. 16, 2019, which claims priority under 35 U.S.C. § 119(e) to U.S. Provisional Application 62/883,310, filed on Aug. 6, 2019, the disclosure of each of which is considered part of the disclosure of this application and is hereby incorporated by reference in its entirety.

TECHNICAL FIELD

This disclosure relates to constrained mobility mapping.

BACKGROUND

Robotic devices are increasingly being used in constrained or otherwise cluttered environments to perform a variety of tasks or functions. These robotic devices may need to navigate through these constrained environments without stepping on or bumping into obstacles. As these robotic devices become more prevalent, there is a need for real-time navigation and step planning that avoids contact with obstacles while maintaining balance and speed.

SUMMARY

One aspect of the disclosure provides a method of constrained mobility mapping. The method includes receiving, at data processing hardware, from at least one sensor of a robot, at least one original set of sensor data and a current set of sensor data. Here, each of the at least one original set of sensor data and the current set of sensor data corresponds to an environment about the robot where the robot includes a body. The method further includes generating, by the data processing hardware, a voxel map including a plurality of voxels based on the at least one original set of sensor data. The plurality of voxels includes at least one ground voxel and at least one obstacle voxel. The method also includes generating, by the data processing hardware, a spherical depth map based on the current set of sensor data and determining, by the data processing hardware, that a change has occurred to an obstacle represented by the voxel map based on a comparison between the voxel map and the spherical depth map. The method additional includes updating, by the data processing hardware, the voxel map to reflect the change to the obstacle within the environment.

Implementations of the disclosure may include one or more of the following optional features. In some implementations, the robot includes four legs defining a quadruped. In some example, generating the voxel map includes determining whether three-dimensional units of space about the robot are occupied and, for each three-dimensional unit that is occupied, classifying a respective unit as one of ground, an obstacle, or neither ground nor an obstacle. In some configurations, the spherical depth map includes a spherical representation of the current set of sensor data where the spherical representation includes rectangular structures defined by points of the sensor data at a distance and a height from the at least one sensor capturing the current set of sensor data. In some implementations, updating the voxel map to reflect the change to the obstacle within the environment includes removing one or more voxels from the voxel map corresponding to the obstacle associated with the change. Here, removing the one or more voxel may include using heuristics to identify nearby voxels that are associated with the change to the object with the environment and removing the identified nearby voxels.

In some examples, the voxel map includes a three-dimension (3D) grid and the method further includes, for each cell of the 3D grid of the voxel map, consolidating, by the data processing hardware, contiguous voxels of a respective vertical column to form a segment. Here, the segment includes a height and a point weight where the point weight indicates a degree of certainty that one or more voxels forming the segment are occupied based on the at least one original set of sensor data. In these examples, the method may further include reducing, by the data processing hardware, the point weight of a respective segment when the current set of sensor data does not include sensor data defining the respective segment. Additionally or alternatively, in these examples, the method may also include comparing, by the data processing hardware, the height of the segment at a location in the voxel map to a height range from a column at a respective location in the spherical depth map where the location of the segment and the respective location of the column correspond to the same location relative to the robot. In these examples, updating the voxel map to reflect the change to the obstacle within the environment includes trimming the segment corresponding to the obstacle associated with the change.

Another aspect of the disclosure also provides a method of constrained mobility mapping. The method includes receiving, at data processing hardware, sensor data corresponding to an environment about a robot from at least one sensor of the robot where the robot includes a body. The method further includes generating, by the data processing hardware, a voxel map including a plurality of voxels based on the sensor data. Here, the plurality of voxels includes at least one ground voxel and at least one obstacle voxel. The method also includes, based on the voxel map, generating, by the data processing hardware, a body obstacle map configured to indicate locations in the environment where the body of the robot is capable of moving without interference with an obstacle in the environment. The body obstacle map divided into cells wherein a plurality of the cells include an indication of a nearest obstacle boundary where the nearest obstacle boundary is derived from the at least one obstacle voxel of the voxel map. The method further includes, communicating the body obstacle map to a control system configured to move the robot about the environment.

This aspect may include one or more of the following optional features. In some implementations, the indication includes an estimate of a distance to the nearest obstacle boundary and a direction to the nearest obstacle boundary. Here, generating the body obstacle map may include generating a vector field comprising a plurality of vectors where each vector of the plurality of vectors indicates a direction of obstacle avoidance, and wherein each vector includes a vector direction opposite the direction to the nearest obstacle boundary. In some examples, the control system is configured to use the body obstacle map to control horizontal motion of the body of the robot and yaw rotation of the body of the robot. The plurality of cells may not correspond to a boundary of an obstacle.

In some configurations, the method may also include filtering, by the data processing hardware, the plurality of voxels of the voxel map based on a point weight associated with each voxel of the plurality of voxels. Here, the point weight indicates a degree of certainty that a respective voxel is occupied based on the sensor data. In these configurations, generating the body obstacle map based on the voxel map includes translating to the body obstacle map the filtered plurality of voxels that satisfy a point weight threshold and correspond to an obstacle voxel A third aspect of the disclosure also provides a method of constrained mobility mapping. The method includes receiving, at data processing hardware, sensor data corresponding to an environment about a robot from at least one sensor of the robot where the robot includes a body and legs with each leg including a distal end. The method further includes generating, by the data processing hardware, a voxel map including a plurality of segments based on the sensor data where each segment of the plurality of segments corresponds to a vertical column defined by one or more voxels. Here, the plurality of segments includes at least one ground segment and at least one obstacle segment. Based on the voxel map, the method also includes, generating, by the data processing hardware, a ground height map configured to indicate heights to place the distal end of a respective leg of the robot when the robot is moving about the environment. The ground height map is divided into cells where at least one cell corresponds to a respective ground segment and includes a respective height based on the respective ground segment. The method further includes communicating, by the data processing hardware, the ground height map to a control system, the control system configured to move the distal end of the respective leg to a placement location in the environment based on the ground height map.

This aspect may include one or more of the following optional features. In some implementations, generating the ground height map includes determining that a point weight for one or more voxels of the respective ground segment satisfies a height accuracy threshold where the point weight indicates a degree of certainty that a respective voxel is occupied based on sensor data. Here, the height accuracy threshold indicates a level of accuracy for a height of a given object represented by the respective ground segment. In these implementations, determining that the point weight for one or more voxels of the respective ground segment satisfies a height accuracy threshold includes traversing the one or more voxels defining the respective ground segment from a greatest height of the respective ground segment to a lowest height of the respective ground segment.

In some examples, the method also includes the following: identifying, by the data processing hardware, that one or more cells of the ground height map correspond to missing terrain; determining, by the data processing hardware, whether the missing terrain corresponds to an occlusion of the sensor data; and when the missing terrain corresponds to the occlusion of the sensor data, replacing, by the data processing hardware, the missing terrain with flat terrain. When the missing terrain fails to correspond to the occlusion of the sensor data, the method may further include replacing, by the data processing hardware, the missing terrain with smooth terrain. Here, with smooth terrain, the method may not persist smooth terrain for the ground height map during a subsequent iteration of the ground height map. In some configurations, the flat terrain persists within the ground height map until new sensor data identifies actual terrain corresponding to the flat terrain.

A fourth aspect of the disclosure also provides a method of constrained mobility mapping. The method includes receiving, at data processing hardware, sensor data corresponding to an environment about a robot from at least one sensor of the robot where the robot includes a body and legs with each leg including a distal end. The method further includes generating, by the data processing hardware, a voxel map including a plurality of segments based on the sensor data where each segment of the plurality of segments corresponds to a vertical column defined by one or more voxels. Here, the plurality of segments includes at least one ground segment and at least one obstacle segment. Based on the voxel map, the method also includes, generating, by the data processing hardware, a ground height map configured to indicate heights to place the distal end of a respective leg of the robot when the robot is moving about the environment. Based on the ground height map, the method further includes generating, by the data processing hardware, a no step map including one or more no step regions where each no step region is configured to indicate a region not to place the distal end of a respective leg of the robot when the robot is moving about the environment. Here, the no step map is divided into cells where each cell includes a distance value and a directional vector. The distance value indicates a distance to a boundary of a nearest obstacle to a cell. The directional vector indicates a direction to the boundary of the nearest obstacle to the cell. The method additionally includes communicating, by the data processing hardware, the no step map to a control system configured to move the distal end of the respective leg to a placement location in the environment based on the no step map.

This aspect may include one or more of the following optional features. The distance to the boundary of the nearest obstacle may include a sign identifying whether the cell is inside the nearest obstacle or outside the nearest obstacle. The at least one no step region of the one or more step regions may identify an area not accessible to the robot based on a current pose of the robot where the area is accessible to the robot in an alternative pose different from the current pose. In some examples, generating the no step map also includes generating the no step map for a particular leg of the robot. In some implementations, the method may also include determining by the data processing hardware, the nearest obstacle to a respective cell based on the at least one obstacle segment of the voxel map.

In some configurations, the method additionally includes determining, by the data processing hardware, a first no step region corresponding to a potential shin collision by the following operations: determining a minimum slope for a leg to achieve a commanded speed; identifying a shin collision height based on the minimum slope; and for each cell of the no step map, comparing the shin collision height to a ground height of a respective cell, the ground height for the respective cell received from the ground height map. In these configurations, the method may also include determining, by the data processing hardware, that a difference between the shin collision height and the ground height for the respective cell satisfies a shin collision threshold.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2D and 2E are schematic views of examples of voxel classification.

FIGS. 2I-2L are perspective views of examples of ray tracing for a voxel map.

FIGS. 3A-3F are schematic views of example body obstacle maps generated by the robot of FIG. 1A.

FIGS. 3G-3L are schematic views of example processing techniques for body obstacle map generation by the robot of FIG. 1A.

FIG. 5A-5C are schematic views of example no step maps generated by the robot of FIG. 1A.

Like reference symbols in the various drawings indicate like elements.

DETAILED DESCRIPTION

As legged robotic devices (also referred to as "robots") become more prevalent, there is an increasing need for the robots to navigate environments that are constrained in a number of ways. For example, a robot may need to traverse a cluttered room with large and small objects littered around on the floor or negotiate a staircase. Typically, navigating these sort of environments has been a slow and arduous process that results in the legged robot frequently stopping, colliding with objects, and/or becoming unbalanced. For instance, even avoiding the risk of a collision with an object may disrupt a robot's balance. In order to address some of these shortcomings, the robot constructs maps based on sensors about the robot that guide and/or help manage robot movement in an environment with obstacles. With these maps, the robot may traverse terrain while considering movement constraints in real-time, thus allowing a legged robotic device to navigate a constrained environment quickly and/or efficiently while maintaining movement fluidity and balance.

Figure 1A:
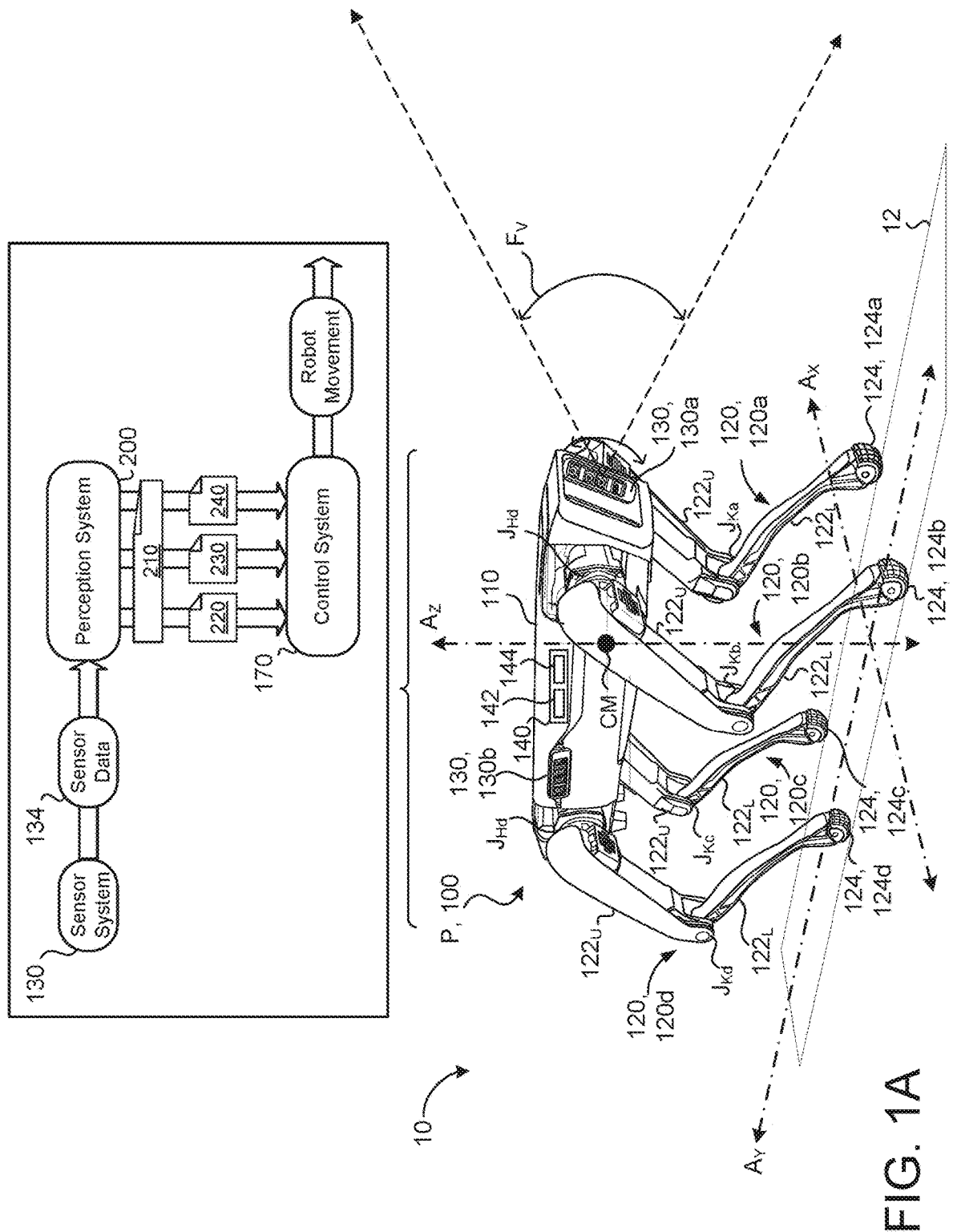
FIG. 1A is a schematic view of an example robot within an environment.

Referring to FIG. 1A, the robot 100 includes a body 110 with locomotion based structures such as legs 120a-d coupled to the body 110 that enable the robot 100 to move about the environment 10. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs) that provide a means to traverse the terrain within the environment 10.

In order to traverse the terrain, each leg 120 has a distal end 124 that contacts a surface of the terrain. In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member $122_L$ of the leg 120.

The robot 100 has a vertical gravitational axis (e.g., shown as a Z-direction axis $A_Z$) along a direction of gravity, and a center of mass CM, which is a point where the weighted relative position of the distributed mass of the robot 100 sums to zero. The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to a Y-Z plane extending in directions of a y-direction axis $A_Y$ and the z-direction axis $A_Z$. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 10.

In order to maneuver about the environment 10, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. In some examples, the sensor data 134 is data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100. With the sensor data 134, a perception system 200 of the robot 100 may generate maps 210, 220, 230, 240 for the terrain about the environment 10.

While the robot 100 maneuvers about the environment 10, the sensor system 130 gathers sensor data 134 relating to the terrain of the environment 10. For instance, FIG. 1A depicts the sensor system 130 gathering sensor data 134 about a room as the environment 10 of the robot 100. As the sensor system 130 gathers sensor data 134, a computing system 140 is configured to store, to process, and/or to communicate the sensor data 134 to various systems of the robot 100 (e.g., the perception system 200 or the control system 170). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144. In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120). Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and accessible to the computing system 140. In some examples, the computing system 140 is configured to utilize the remote resources 162, 164 as extensions of the computing resources 142, 144 such that resources of the computing system 140 may reside on resources of the remote system 160.

Figure 1B:
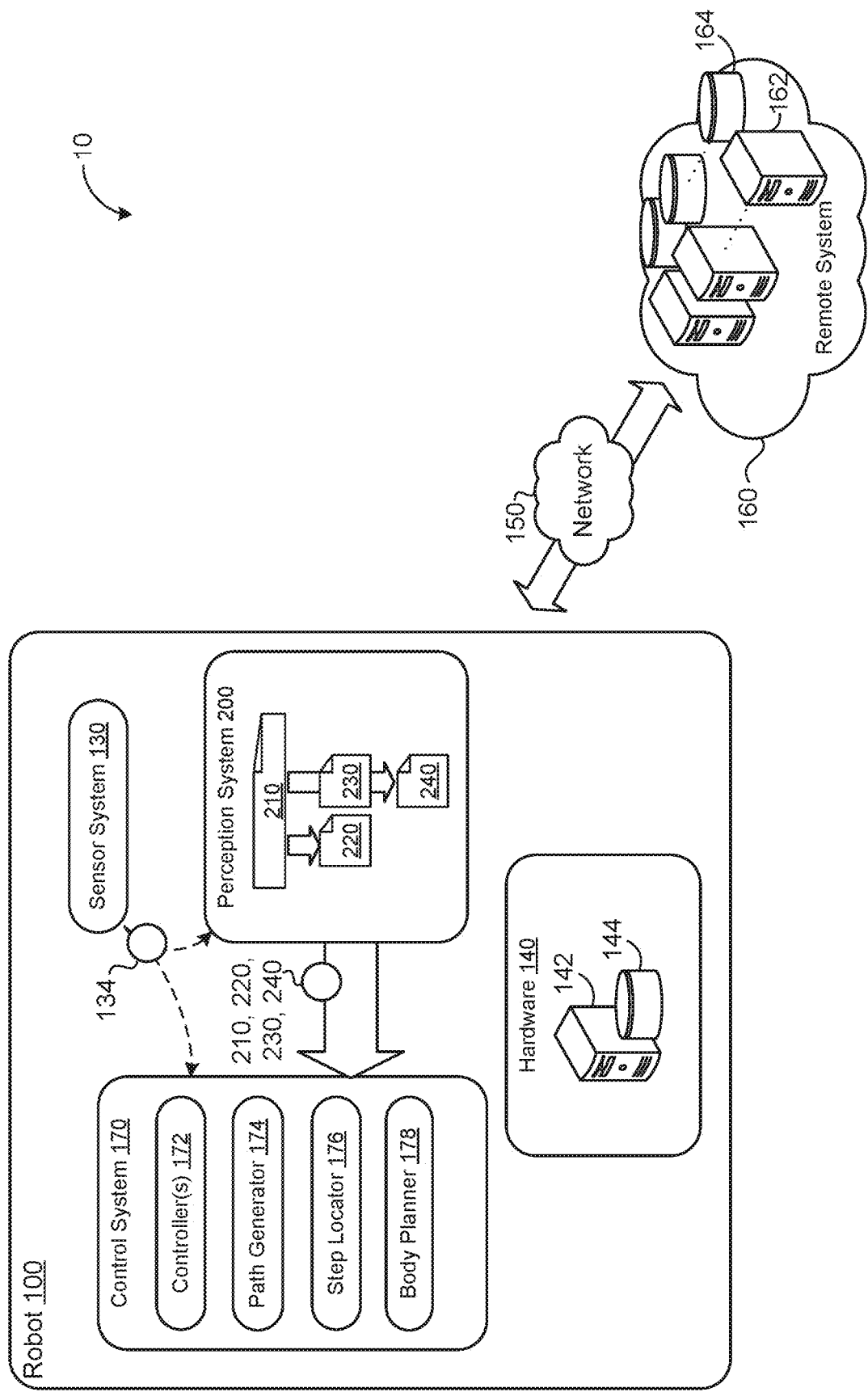
FIG. 1B is a schematic view of example systems for the robot of FIG. 1A.

In some implementations, as shown in FIGS. 1A and 1B, the robot 100 includes a control system 170 and a perception system 200. The perception system 200 is configured to receive the sensor data 134 from the sensor system 130 and to process the sensor data 134 into maps 210, 220, 230, 240. With the maps 210, 220, 230, 240 generated by the perception system 200, the perception system 200 may communicate the maps 210, 220, 230, 240 to the control system 170 in order perform controlled actions for the robot 100, such as moving the robot 100 about the environment 10. In some examples, by having the perception system 200 separate from, yet in communication with the control system 170, processing for the control system 170 may focus on controlling the robot 100 while the processing for the perception system 200 focuses on interpreting the sensor data 134 gathered by the sensor system 130. For instance, these systems 200, 170 execute their processing in parallel to ensure accurate, fluid movement of the robot 100 in an environment 10.

In some examples, the control system 170 includes at least one controller 172, a path generator 174, a step locator 176, and a body planner 178. The control system 170 is configured to communicate with at least one sensor system 130 and a perception system 200. The control system 170 performs operations and other functions using hardware 140. The controller 172 is configured to control movement of the robot 100 to traverse about the environment 10 based on input or feedback from the systems of the robot 100 (e.g., the control system 170 and/or the perception system 200). This may include movement between poses and/or behaviors of the robot 100. For example, the controller 172 controls different footstep patterns, leg patterns, body movement patterns, or vision system sensing patterns.

In some examples, the controller 172 includes a plurality of controllers 172 where each of the controllers 172 has a fixed cadence. A fixed cadence refers to a fixed timing for a step or swing phase of a leg 120. For example, the controller 172 instructs the robot 100 to move the legs 120 (e.g., take a step) at a particular frequency (e.g., step every 250 milliseconds, 350 milliseconds, etc.). With a plurality of controllers 172 where each controller 172 has a fixed cadence, the robot 100 can experience variable timing by switching between controllers 172. In some implementations, the robot 100 continuously switches/selects fixed cadence controllers 172 (e.g., re-selects a controller 170 every 3 milliseconds) as the robot 100 traverses the environment 10.

Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 provides the step locator 176 with a nominally collision-free path as a starting point for its optimization. The step locator 176 also receives information about obstacles such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perceptions system 200 (e.g., maps 210, 220, 230, 240). The body planner 178, much like the step locator 176, receives inputs from the perceptions system 200 (e.g., maps 210, 220, 230, 240). Generally speaking, the body planner 178 is configured to adjust dynamics of the body 110 of the robot 100 (e.g., rotation, such as pitch or yaw and/or height of COM) to successfully move about the environment 10.

The perception system 200 is a system of the robot 100 that helps the robot to move more precisely in a terrain with various obstacles. As the sensors 132 collect sensor data 134 for the space about the robot 100 (i.e., the robot's environment 10), the perception system 200 uses the sensor data 134 to form one or more maps 210, 220, 230, 240 for the environment 10. Once the perception system 200 generates a map 210, 220, 230, 240, the perception system 200 is also configured to add information to the map 210, 220, 230, 240 (e.g., by projecting sensor data 134 on a preexisting map)

and/or to remove information from the map 210, 220, 230, 240 (e.g., by ray tracing a preexisting map based on current sensor data 134). Although maps 210, 220, 230, 240 are described herein separately, nonetheless, the perception system 200 may generate any number of map(s) to convey the information and features described for each map.

Referring to FIGS. 2A-2L, in some implementations, the perception system 200 generates a voxel map 210. The perception system 200 generates the voxel map 210 based a combination of a world reference frame for the robot 100 and a local reference frame about the robot 100. Here, the perception system 200 receives odometry information for the robot 100 that defines a location of the robot 100 (e.g., by position and/or velocity of the body 110 of the robot 100) in order to represent the world reference frame and receives sensor data 134 defining an area within range of the sensor(s) 132 as an area near the robot 100 that represents the local reference frame. With the odometry information and the sensor data 134, the perception system 200 generates a voxel map 210 to represent a three-dimensional space about the robot 100. In some implementations, systems of the robot 100 may track the robot's relative motion over time to maintain current odometry information for the robot 100 (e.g., using simultaneous localization and mapping (SLAM)). In some examples, the voxel map 210 is a data structure that represents a historical collection of sensor data 134 by the perception system 200 such that the voxel map 210 includes multiple sets of sensor data 134 over a period of time.

Figure 2A:
FIGS. 2A and 2B are perspective views of an example projection of a voxel map for the robot of FIG. 1A.
Figure 2B:
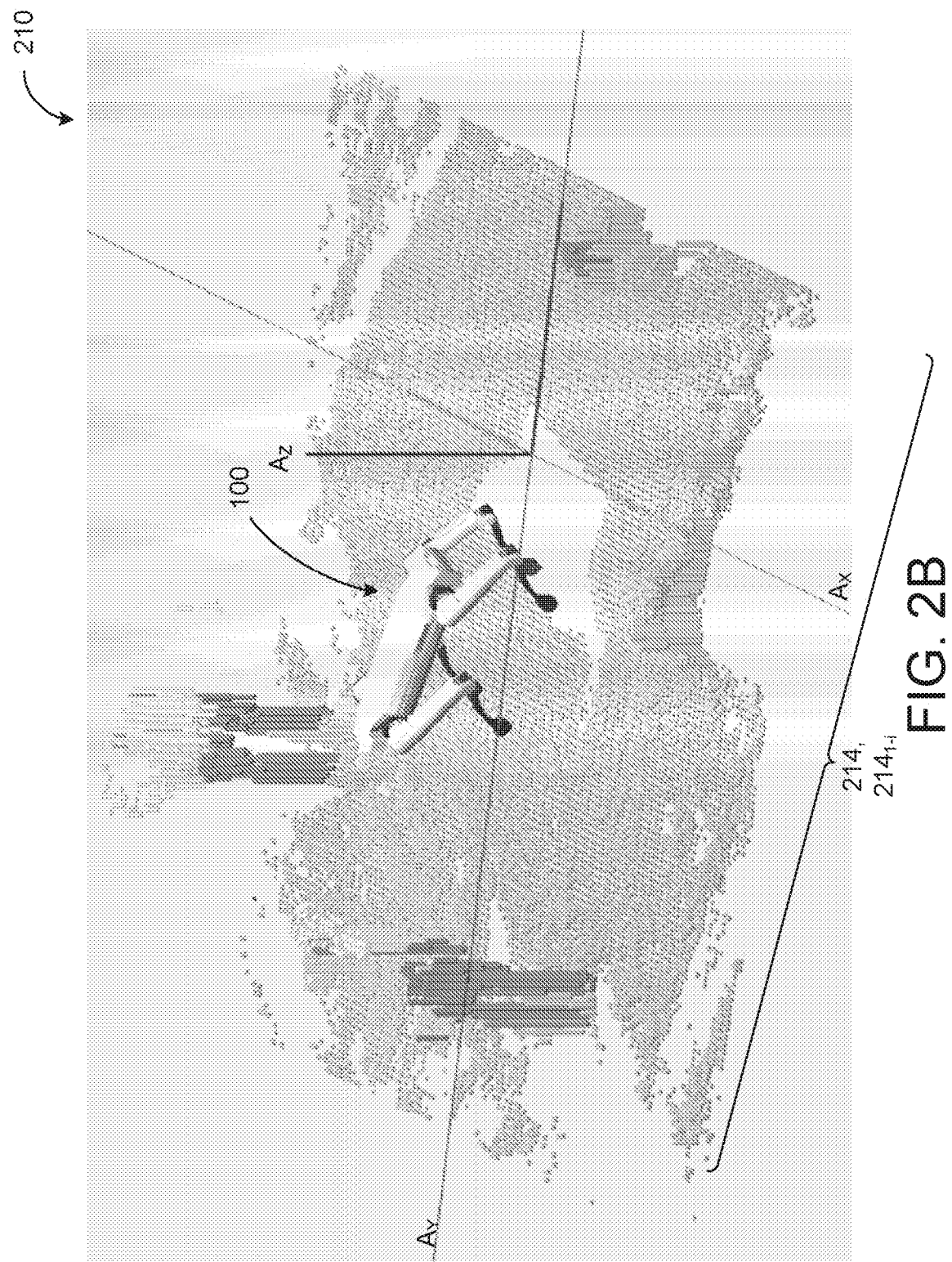
Figure 2C:
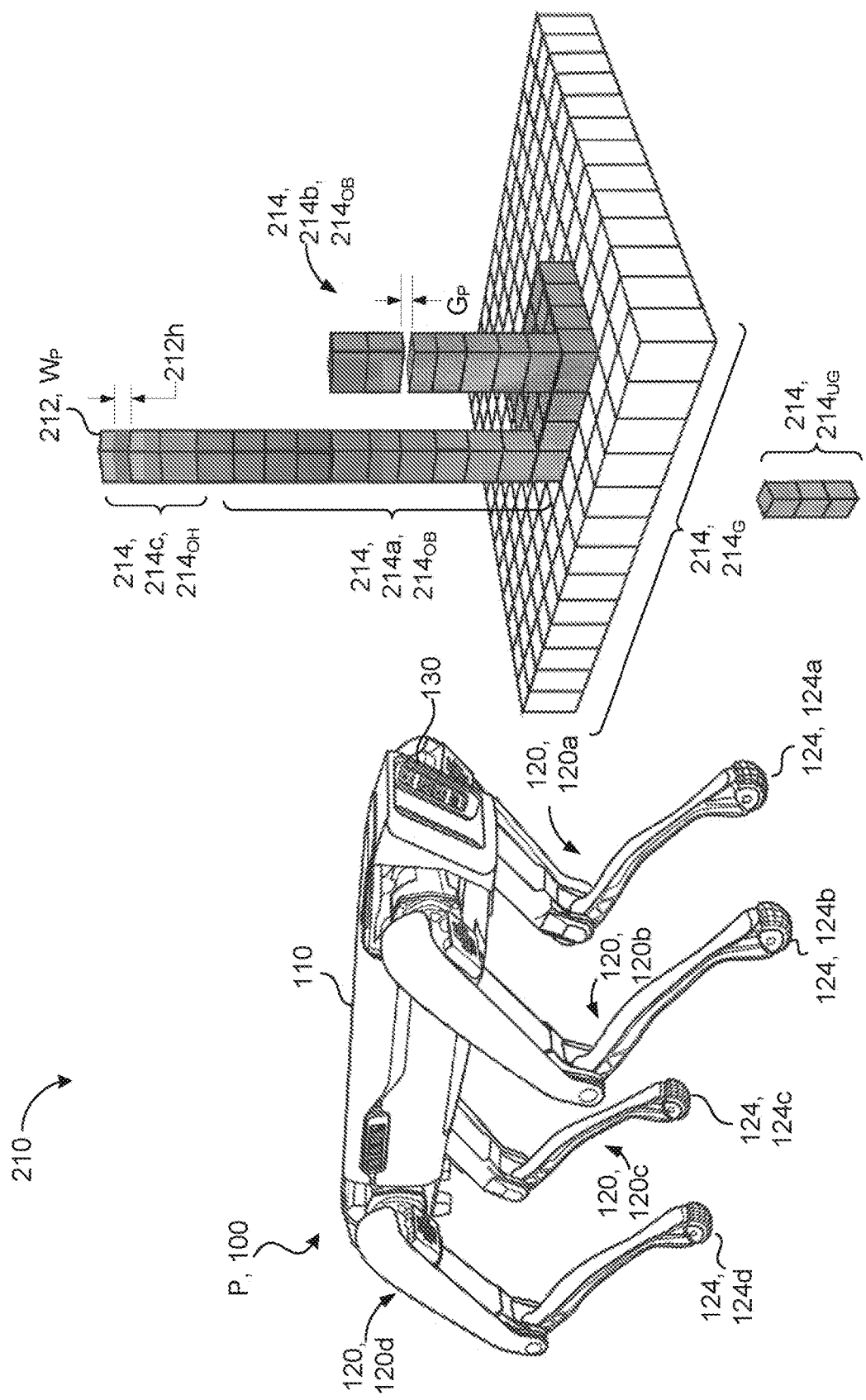
FIG. 2C is a perspective view of an example voxel map for the robot of FIG. 1A.

The voxel map 210 generally represents the three-dimensional space as voxels 212 (i.e., a graphic unit corresponding to a three-dimension representation of a pixel). For instance, FIG. 2A depicts a three-dimensional (3D) grid of voxels 212, $212_{1-i}$. In some examples, each voxel 212 of the voxel map 210 represents a three centimeter cubic area. In some configurations, the voxel map 210 represents the voxels 212 as segments 214, $214_{1-i}$ (e.g., as shown in FIG. 2B). Segments 214 refer to a consolidation of voxels 212 into a vertical column. In other words, the perception system 200 combines voxels 212 in the same vertical column of the 3D grid to form at least one segment 214. For instance, FIG. 2C illustrates a 3D grid of cells with a first segment 214, 214a and a second segment 214, 214b. By representing voxels 212 as segments 214, the perception system 200 may simplify classification of various obstacles or objects within the environment 10 of the robot 100. In other words, the perception system 200 processes the voxel map 210 with hundreds of segments 214 rather than thousands of voxels 212 due to the vertical consolidation.

In some implementations, the perception system 200 is configured with a gap threshold when forming the segments 214. In other words, a gap Gp or non-contiguous vertical column of voxel(s) 212 may cause the perception system 200 to terminate a first segment 214 representing a contiguous portion of the vertical column of voxels 212 before the gap Gp and to represent a second contiguous portion of the vertical column of voxels 212 after the gap Gp as a second segment 214. For example, although FIG. 2C illustrates the second segment 214b as a single segment 214 (e.g., designated by the same shade of gray), the perception system 200 would divide the second segment 214b into another segment 214 if the gap Gp shown in FIG. 2C was large enough to satisfy the gap threshold. Therefore, a vertical column of voxels 212 may include multiple segments 214 depending on whether a size of gap(s) within the column satisfies (e.g., exceeding) the gap threshold. On the other hand, when the size of the gap Gp fails to satisfy the threshold (e.g., as shown in FIG. 2C), the perception system 200 is configured to ignore the gap Gp and interpret the entire vertical column of voxels 212 with the gap Gp as a single segment 214. In some examples, the gap threshold is thirty centimeters, such that any vertical gap greater than thirty centimeters would terminate a segment 214 at one side of the gap Gp and cause formation of a new segment 214 at the other side of the gap Gp. By separating the segments 214 at gaps Gp, the perception system 200 may be configured to infer that all voxels in the same segment 214 correspond to the same underlying object.

With continued reference to FIG. 2C, the perception system 200 is configured to classify the voxel map 210 (e.g., classify segments 214) to identify portions that correspond to the ground (i.e., a geometric area that the perception system 200 interprets that the robot 100 can step on), obstacles (i.e., a geometric area that the perception system 200 interprets that may interfere with movement of the robot 100), or neither the ground nor an obstacle (e.g., something above the robot 100 that that can be ignored). In some configurations, the voxel map 210 includes a dense two-dimensional grid of columns where a column is a numerical representation of a number of segments 214 within each particular area (i.e., cell) of the two-dimensional grid. Additionally, each column may include a sparse list of voxels 212 such that a column includes a count of a number of voxels 212 present in the column. Since a column may correspond to a vertical segment 214 at a cell of the two-dimension grid, each cell may have zero or more segments 214. When the perception system 200 groups voxels 212 into one or more segments 214, the perception system 200 is configured to classify each segment 214 (or voxel 212) into a corresponding classification, such as ground 214, $214_G$, underground 214, $214_{UG}$, obstacle 214, $214_{OB}$, or overhead 214, $214_{OH}$. By classifying a segment 214 as ground $214_G$, the perception system 200 is indicating that the robot 100 may step on top of the segment 214. When the perception system 200 classifies a segment 214 as underground $214_U$, this underground classification indicates a segment 214 that may be ignored for further processing of the perception system 200 or other systems of the robot 100. Segments 214 classified as obstacles $214_{OB}$ refer to objects that the robot 100 may collide with and cannot step on. Here, a segment 214 classified as overhead $214_{OH}$ refers to a segment 214 that the perception system 200 identifies that the robot 100 can traverse under.

Generally speaking, the language herein refers at times to a ground surface 12 (or ground plane) while also referring to "ground." A ground surface 12 refers to a feature of the world environment 10. In contrast, ground G refers to a designation by the perception system 200 for an area (e.g., a voxel 212 or a segment 214) where the robot 100 may step. Similarly, an object 14 is a physical structure or feature in the world environment 10 while an "obstacle O" is a designation for the object 14 by the perception system 200 (e.g., an occupied voxel 212 or an obstacle segment $214_{OB}$). In other words, the sensor system 130 gathers sensor data 134 about an object 14 near the robot 100 in the environment 10 that the perception system 200 interprets (i.e., perceives) as an obstacle O because the object 14 is an area that may impede or prevent movement of the robot 100.

In some implementations, the perception system 200 is configured to perform classification based on a convexity assumption. The convexity assumption assumes that the robot 100 moves generally outward from a center without changing direction. In terms of the perception system 200, the convexity assumption instructs the perception system 200 to start its classification process nearest the robot 100 and classify outwards. During classification by the perception system 200 based on the convexity assumption, the perception system 200 may classify cells (or segments 214) in an associative manner. In other words, the classification of a cell is based on cells that the perception system 200 has seen between the robot 100 and the cell.

When classifying objects that that the robot 100 senses, the perception system 200 may encounter various issues. For example, if the perception system 200 uses 1.5-dimensional (1.5D) analysis for classification (i.e., a one dimensional line with a height function for each point on that 1D line), the perception system 200 risks encountering issues identifying whether the robot 100 has traversed upward several consecutive times and probably should not continue its upwards traversal for some duration. In other words, the robot 100 may be climbing terrain and not necessarily traversing relatively along a lowest true surface of the environment 10. Another potential issue for 1.5D analysis is that an overall slope of a sequence of cells (e.g., adjacent cells) may be difficult to quantify; resulting in the robot 100 attempting to traverse cells with too steep of slope.

A potential approach to address these shortcomings is for the perception system 200 to use a permissible height process. In a permissible height method, the perception system 200 defines a spatial region near (e.g., adjacent) each cell where the robot 100 cannot step. With spatial areas where the robot 100 cannot step for all cells or some cluster of cells perceived by the perception system 200, the perception system 200 classifies where the robot 100 is able to step (i.e., a ground classification) as an intersection of spatial regions that have not been designated as an area where the robot 100 cannot step. Although this approach may cure some deficiencies of the 1.5D classification approach, depending on the environment 10, this method may become too restrictive such that the perception system 200 does not classify enough cells as ground where the robot 100 may step.

In some implementations, such as FIG. 2D, in order to make the permissible height process more robust such that the perception system 200 may efficiently and/or accurately classify segments 214, the perception system 200 begins its classification process for a cell with a trace of permissible heights from that particular cell onward. Here, the trace refers to a permissible range of heights that the robot 100 may step to from one cell to an adjacent cell (e.g., when taking into account the convexity assumption). For example, FIGS. 2D and 2E depict a trace line 216 with reference to five segments 214, 214a-e and a respective starting cell location (shown in gray). As the perception system 200 traverses the cells during classification, the trace line 216 shifts (e.g., from FIG. 2D to FIG. 2E) and continues to add a permissible range of heights at an end of the trace. After the shift, the perception system 200 processes a current permissible range of heights for the trace; removing small disturbances (e.g., height disturbances) and shaping the permissible height range to be monotonic. In some examples, the processing after the shift causes both additions and subtractions to occur for the segments 214 during classification. Although, FIGS. 2D and 2E illustrate this trace classification process with respect to a one-dimensional approach, the perception system 200 may perform an analogous process in other dimensions (e.g., in two-dimensions or three-dimensions).

Figure 2F:
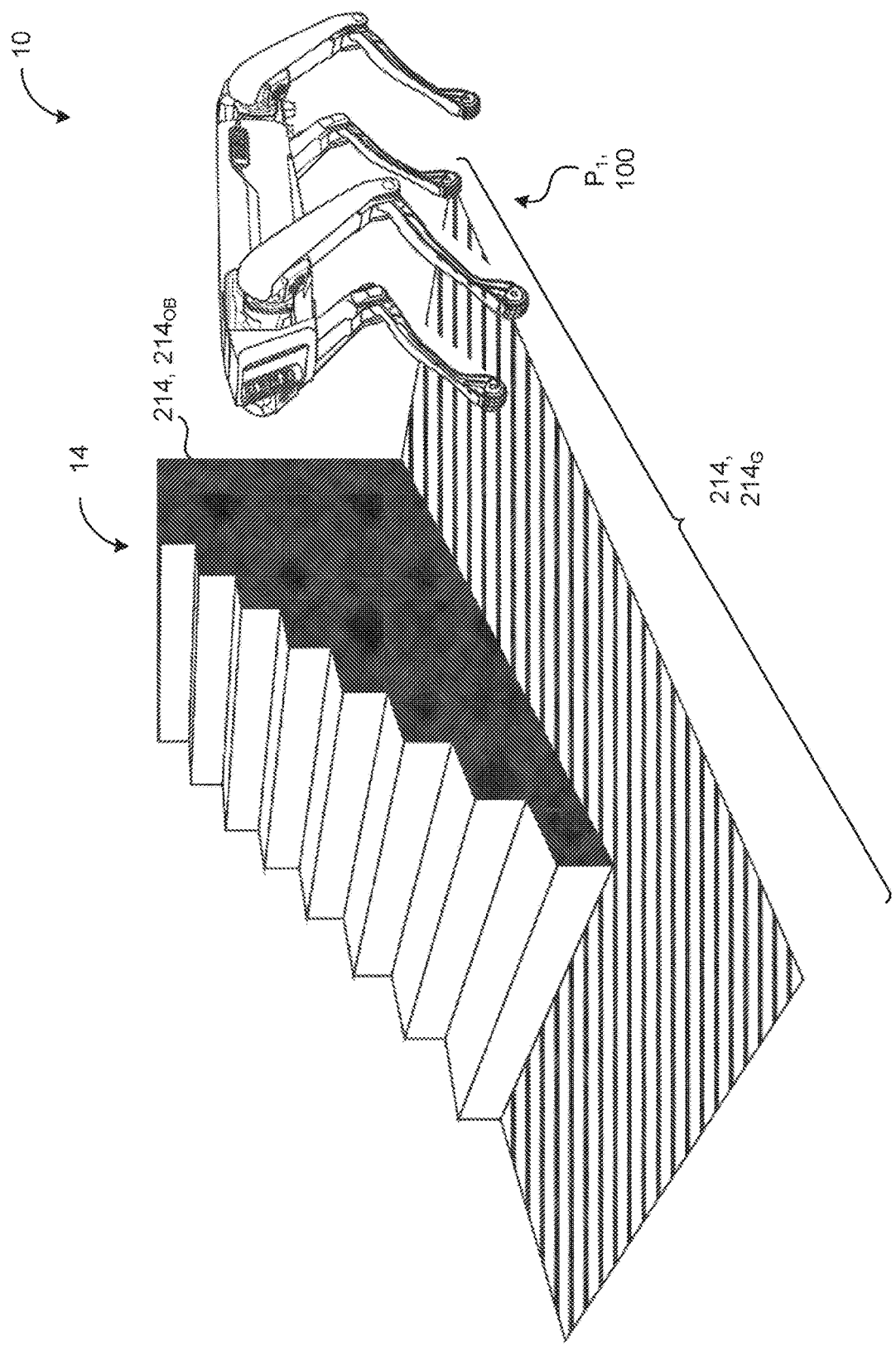
FIGS. 2F and 2G are perspective views of examples of voxel classification based on a location of the robot of FIG. 1A.
Figure 2G:
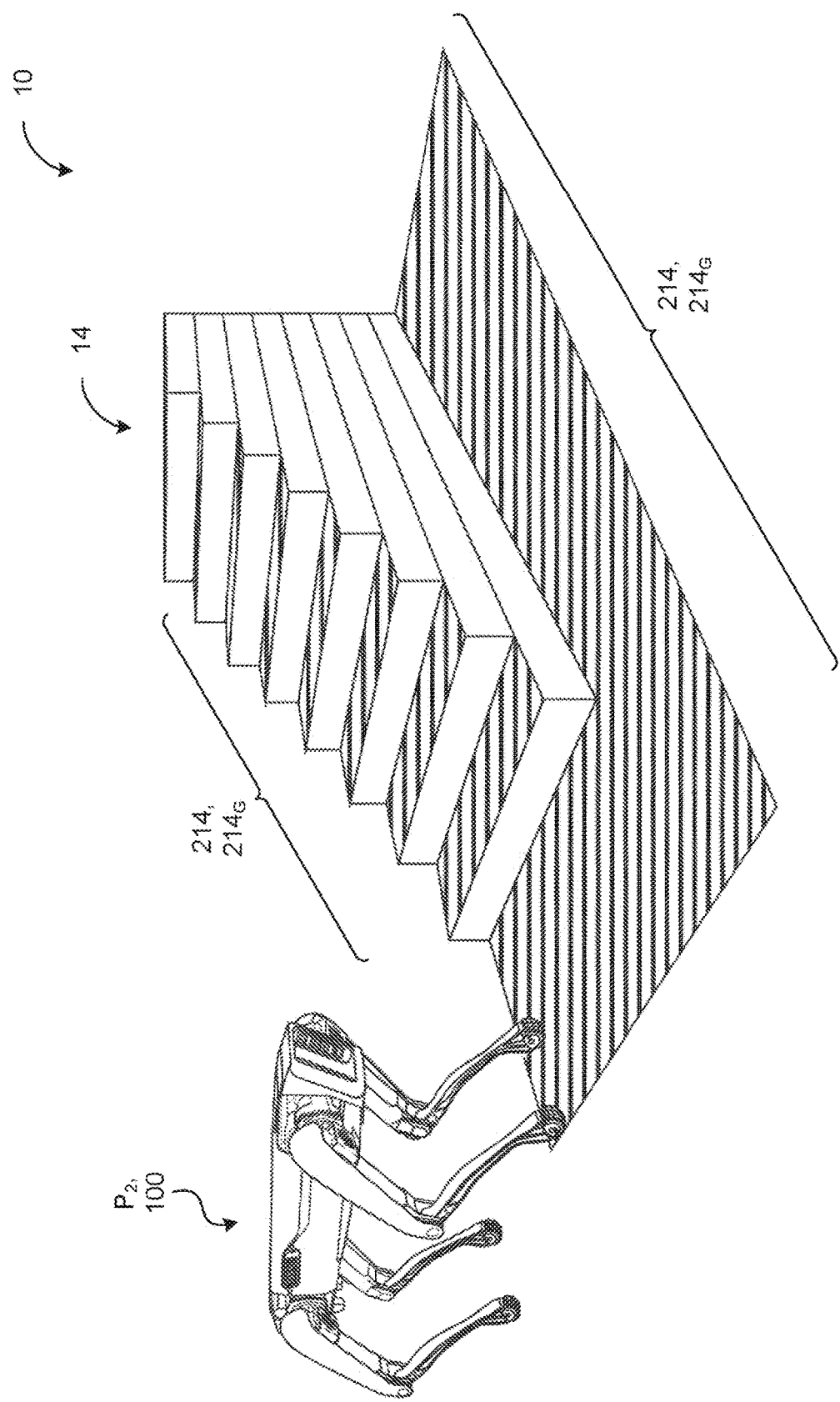

In some examples, a classification by the perception system 200 is context dependent. In other words, as shown in FIGS. 2F and 2G, an object 14, such as a staircase, may be an obstacle for the robot 100 when the robot 100 is at a first pose P, $P_1$ relative to the obstacle. Yet at another pose P, for example as shown in FIG. 2G, a second pose $P_2$ in front of the staircase, the object 14 is not an obstacle for the robot 100, but rather should be considered ground that the robot 100 may traverse. Therefore, when classifying a segment 214, the perception system 200 accounts for the position and/or pose P of the robot 100 with respect to an object 14.

In some configurations, rather than corresponding to a strict map of voxel occupancy, the voxel map 210 corresponds to a visual certainty for each voxel 212 within the voxel map 210. For instance, the perception system 200 includes a point weight $W_p$ (e.g., as shown in FIG. 2C) for each voxel 212 in the voxel map 210 where the point weight $W_p$ represents a number of times that the perception system 200 has perceived (i.e., received/processed) occupancy of a particular voxel 212 based on the sensor data 134. More specifically, the perception system 200 receives sensor data 134 at a particular frequency. In these examples, when the perception system 200 receives sensor data 134 for a voxel 212 that was previously identified by the perception system 200 as occupied, the perception system 200 adjusts the point weight $W_p$ to convey a greater level of confidence in the occupancy of the previously identified voxel 212. In some examples, the point weight $W_p$ also includes a factor for a type of sensor 132 that identifies the voxel occupancy. For instance, a LIDAR sensor 132 has greater accuracy than a stereo camera sensor 132. Here, the perception system 200 adjusts the point weight $W_p$ to represent an accuracy of the sensor 132 that gathers the sensor data 134 (e.g., that the LIDAR sensor 132 is more accurate than the stereo camera sensor 132). In another example, the point weight $W_p$ accounts for the type of sensor 132 based on a distance of the identified voxel 212. For example, when further away from an object 14, a stereo camera is less accurate (e.g., would receive a lower point weight). In contrast, a LIDAR sensor 132 is accurate at a greater distance, but much less accurate when an object 14 is close to the LIDAR sensor 132 due to an increased point cloud density. Therefore, the point weight $W_p$ of a voxel 212 may account for one or more factors that affect an accuracy of the voxel identification (e.g., previous identification, distance, type of sensor 132, or any combination thereof).

In some examples, the point weight $W_p$ for a voxel exists (i.e. assigned by the perception system 200) based on an occupancy threshold. The occupancy threshold indicates that the perception system 200 has a particular confidence that the voxel 212 is occupied based on the sensor data 134. For instance, the occupancy threshold is set to a count of a number of times the voxel 212 has been perceived as occupied based on the sensor data 134. In other words, if the occupancy threshold is set to a value of ten, when the perception system 200 encounters sensor data 134 that indicates the occupancy of a voxel 212 ten times, that voxel 212 is given a point weight $W_p$ designating its existence. In some implementations, the perception system 200 discounts the point weight $W_p$ designating the existence of a voxel 212 based on characteristics about the sensor data 134 (e.g., distance, type of sensor 132, etc.).

Referring back to FIG. 2C, in some implementations, the voxel map 210 includes a voxel height 212h (e.g., a voxel 212 of the third segment 214c is shown shaded in darker gray at a voxel height 212h). The voxel height 212h refers to a mean height of points within a voxel 212 where the perception system 200 identifies a presence of an object based on the sensor data 134. By including a voxel height 212h for each voxel 212, the voxel map 210 of the perception system 200 includes a greater level of accuracy than assuming that the object occupies the entire voxel 212. For instance, when the voxel 212 is three cubic centimeters, the voxel map 210 identifies heights of objects within a voxel 212 at a resolution greater than three cubic centimeters. This allows the perception system 200 to reflect real values for heights of objects (e.g., a ground height) instead of being discretized by a size of the voxel 212. In some examples, when the voxel map 210 includes the voxel height 212h, the perception system 200 tracks a variance for the height 212h of each voxel 212 over time.

Although voxel height 212h and a point weight $W_p$ for a voxel 212 have been generally discussed separately, the perception system 200 may generate a voxel map 210 including one or some combination of these characteristics. Moreover, regardless of the characteristics for the voxel map 210, the perception system 200 may be configured to disqualify sensor data 134 based on particular criteria. Some examples of criteria include the sensor data 134 is too light, too dark, from a sensor 132 too close to the sensed object, from a sensor 132 too far from the sensed object, or too near to a structure of the robot 100 (e.g., an arm or leg 120). For instance, a stereo camera sensor 132 may have limited accuracy when conditions for this sensor 132 meet this criteria (e.g., too bright, too dark, too near, or too far). By disqualifying sensor data 134 that has a tendency to be inaccurate, the perception system 200 ensures an accurate voxel map 210 that may be used by the control system 170 by the robot 100 to move about the environment 10 and perform activities within the environment 10. Without such accuracy, the robot 100 may risk collisions, other types of interference, or unnecessary avoidance during its maneuvering in the environment 10.

The perception system 200 may accumulate the voxel map 210 over time such that the voxel map 210 spans some or all portions of an environment 10 captured by the sensors 132 of the robot 100. Because the voxel map 210 may be quite large, an area centered immediately around the robot 100 may have greater accuracy than an area previously sensed by the sensor system 130 and perceived by the perception system 200. This may especially be true when the robot 100 has been away from a particular area of the voxel map 210 for a lengthy duration.

In some implementations, the point weight $W_p$ of voxels 212 within the voxel map 210 are gradually decayed over time. Gradual decay allows objects (i.e., occupied voxels 212) to have a temporal component such that objects that have been seen recently have a greater importance to the voxel map 210 than objects seen a long time ago. For instance, the perception system 200 reduces the point weight $W_p$ (i.e., the value of the point weight $W_p$) based on a gradual decay frequency (e.g., reduces the point weight $W_p$ by some factor (e.g., some percentage) every three seconds) for a voxel 212 that does not appear or does not accurately appear (e.g., not disqualified) within current sensor data 134. The gradual decay may be configured such that a point weight $W_p$ of an occupied voxel 212 cannot be reduced less than a particular threshold. Here, this point weight threshold may be another form of the occupancy threshold or its own independent threshold. By using a point weight threshold, the perception system 200 is aware that the space corresponding to the voxel 212 is occupied yet has not appeared in sensor data 134 recently (i.e., in a given time period).

In some examples, portions of a voxel map 210 are stored within the computing system 140 of the robot 100 and/or within the remote system 160 in communication with the computing system 140. For example, the perception system 200 transfers portions of the voxel map 210 with a particular point weight $W_p$ (e.g., based on a point weight storage threshold) to storage to reduce potential processing for the perception system 200. In other examples, the perception system 200 removes or eliminates portions of the voxel map 210 that satisfy a particular point weight $W_p$, such as a point weight removal threshold (e.g., below the point weight removal threshold). For instance, once the perception system 200 reduces the point weight $W_p$ for a voxel 212 to almost zero (or essentially zero), the perception system 200 eliminates the voxel 212 from the voxel map 210.

With point weights $W_p$ for each voxel 212, the perception system 200 may generate segments 214 based on the point weights $W_p$. In other words, in some configurations, the perception system 200 includes a segment generation threshold that indicates to ignore voxels 212 with a point weight $W_p$ below the segment generation threshold during segment generation. Therefore, the perception system 200 does not generate a segment 214 at a voxel 212 with a point weight $W_p$ below the segment generation threshold.

Figure 2H:
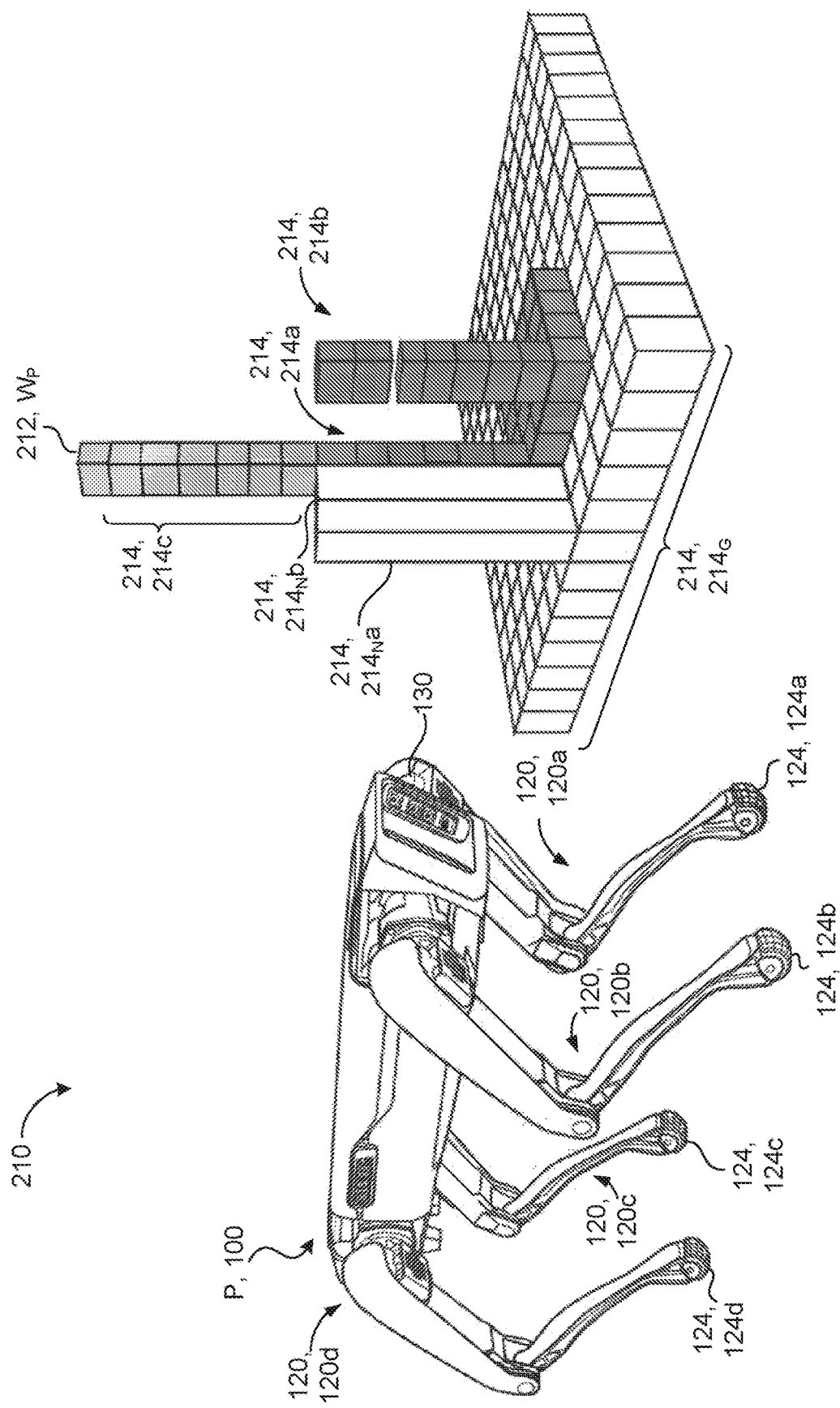
FIG. 2H is a perspective view of an example voxel map with negative segments.
Figure 21:

Referring to FIG. 2H, in some examples, the perception system 200 is configured to generate negative segments 214, $214_N$ (e.g., a first negative segment $214_N$a and a second negative segment $214_N$b). Negative segments 214, $214_N$ are representations of areas in the voxel map 210 that are known empty space. Negative segments $214_N$ allow a distinction between areas in a voxel map 210 that have been verified to have nothing and areas that are unknown. In other words, negative segments $214_N$ enable the perception system 200 to distinguish between places the robot 100 has seen and not seen (e.g., with the sensor system 130). In some examples, negative segments $214_N$ preserve processing resources for the perception system 200 because negative segments $214_N$ are not further divided (i.e., processed) into voxels 212. This prevents the perception system 200 from dedicating any further processing of known empty space. In some implementations, negative segments $214_N$ that have been generated by the perception system 200 are shrunk as the robot 100 moves away from a location associated with the negative segment $214_N$ (e.g., similar to decay). Here, a rate at which the perception system 200 shrinks the negative segments $214_N$ may be based on an estimated odometry drift for the robot 100 (i.e., a change of position evidenced by the odometry information).

Negative segments $214_N$ may aid the perception system 200 in classifying segments as ground versus an obstacle by providing an estimate of where the ground may be in places that have not been perceived. For example, when the perception system 200 has not identified the ground (e.g., classified the ground), but the perception system 200 has identified that there are negative segments $214_N$ in a particular range of the voxel map 210, the perception system 200 may assume that the ground is somewhere below the negative segment range even though the sensor system 130 has not seen (i.e., not sensed) the area below the negative segment range. Stated differently, the negative segments $214_N$ may place an upper bound on unseen areas of the voxel map 210 because the perception system 200 may generate negative segments $214_N$ (i.e., known empty space) above the upper bound of unseen areas. For example, if the perception system 200 sensed both the first negative segment $214_N$a and the second negative segment $214_N$b, but not the ground segments $214_G$ beneath each negative segment $214_N$a-b. Then, the perception system 200 may assume that the ground segments $214_G$ exist below the perceived negative segments $214_N$a-b. Additionally or alternatively, negative segments $214_N$ allow the perception system 200 to infer a height of unseen terrain for a near map 220 generated by the perception system 200.

In some examples, the perception system 200 utilizes a concept of ray tracing to remove data from the voxel map 210. Traditionally, ray tracing refers to a technique to trace a line between sensor data 134 (e.g., a point cloud) and the sensor 132 generating the sensor data 132. Based on this technique, when a sensor 132 senses an object at some distance, it may be presumed that a line between the object and the sensor 132 is unimpeded. Therefore, by tracing the line between the object and the sensor 132, the ray tracing technique checks for the presence of something on that line. Ray tracing may be advantageous because an object may be physically moving around in the environment 10 of the robot 100. With a physically moving object, the perception system 200 may generate a voxel map 210 with the moving object occupying space that the moving object does not currently occupy; therefore, potentially introducing false obstacles for the robot 100. By using a technique based on ray tracing, the perception system 200 generally applies a processing strategy that if the sensor system 130 can currently see through (e.g., point cloud now extends beyond the range of an original point cloud for a given space) a portion of the environment 10 where previously the perception system 200 perceived an object (e.g., one or more voxels 212), the original portion of the voxel map 210 corresponding to the previously perceived object should be removed or at least partially modified. In other words, a current set of sensor data 134 (e.g., image data) indicates that an object perceived from a previous set of sensor data 134 (e.g., original sensor data 134) is no longer accurately portrayed by the voxel map 210. Additionally or alternatively, the technique based on ray tracing may also help when there is odometry drift or when false objects appear in the voxel map 210 due to sensor noise.

Referring to FIGS. 2I-2L, in some examples, the perception system 200 is configured to perform a modified approach to ray tracing. Instead of tracing a line between the sensor 132 and the sensor data 134, the perception system 200 constructs a spherical depth map 218 for the sensor data 134 (e.g., a most recent set of sensor data 134 that the perception system 200 receives). With the spherical depth map 218 of sensor data 134, the perception system 200 compares the spherical depth map 218 to the voxel map 210 that the perception system 200 has generated thus far. In some examples, the perception system 200 performs the comparison on a segment level such that the perception system 200 compares existing segments 214 of the voxel map 210 to the spherical depth map 218. By comparing the spherical depth map 218 to the voxel map 210, the processing for the perception system 200 is more computationally efficient than a traditional ray tracing approach. Equations (1) and (2) below illustrate the computational cost between the traditional ray tracing technique of equation (1) and the modified ray tracing approach of equation (2).

$$\text{Cost}_{trad} = O(N_p * R) \quad (1)$$

$$\text{Cost}_{mod} = O(N_p + N_S) \quad (2)$$

where $O(f(N))$ is a set of N number of objects in the environment 10. Here, the computational cost of the traditional ray tracing, as shown in equation (1), is a factor of a number of points $N_p$ (i.e., points corresponding to sensor data 134) scaled by R, where R represents how many voxels 212 a ray (i.e., trace line) passes through on average. In contrast, the computational cost of the modified ray tracing approach, as shown in equation (2), is a factor of a sum of the number $N_p$ of points and a number $N_s$ of segments 214 involved in the comparison. Since the computational cost of traditional ray tracing is scaled by R rather than a sum that includes the number $N_S$ of segments, traditional ray tracing is generally several factors more computationally expensive than the modified ray tracing approach.

In some implementations, the perceptions system 200 compares the existing voxel map 210 to the spherical depth map 218 by performing a comparison between columns. In other words, each column (i.e., vertical plane or z-plane) of the voxel map 210 corresponds to a column of the spherical depth map 218. For each segment 214 in the column, the perception system 200 checks a height range of the corresponding column of the spherical depth map 218 to determine whether the sensor data 134 forming the spherical depth map 218 sensed further than segment 214. In other words, when the perception system 200 encounters a segment 214 in a column from the voxel map 210 that matches a height range from a column at the same location in the spherical depth map 218, the perception system 200 does not update the voxel map 210 by removing the segment 214 (i.e., the sensor data 134 forming the spherical depth map 218 validates the presence of the segment 214 in the voxel map 210). On the other hand, when the perception system 200 encounters a segment 214 in a column from the voxel map 210 that does not match a height range from a column at the same location in the spherical depth map 218, the perception system 200 updates the voxel map 210 by removing the segment 214 (i.e., the sensor data 134 forming the spherical depth map 218 validates that the segment 214 in the voxel map 210 is no longer present). In some examples, when the height range changes (e.g., when the underlying object slightly moves), the perception system 200 modifies the corresponding segment 214 of the voxel map 210 instead of removing it completely. From a voxel perspective, the comparison process uses the sensor data 134 forming the spherical depth map 218 to confirm that a voxel 212 no longer occupies the location where the perception system 200 removed or modified the segment 214. Here, the sensor data 134 forming the spherical depth map 218 includes a current set of sensor data 134 (e.g., image data) obtained after the original sensor data 134 forming the voxel map 210.

Figure 2J:
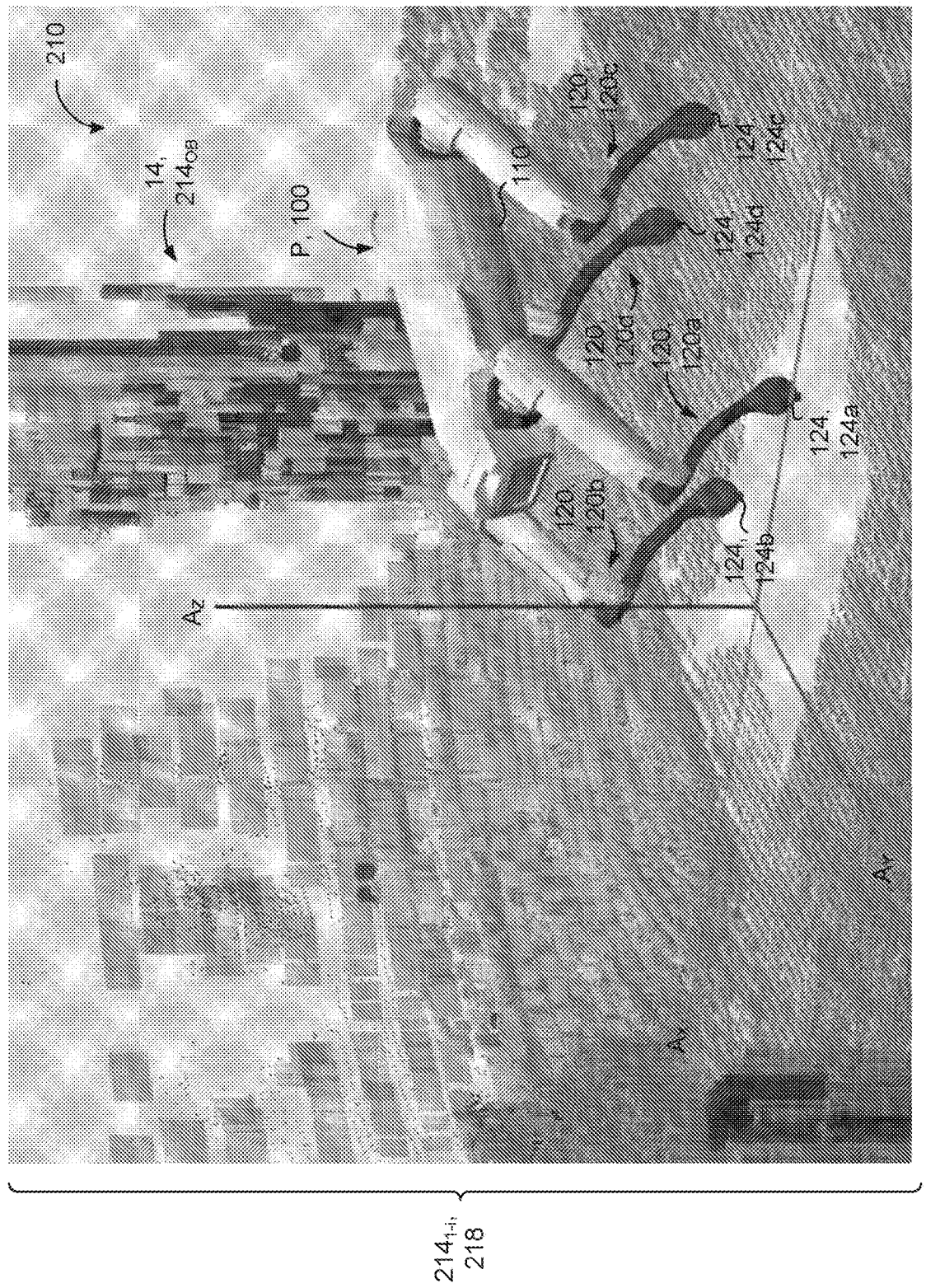

As shown in FIGS. 2I and 2J, in some configurations, the spherical depth map 218 is a spherical representation of the sensor data 134. As a spherical representation, the perception system 200 may construct the spherical depth map 218 by forming rectangular structures at a distance (e.g., in the x-y plane) and a height (e.g., in the z-plane) from each sensor 132 that generates the sensor data 134 about the robot 100. For instance, FIG. 2I illustrates the rectangular structures defined by points of the sensor data 134. FIG. 2J depicts the spherical depth map 218 overlaid on the sensor data 134 (shown in FIG. 2I) and the current segments $214_{1-i}$ of the voxel map 210. Here, an object 14 (e.g., the lower portion of a person) is shown as an obstacle segment $214_{OB}$ near the robot 100. Stated differently, the robot 100 is at a center of a sphere (or three dimensional shape) that extends radially based on a range of the sensors 132. In some examples, the robot 100 (e.g., the perception system 200) divides this sphere into wedges or pyramid-shaped sections where an apex of the section corresponds to the robot 100. The size of the section may vary depending on the configuration of the perception system 200. In some examples, with this sectional approach, the base of a pyramid-shaped section forms the rectangular structures of the spherical depth map 218.

Figure 2K:
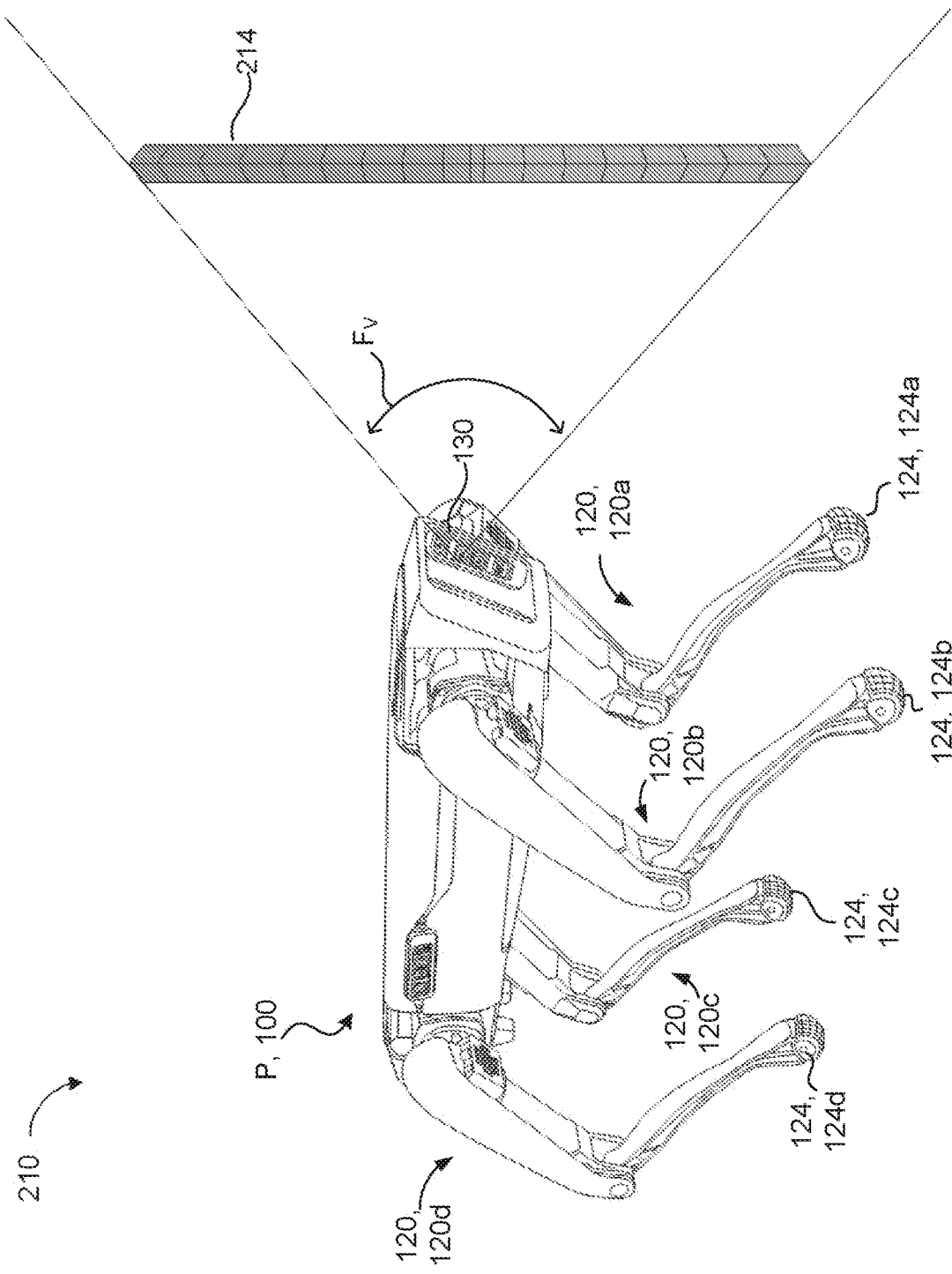
Figure 2L:
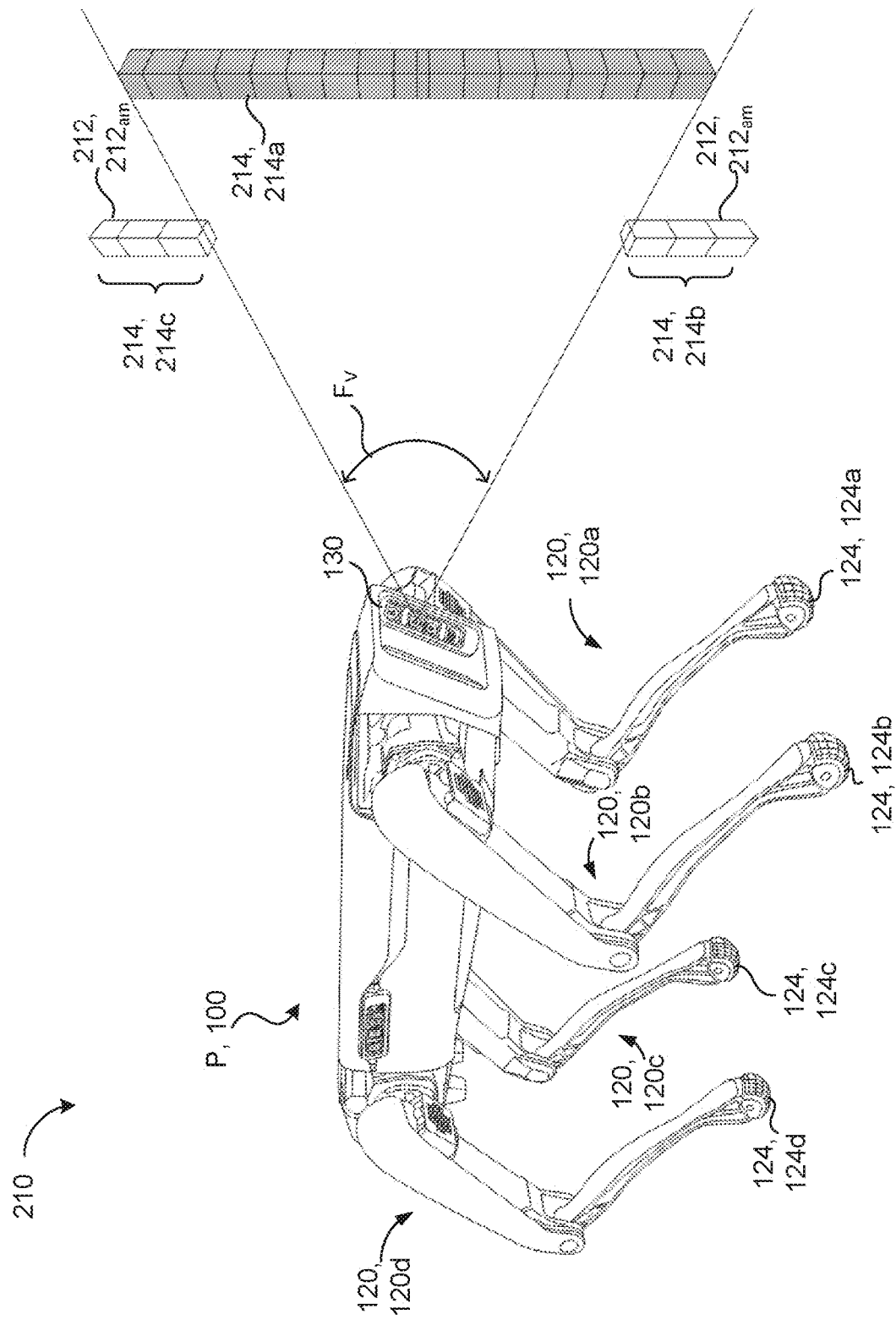

Referring to FIGS. 2K and 2L, when both the robot 100 and an object 14 (e.g., the person shown in FIGS. 2I and 2J) within the environment 10 move, there is interaction with the changing field of view $F_V$. For instance, the sensor system 130 may see an entire person in a location when the robot 100 is at a particular distance from the person. For example, the segment 214 in FIG. 2K corresponds to the person. Yet when the robot 100 approaches the person as shown in FIG. 2L, the sensor system 130 senses less than the entire person (e.g., the sensor data 134 captures the person from knees to hips). In these scenarios, when the person moves away from that location, the perception system 200 perceives that the person from knees to hips is no longer present based on the modified ray tracing, but may be unable to associate that other segments 214 (e.g., shown as a second segment 214b and a third segment 214c) that corresponded to the person below the knees and above the hips are no longer present as well. In other words, the robot 100 lacks a way to associate segments 214 during removal or modification by the perception system 200; causing artifacts of the person to be inaccurately present in the voxel map 210. To counteract this issue, when the perception system 200 removes voxels 212 and/or segments 214 by the modified ray tracing approach, the perception system 200 uses heuristics to identify and to remove nearby ambiguous voxels $212_{am}$ that are likely part of the same underlying object.

In some examples, the voxel map 210 includes color visualization for voxels 212 and/or segments 214. For example, the perception system 200 may communicate the voxel map 210 with color visualization to a debugging program of the robot 100 to allow an operator visually to understand terrain issues for the robot 100. In another example, the perception system 200 conveys the voxel map 210 with visualization to an operator of the robot 100 who is in control of movement of the robot 100 to enable the operator to understand the surroundings of the robot 100. The manual operator may prefer the visualization, especially when the robot 100 is at a distance from the operator where the operator visualize some or all of the surroundings of the robot 100.

Figure 3B:
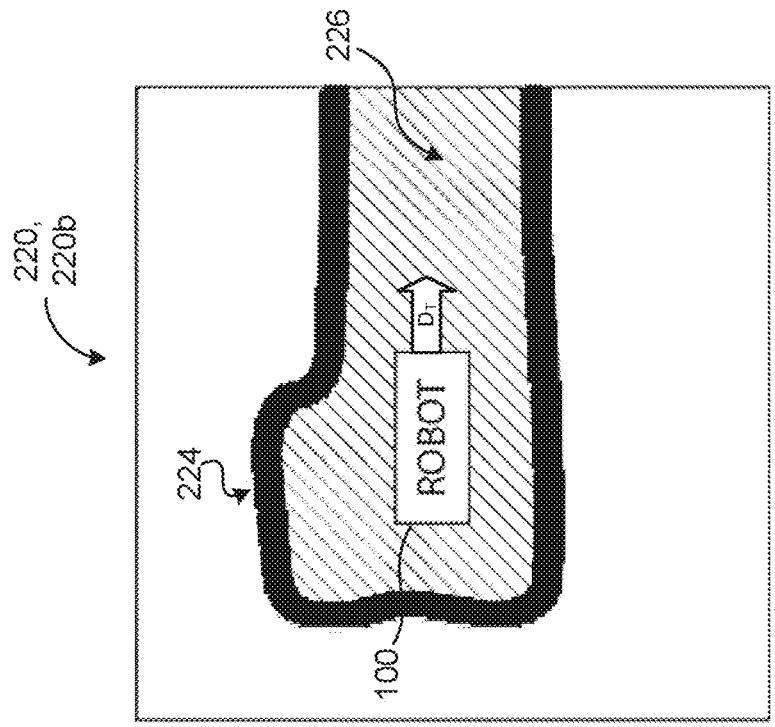
Figure 3A:
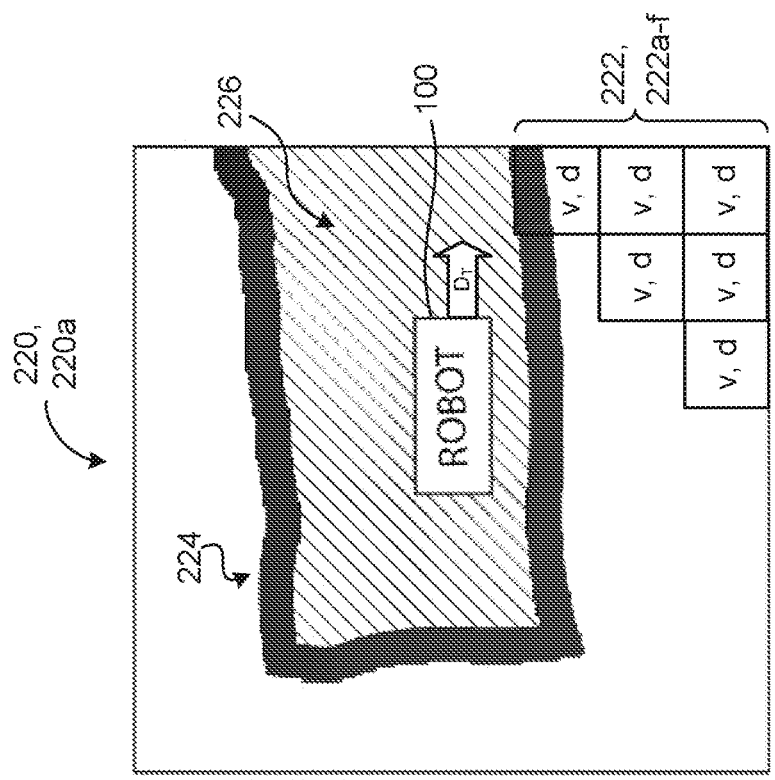

Referring to FIGS. 3A-3L, based on the voxel map 210, the perception system 200 is configured to generate one or more body obstacle maps 220. The body obstacle map 220 generally determines whether the body 110 of the robot 100 may overlap a location in the X-Y plane with respect to the robot 100. In other words, the body obstacle map 220 identifies obstacles for the robot 100 to indicate whether the robot 100, by overlapping at a location in the environment 10, risks collision or potential damage with obstacles near or at the same location. As a map of obstacles for the body 110 of the robot 100, systems of the robot 100 (e.g., the control system 170) may use the body obstacle map 220 to identify boundaries adjacent, or nearest to, the robot 100 as well as to identify directions (e.g., an optimal direction) to move the robot 100 in order to avoid an obstacle. In some examples, much like other maps 210, 230, 240, the perception system 200 generates the body obstacle map 220 according to a grid of cells 222 (e.g., a grid of the X-Y plane). Here, each cell 222 within the body obstacle map 220 includes a distance d from an obstacle and a vector v pointing to the closest cell 222 that is an obstacle (i.e., a boundary of the obstacle). For example, although the entire body obstacle map 220 may be divided into cells 222 (e.g., a 128×128 grid of three centimeter cells), FIG. 3A illustrates six cells 222, 222a-f that each include a vector v and a distance d to the nearest boundary of an obstacle.

Referring to FIGS. 3A and 3B, in some examples, the perception system 200 derives two body obstacle maps 220a, 220b from the voxel map 210, a first body obstacle map 220, 220a and a second body obstacle map 220, 220b. As shown in FIG. 3A, the first body obstacle map 220a (also referred to as a standard obstacle map 220a) generated by the perception system 200 allows a step locator 176 of the control system 170 to generate a step plan that identifies foot placement locations for the robot 100. In FIG. 3B, the second body obstacle map 220b (also referred to as an extended obstacle map 220b) generated by the perception system 200 allows a body path generator 174 of the control system 170 to define a coarse trajectory for the body 110 of the robot 100 (e.g., horizontal motion, such as translation, and yaw rotation of the body 110). Generally speaking, the standard obstacle map 220a is a lesser processed map 220 than the extended obstacle map 220b, and therefore may be considered a truer representation of real physical obstacles within the environment 10. As the more processed map 220, the extended obstacle map 220b includes a potential field representation for obstacles within the environment 10.

With continued reference to FIGS. 3A and 3B, each map 220 includes body obstacle regions 224 (e.g., shown in black) and no body obstacle regions 226 (e.g., shown as a diagonal cross-hatched pattern). Body obstacle regions 224 refer to areas of the body obstacle map 220 (e.g., one or more cells 222) where the perception system 200 identifies an obstacle based on the voxel map 210. For instance, the body obstacle regions 224 correspond to cells 222 that are located on the boundary of an object (i.e., cells that spatially represent a boundary of an object) and that the perception system 200 designated as an obstacle during voxel/segment classification. In contrast, no body obstacle regions 226 refer to areas of the body obstacle map 220 (e.g., one or more cells 222) where the perception system 200 does not identify an obstacle based on the voxel map 210. In some implementations, these regions 224, 226 may be further processed by the perception system 200 (e.g., to modify the regions 224, 226). For instance, the perception system 200 modified the body obstacle region 224 in the direction of travel DT for the robot 100 to be narrower in the extended body obstacle map 220b of FIG. 3B when compared to the standard body obstacle map 220a of FIG. 3A.

In some configurations, initially, the perception system 200 generates both body obstacle maps 220a-b in a similar processing manner. Because the voxel map 210 includes classifications of whether an obstacle exists or does not exist in a particular location of the voxel map 210 (e.g., a cell of the voxel map 210), the perception system 200 translates this obstacle/no obstacle designation to each corresponding location of the body obstacle maps 220. Once the obstacles or lack thereof are represented within the body obstacle maps 220 (e.g., as regions 224, 226), the perception system 200 filters each body obstacle map 220 to remove small areas with low weight (e.g., poor sensor data 134). In some examples, the filtering process by the perception system 200 modifies the information translated from the voxel map 210 by dilation, elimination of low-weighted areas, and/or erosion. Here, a low-weighted area refers to an area with some combination of a height of a segment 214 and a point weight for that segment 214 as identified by the voxel map 210. In other words, during filtering, the perception system 200 may include one or more thresholds for the height of a segment 214 and/or a point weight of a segment 214 in order to designate when to remove segments 214 from an area of the body obstacle maps 220a-b. This removal aims to eliminate sensor noise (i.e., poor sensor data) while preserving representations of real physical objects. Additionally or alternatively, when forming body obstacle maps 220, the perception system 200 marks an area underneath the robot's current pose P and prevents new obstacles from being marked in that area.

Figure 3C:
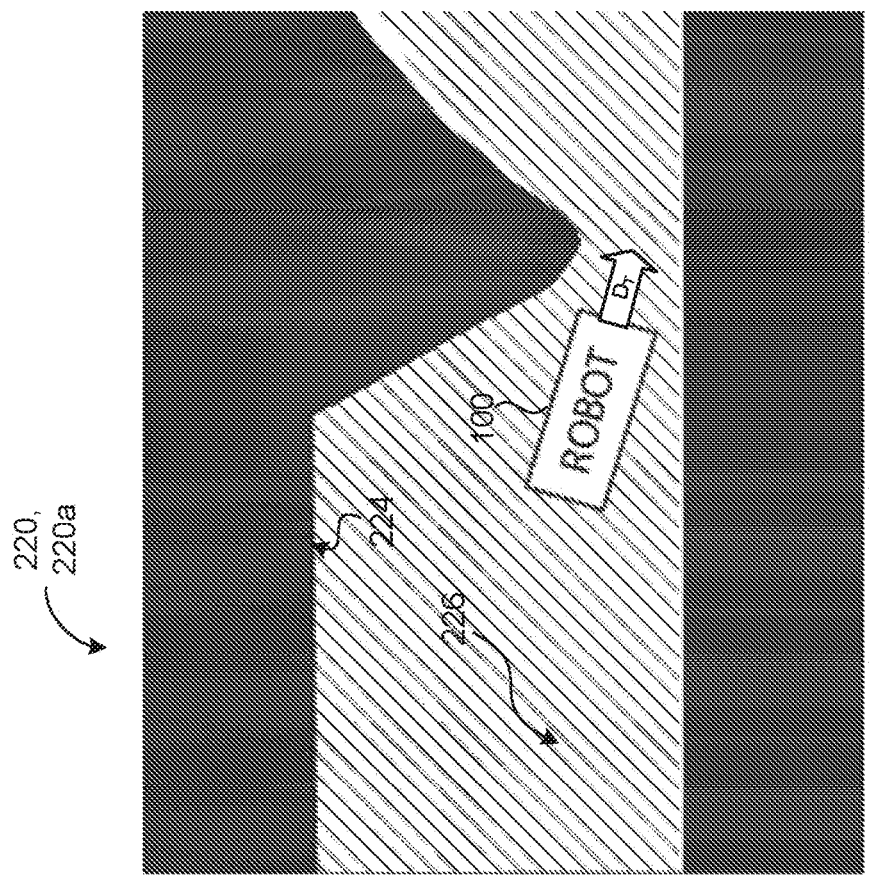
Figure 3D:
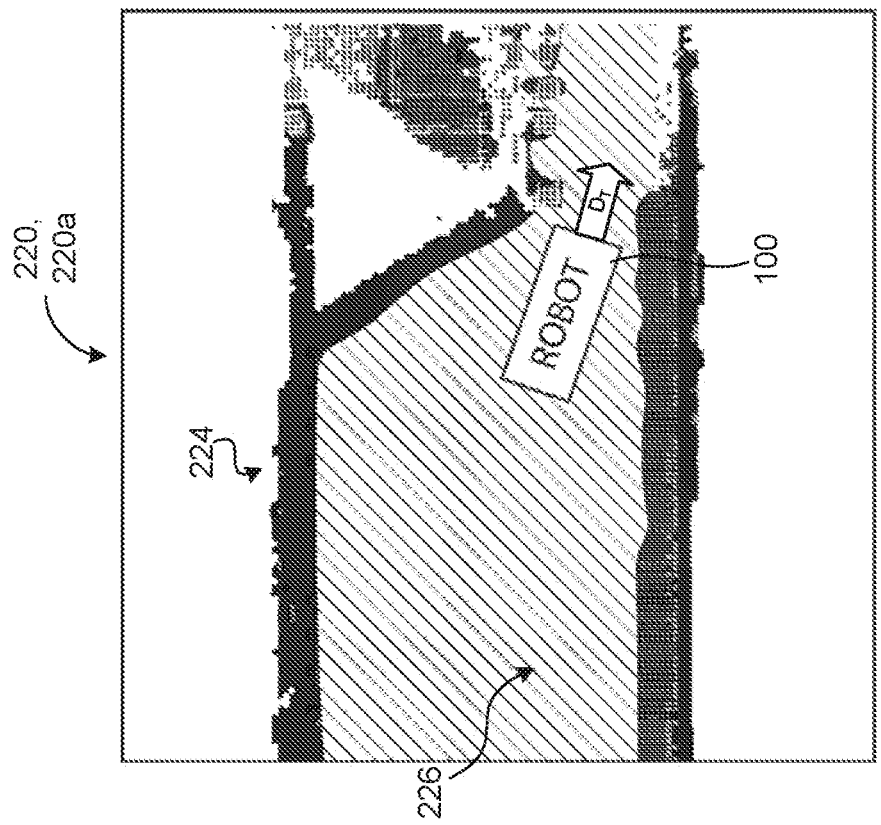

Referring to FIGS. 3C and 3D, in some configurations, the perception system 200 further processes the standard body map 220a to include obstacle shadows. Obstacle shadows are expansions of obstacles (e.g., body obstacle regions 224) that enable the step locator 176 to more effectively perform constraint extraction. Without obstacle shadows, the step locator 176 may have difficulty with constraint extraction for thin obstacles, such as walls, represented by a body obstacle map 220. For instance, FIG. 3C shows thin features (e.g., thin walls) for body obstacle regions 224 within the body obstacle map 220 before the perception system 200 expands the body obstacle regions 224 to include obstacle shadows as FIG. 3D illustrates with thickened features (i.e., larger body obstacle regions 224). Here, the thickened features occur by the perception system 200 designating one or more adjacent cells to cells of a body obstacle region 224 as part of that same body obstacle region 224. In some examples, the obstacle shadows fill an area behind obstacles all the way to an edge of the map. This approach generates shadows directionally, such that a wall would have a true distance to the robot 100 at its front (i.e., that faces the robot 100), but only be thicker with an obstacle shadow on its back side (i.e., the side that does not face the robot 100).

Referring to FIGS. 3E-3L, the extended body obstacle map 220b includes one or more obstacle-based features 228, such as user-defined regions $228_{UR}$ (FIGS. 3E-3G), a gap-filled region $228_{GF}$ (FIG. 3H), and/or vector fields $228_{VF}$ (FIGS. 3I-3L). In some examples, an operator of the robot 100 includes user-defined regions $228_{UR}$ in the extended body obstacle map 220b. User-defined regions $228_{UR}$ refer to shapes (e.g., polygons) that an operator inserts into the extended body obstacle map 220b to generate an obstacle (i.e., a virtual obstacle forming and/or modifying a body obstacle region 224). For example, an operator limits how far the robot 100 is able to wander off a course. The operator may interact with an interface (e.g., an application programming interface (API)) to draw or to select a shape to insert into the extended body obstacle map 220b. For instance, the interface is a controller (e.g., a remote control) or some type of terminal (e.g., display of a computer). In some implementations, based on the user-defined region $228_{UR}$ generated by the operator, the perception system 200 translates the user-defined region $228_{UR}$ into body obstacle regions 224 on the extended body obstacle map 220b. These user-defined regions $228_{UR}$, as portions of the extended body obstacle map 220b, may result in further restriction for the path of travel for the robot 100. For example, FIG. 3E depicts two user-defined regions $228_{UR}$, $228_{UR}$a-b that modify the body obstacle region 224 shown in FIG. 3F based on the square shape of a first user-defined region $228_{UR}$a. Here, the user-defined region $228_{UR}$a are configured to indicate a virtual obstacle such that the perception system 200 integrates a portion of the user-defined region $228_{UR}$a that intersects the body obstacle region 224 into the body obstacle region 224. The user-defined region $228_{UR}$ may be designated a body obstacle (e.g., to integrate with one or more body obstacle regions 224) or not an obstacle (e.g., to integrate with one or more no body obstacle regions 226). Although the user-defined regions $228_{UR}$ may impact a body trajectory for the robot 100, user-defined regions $228_{UR}$ are not input into the step locator 176 to avoid the step locator 176 from reacting to fake obstacles (i.e., virtual objects).

Figures 3G, 3H:
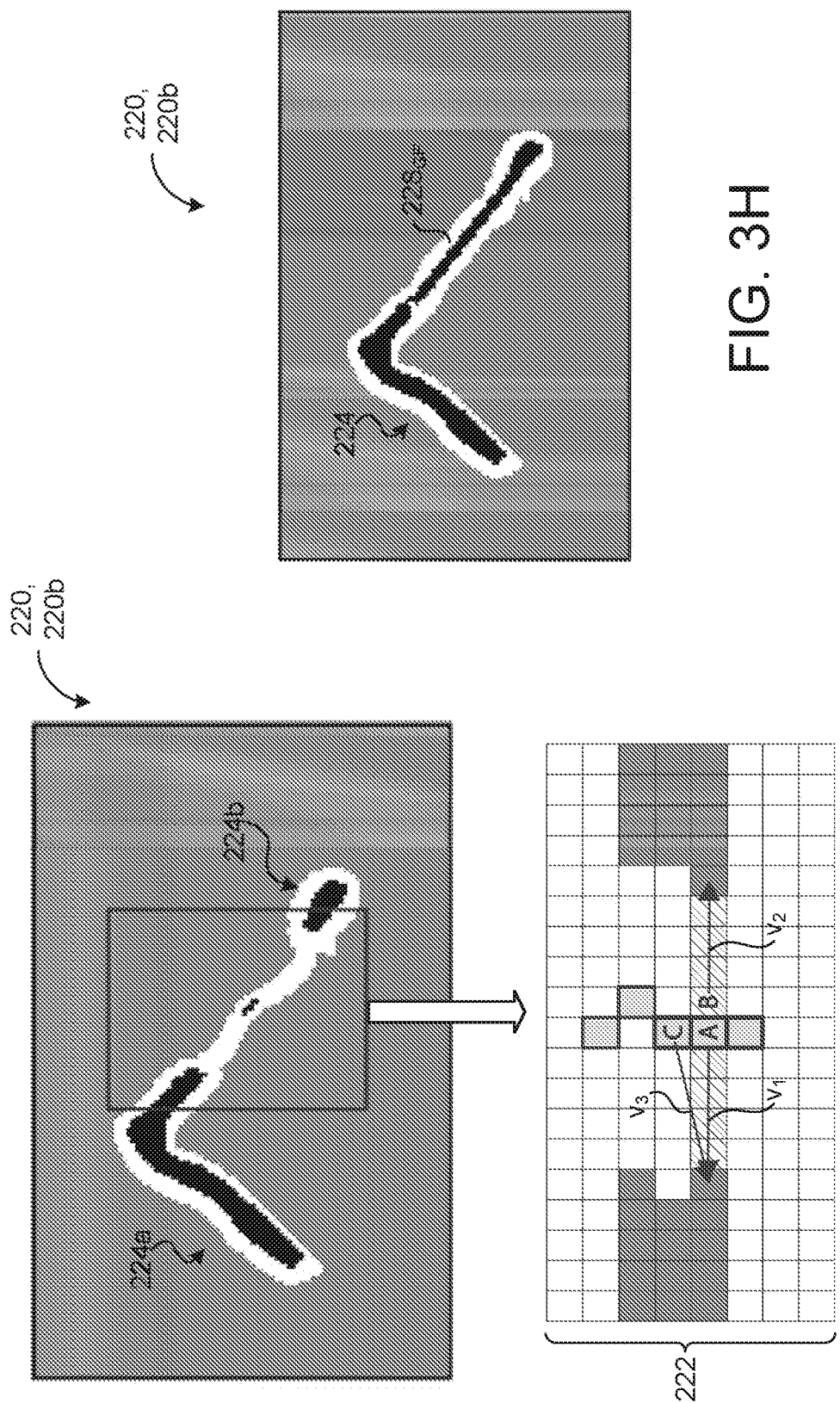

Referring to FIGS. 3G and 3H, in some configurations, the extended body obstacle map 220b includes a gap filler forming gap-filled region(s) $228_{GF}$. Gap filling is a processing technique by the gap filler of the perception system 200 that forms gap-filled regions $228_{GF}$ by filling in narrow gaps. For example, the perception system 200 forms the gap-filled regions $228_{GF}$ by filling in narrow gaps equal or almost equal to a width of the robot 100. With a gap filler, the perception system 200 is configured to form gap-filled regions $228_{GF}$ to make a clear distinction about what size passages the robot 100 can fit through. In some examples, the gap filler forms gap-filled regions $228_{GF}$ at a cell by cell basis according to a distance d and a vector v to the nearest obstacle boundary that is included in each cell 222. For a given cell 222, the gap filler identifies the cell's nearest obstacle boundary and at least two neighboring cell's nearest obstacle boundaries. When two of three of the identified obstacle boundaries are separated by a distance that satisfies a distance fill threshold (e.g., a predetermined distance range), the gap filler fills the cells spanning the distance (i.e., fills the gaps) forming a gap-filled region $228_{GF}$. By gap filling, the gap filler ensures that the robot 100 avoids forcing itself into a narrow, and potentially impassable, passage. This seeks to prevent the robot 100 from getting stuck or jammed in a narrow passage especially when the voxel map 210 and the extended body obstacle map 220 may change or update based on the sensor system 130 (e.g., constant receipt of sensor data 134). Much like the user-defined regions $228_{UR}$, the perception system 200 does not communicate gap-filled regions $228_G$F to the step locator 176. The step locator 176 may need to utilize gap-filled region(s) $228_G$F to maintain balance (e.g., from a slip or trip).

For example, FIG. 3G depicts two body obstacle region 224a-b with a gap between each region 224. As shown, the perception system 200 identifies cells 222 (labeled A, B, and C) and determines the nearest obstacle boundary for each cell 222 (e.g., shown as vectors $v_{1-3}$). Here, the perception system 200 (e.g., by the gap filler) determines that cell A and cell B identify different nearest obstacle boundaries and that the distance between these identified nearest obstacle boundaries is less than the distance fill threshold. Based on this determination, the gap filler fills the cross-hatched cells 222 forming a gap-filled region $224_{GF}$ spanning the cross-hatched cells as shown in FIG. 3H. FIG. 3H illustrates that this process bridges two body obstacle regions 224a, 224b (FIG. 3G) to form a single body obstacle region 224 that includes the gap-filled region $228_{GF}$.

Figure 3J:
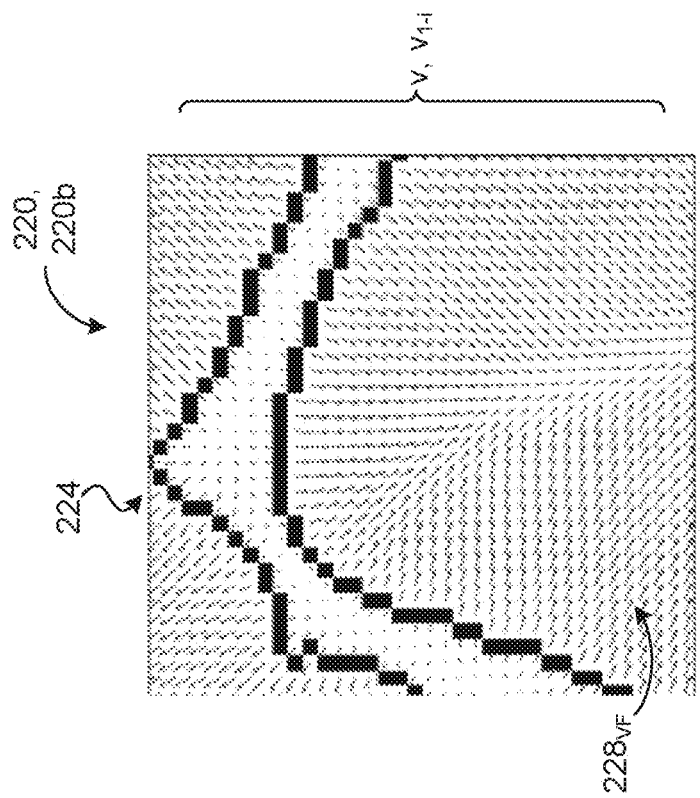
Figure 3I:
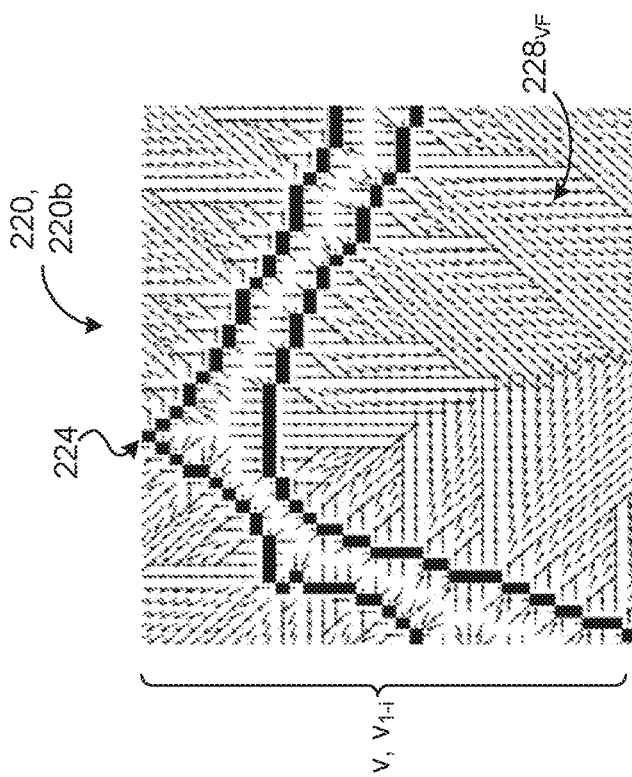

Referring to FIGS. 3I-3L, in some examples, the extended body obstacle map 220b includes vector fields $228_{VF}$ as an obstacle-based feature 228. With vector fields $228_{VF}$, the extended body obstacle map 220b may allow potential field-based obstacle avoidance. In other words, the control system 170 (e.g., during body trajectory generation) may avoid obstacles by following the directions of vectors v, $v_{1-i}$ forming the potential field. Here, a direction of a vector v of the vector field $228_{VF}$ is defined for each cell 222 by reversing the direction to the nearest obstacle boundary included in each cell 222 of a body obstacle map 220. Unfortunately without further processing of the field directions (i.e., collective directions) for the vector field $228_{VF}$, the direction of a vector v may change abruptly from cell 222 to cell 222 (e.g., adjacent cells) because the raw field direction derived from the nearest boundary vector v is not smooth and often causes a control system to suffer from trajectory chatter. If left in this state, the field directions would likely disrupt potential field-based obstacle avoidance (e.g., by abrupt control maneuvers). For example, FIG. 3I depicts the raw vector field $228_{VF}$ with abrupt direction changes causing the overall vector field $228_{VF}$ to appear jagged and thus result in an overall disruptive potential field.

As shown in FIG. 3J, to prevent disruption to potential field-based obstacle avoidance, the perception system 200 performs further processing to smooth the raw vector field $228_{VF}$ so that a meaningful vector field $228_{VF}$ can be used for the body trajectory of the robot 100. In some examples, the perception system 200 smooths the raw vector field $228_{VF}$ by a smoothing kernel. For instance, the smoothing kernel is an averaging filter over a square area of cells 222. The smoothing kernel is an image processing technique that may normalize vectors v in raw vector form. For the extended body obstacle map 220b, the smoothing may be particularly important when multiple obstacles have overlapping regions of influence; meaning that nearby obstacles may influence each other's vector field $228_{VF}$. Referring to FIGS. 3K and 3L, two nearby L-shaped obstacles are represented by a first body obstacle regions 224a and a second body obstacle region 224b. Each body obstacle region 224a, 224b contributes to the raw vector field $228_{VF}$ as depicted by a first vector field $228_{VF}a$ associated with the first body obstacle region 224a and a second vector field $228_{VF}b$ associated with the second body obstacle region 224b. Due to the adjacency of these obstacles, FIG. 3K depicts that a raw potential field of the obstacles includes an overlapping region of influence forming a sharp valley in the raw vector field $228_{VF}$. If the control system 170 of the robot 100 attempted to operate a potential field-based obstacle avoidance in the sharp valley of this raw potential field $228_{VF}$, the robot 100 would encounter a lot of side to side chattering (e.g., bouncing back and forth) based on the direction and the magnitude of the vectors v for the raw potential field. Here, the processing technique of smoothing by the perception system 200 is shown in FIG. 3L to adjust the magnitudes of vectors v with the vector field $228_{VF}$ to a traversable path PT for the robot 100. In other words, smoothing identifies that between the middle of these two obstacles there is a traversable path PT formed by an overlapping canceling effect of the potential fields $228_{VF}$ of each obstacle.

In some examples, the smoothing technique by the perception system 200 causes changes in the direction of the vector v to the nearest boundary. To illustrate, for a narrow gap, the smoothing technique may form a vector field $228_{VF}$ with a potential field that prevents the robot 100 from entry into the narrow gap or squeezes the robot 100 out of an end of the narrow gap. To correct changes in the direction of the vector v to the nearest boundary, the perception system 200 rescales the distance between vectors v after smoothing. To rescale distances between vectors v, the perception system identifies locations (e.g., cells 222) where the vector direction was drastically changed by the smoothing technique. For instance, the perception system 200 stores the vector fields $228_{VF}$ before the smoothing technique (e.g., the raw field vectors based on the vector to the nearest boundary) and compares these vector fields $228_{VF}$ to the vector fields $228_{VF}$ formed by the smoothing technique, particularly with respect to directions of vectors v of the vector fields $228_{VF}$. Based on this comparison, the perception system 200 reevaluates a distance to obstacle(s) based on the new direction from the smoothing technique and adjusts magnitudes of vectors v in the new direction according to the reevaluated distances. For instance, when there is not an obstacle along the new direction from the smoothing technique, the perception system 200 scales the magnitude of the vector v to zero. In some examples, the comparison between vector fields $228_{VF}$ before and after the smoothing technique identifies vectors v that satisfy a particular direction change threshold to reduce a number of vectors v that the perception system 200 reevaluates.

Figure 4A:
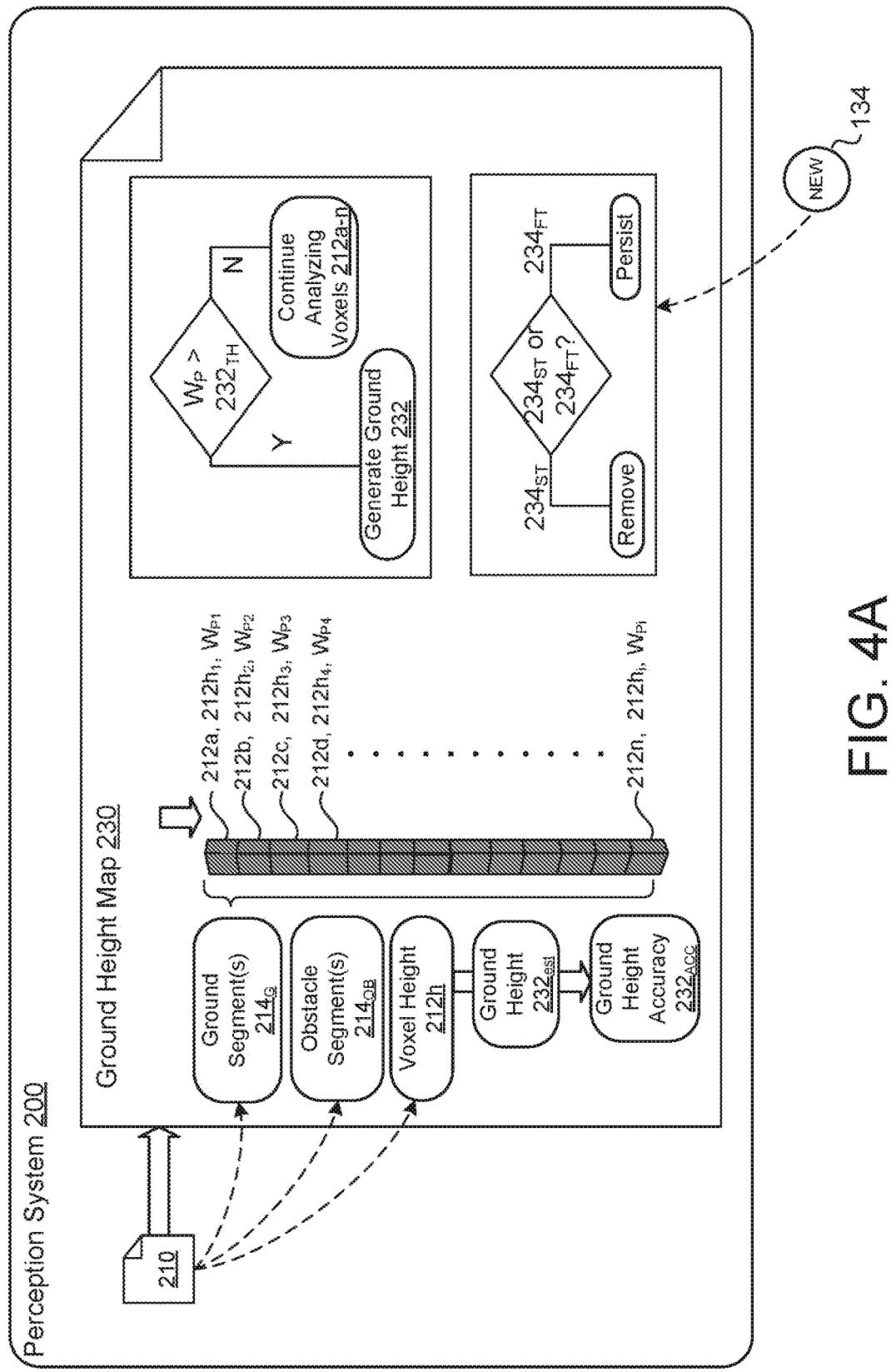
FIG. 4A is a schematic view of an example of ground height map generation by the robot of FIG. 1A.
Figure 4B:
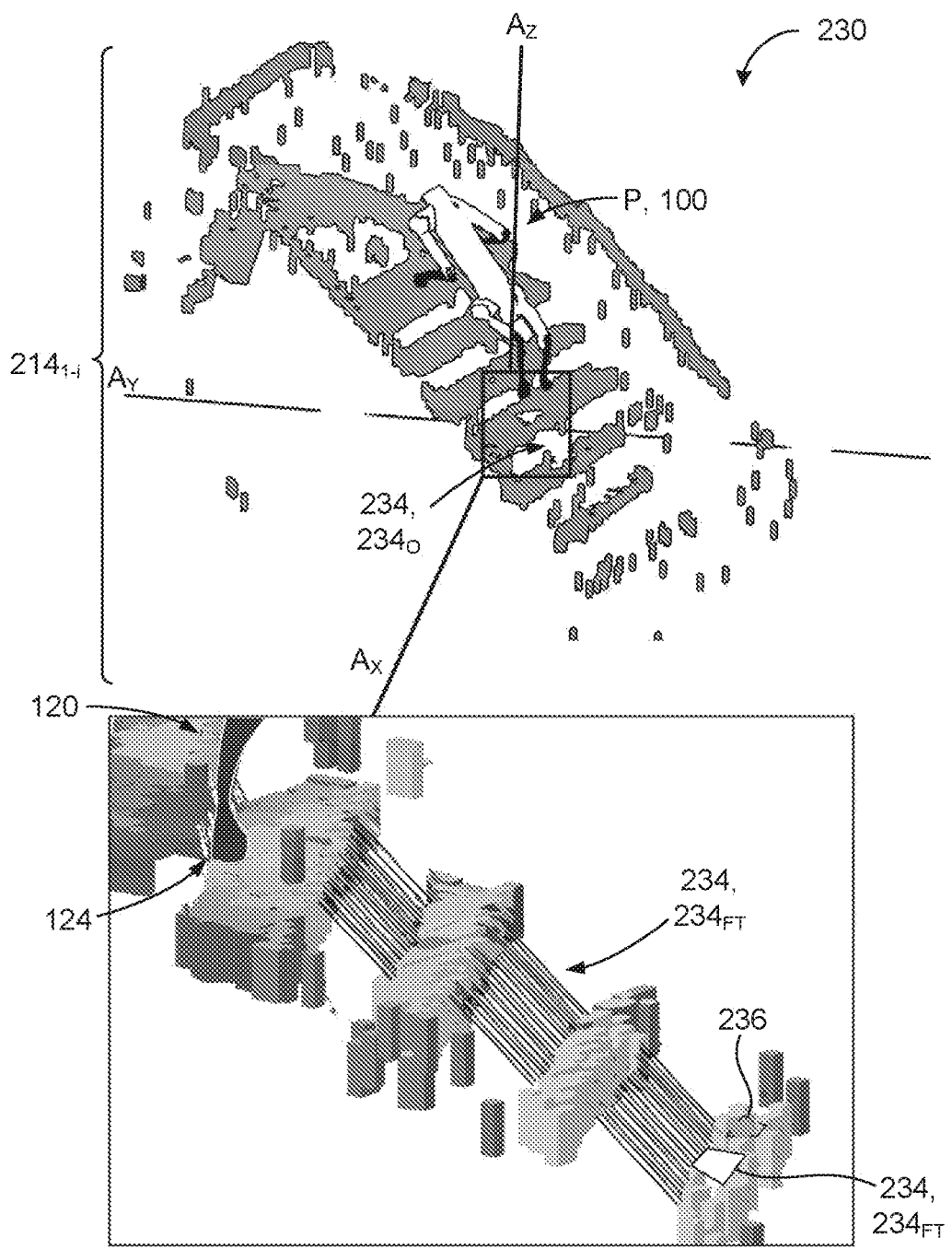
FIG. 4B is a perspective view of an example of a ground height map generated by the robot of FIG. 1A.

Referring to FIGS. 4A and 4B, the perception system 200 generates the ground height map 230 based on the voxel map 210. In some implementations, the ground height map 230 functions such that, at each X-Y location (e.g., designated as a cell of the ground height map 230), the ground height map 230 specifies a height 232. In other words, the ground height map 230 conveys that, at a particular X-Y location in a horizontal plane, the robot 100 should step at a certain height. For instance, the ground height map 230 is a 2.5-dimensional (2.5D) map. For practical illustration, if a portion of a table and a portion of the ground exists at an X-Y location, the ground height map 230 communicates a height 232 of the ground (i.e., the location where the robot 100 should step) while ignoring the table.

In some examples, the perception system 200 forms the ground height map 230 by translating segments 214 classified as ground G (i.e., ground segments $214_G$) in the voxel map 220 to the ground height map 230. For instance, the ground height map 230 and the voxel map 210 use the same grid system such that a ground classification at a particular location in the voxel map 210 may be directly transferred to the same location in the ground height map 230. In some implementations, in cells where the voxel map 210 does not include a segment classified as ground, the perception system 200 generates a segment classified as obstacle (i.e., an obstacle segments $214_{OH}$) in the ground height map 230.

When translating the height for each segment 214 of the voxel map 210 classified as ground to the ground height map 230, the perception system 200 attempts to communicate an accurate representation of the height of the segment 214 to ensure ground accuracy. To ensure accuracy, in some examples, for each segment 214 classified as ground, the perception system 200 analyzes the segment 214 beginning at a top of the segment 214 (i.e., highest z-point on the segment 214) and works its way down along the segment 214 (e.g., along voxels 212 corresponding to the segment 214). For example FIG. 4A depicts a ground segment $214_G$ with an arrow indicating a start of the analysis for each voxel 212a-n at the highest z-height of the ground segment $214_G$. During this analysis, the perception system 200 determines whether a particular point weight $W_P$ worth of points satisfies a height accuracy threshold $232_{TH}$. Here, the height accuracy threshold $232_{TH}$ indicates a level of accuracy in the height 232 of an object. Since the point weight $W_P$ is configured such that the larger the point weight $W_P$, the more confident a voxel's and/or segment's representation is regarding a presence of an underlying object, a height accuracy threshold $232_{TH}$ helps guarantee confidence that the voxel map 210 translates an accurate height 232 to the ground height map 230 for segments 214 classified as ground. In some examples, when the perceptions system 200 determines that enough point weights $W_P$ worth of points satisfy the height accuracy threshold $232_{TH}$ (e.g., exceed the height accuracy threshold), the perception system 200 communicates an average height of the points as the height 232 of the classified ground segment $214_G$ to the ground height map 230. By using this top-down approach with the height accuracy threshold $232_{TH}$, the height 232 is generally accurate whether the segment 214 includes lots of data or sparse data 134. In some implementations, although less accurate then a technique using point weights, the perception system 200 communicates a height corresponding to a top of a segment 214 classified as ground to the ground height map 230. This approach may be used where less accuracy is tolerated for the ground height map 230.

In some examples, the perception system 200 is configured to generate inferences 234 for missing terrain (e.g., by filling gaps) within the ground height map 230 when segments 214 from the voxel map 210 were not classified as ground (i.e., a ground segment $214_G$) or an obstacle (i.e., an obstacle segment $214_{OB}$). Generally, the perception system 200 uses two main strategies to generate inferences 234, an occlusion-based approach and/or a smoothing-based approach. As the perception system 200 generates the ground height map 230, the perception system 200 identifies discontinuities in the sensor data 134 (e.g., depth sensor data 134). Discontinuities refer to when the sensor data 134 indicates a near object adjacent to a far object. When the perception system 200 encounters a discontinuity, the perception system 200 assumes this near-far contrast occurs due to an occlusion $234_O$ (FIG. 4B) for the sensor system 130 within the environment 10. When the perception system 200 assumes an occlusion $234_O$ occurs, the perception system 200 fills in gaps of the sensor data 134 by mapping these gaps as flat terrain $234_{FT}$. For instance, FIG. 4B depicts the robot 100 traversing stairs with occlusions at risers of the stairs based on the sensor data 134. Based on these occlusions, FIG. 4B illustrates that the occlusions $234_O$ between tread portions of the stairs are filled in by the perception system 200 as flat terrain $234_{FT}$ bridging a back portion of a tread for a first stair to a front portion of a tread for a second stair above the first stair. Here, the bridges are shown as line segments connecting two points that are adjacent in image space, but far apart in the three dimensional world.

In contrast, when the sensor data 134 does not indicate a near-far contrast (i.e., an occlusion), the perception system 200 assumes the missing sensor data 134 is due to poor vision by the sensor system 130 and maps the missing sensor data 134 as smooth terrain $234_{ST}$. In other words, the perception system 200 uses a smoothing technique when sensor data 134 is missing and the sensor data 134 does not indicate a near-far contrast. In some examples, the smoothing technique used by the perception system 200 is an iterative, averaging flood-fill algorithm. Here, this algorithm may be configured to interpolate and/or extrapolate from actual sensor data 134 and data from an occlusion $234_O$. In some implementations, the perception system 200 performs the smoothing technique accounting for negative segment(s) $214_N$, such that the negative segments $214_N$ provide boundaries for inferences 234 by the perception system 200 (i.e., inferences 234 resulting in a perception of smooth terrain $234_{ST}$). In some configurations, since the perception system 200 is concerned with filling gaps, the perception system 200, even though it both interpolates and extrapolates, removes extrapolated portions.

Depending on the inference 234 made by the perception system 200, the perception system 200 either persists (i.e., retains) or removes the inferred terrain (e.g., flat terrain $234_{FT}$ or smooth terrain $234_{ST}$). For instance, the perception system 200 is configured to interpret the sensor data 134 at a particular frequency (e.g., a frequency or some interval of the frequency at which the sensor(s) 132 generates sensor data 134). In other words, the perception system 200 may perform iterative processing with received sensor data 134 at set intervals of time. Referring back to FIG. 4A, when the perception system 200 receives new sensor data 134, the perception system 200 determines whether to persist the inferences 234. When a prior processing iteration by the perception system 200 interpreted sensor data 134 as an occlusion $234_O$ (i.e., resulting in flat terrain $234_{FT}$), a subsequent processing iteration of sensor data 134 by the perception system 200 retains the prior flat terrain inference $234_{FT}$ unless the sensor system 130 actually provides sensor data 134 to the perception system 200 for the occluded area. In contrast, when a prior processing iteration by the perception system 200 inferred missing sensor data 134 as smooth terrain $234_{ST}$, the perception system 200 clears (i.e., removes) the inference 234 during a subsequent processing iteration of sensor data 134. More particularly, the perception system 200 is configured to re-compute these types of inferences 234 (i.e., non-occlusions) every iteration of the perception system 200. Accordingly, whether or not an inference 234 persists is based on the context for the robot 100. For example, because occlusions $234_O$ may be visible in only particular poses for the robot 100, but not in others, if occlusions $234_O$ did not persist, there is a risk that the occlusion $234_O$ is not later perceived. Therefore, the perception system 200 persists occlusions $234_O$. In contrast, smooth terrain $234_{ST}$ does not depend on a state of the robot 100, but rather on the mapped state. In other words, removing smooth terrain $234_{ST}$ does not present any risk to the robot 100 because no additional state information is contained in the smooth terrain $234_{ST}$. Thus, the perception system 200 is able to simply reconstruct the smooth terrain $234_{ST}$ on the following iteration.

In some implementations, during subsequent iterations, the perception system 200 evaluates whether occlusion-based inferences $234_O$ are still adjacent to actual sensor data 134 (e.g., bridge actual points of sensor data 134 together with flat terrain $234_{FT}$). Here, even though the general rule for the perception system 200 is to retain occlusion-based inferences $234_O$, when evaluation of the occlusion-based inferences $234_O$ identifies that the occlusion-based inferences $234_O$ are no longer adjacent to any current sensor data 134, the perception system 200 removes these unattached occlusion-based inferences $234_O$.

During creation of the ground-height map 230, the perception system 200 may be configured to fill in narrow or small pits 236 (FIG. 4B) that occur within the sensor data 134. Generally, a pit 236 refers to a void (e.g., hole or cavity) in the sensor data 134. When these pits 236 occur, it is likely that these pits 236 are related to bad sensor data 134 rather than actual terrain irregularities. In some configurations, the perception system 200 is configured to fill in pits 236 that are smaller than a distal end 124 (e.g., a foot) of the leg 120 of the robot 100. In other words, the perception system 200 may include a pit-filling threshold set to a value less than a ground-engaging surface area of the foot of the robot 100. When the robot 100 is multi-legged and a ground-engaging surface area of the foot differs from leg 120 to leg 120, the pit-filling threshold may be set to the smallest ground-engaging surface area of all the feel of the robot 100. In some examples, the perception system 200 fills pits 236 using a morphological dilate followed by a morphological erode where the perception system 200 uses real values rather instead of Boolean values.

In some implementations, the perception system 200 generates the ground-height map 230 with further processing to widen obstacles O (e.g., increase the size of an obstacle). By widening obstacles O, the ground-height map 230 aids terrain avoidance by for the robot 100 (e.g., for a swing leg 120 of the robot 100 while maneuvering about the environment 10). In other words, by widening obstacles O, the perception system 200 allows the ground-height map 230 to have a buffer between a location of an obstacle O on the map 230 and the actual location of the obstacle O. This buffer allows for components of the robot 100, such as knees, feet, or other joints J of the robot 100, to be further constrained such that there is a margin for movement error before a portion of the robot 100 collides with an actual obstacle O. For instance, a wall within the ground-height map 230 may be widened (e.g., offset) into space adjacent the wall about six centimeters to provide the buffer for object avoidance.

In some examples, the ground-height map 230 includes, for each cell of the map 230, both a ground-height estimate $232_{est}$ and a ground-height accuracy estimate $232_{Acc}$. Here, the perception system 200 generates the ground-height accuracy estimate $232_{Acc}$ to indicate the accuracy of the ground height 232. In some implementations, the ground-height accuracy $232_{Acc}$ accounts for how recently the perception system 200 has perceived the ground from the sensor data 134 and an odometry drift of the robot 100. For instance, when the perception system 200 has not received sensor data 134 visualizing the ground G for a particular cell in about three seconds and the odometry of the robot 100 is drifting about one centimeter per second, the perception system 200 associates (e.g., modifies a preexisting ground height accuracy $232_{Acc}$ or appends the ground height 232 to include) a ground height accuracy $232_{Acc}$ of +/−three centimeters with the ground height 232. This approach may be used to determine what situations the robot's control system 170 may trust the ground height estimations $232_{est}$ (e.g., operate according to a given ground height estimation $232_{est}$).

Referring to FIGS. 5A-5I, in some implementations, the perception system 200 is configured to generate a no step map 240. The no step map 240 generally refers to a map that defines regions where the robot 100 is not allowed to step in order to advise the robot 100 when the robot 100 may step at a particular horizontal location (i.e., location in the X-Y plane). In some examples, much like the body obstacle map 220 and the ground height map 230, the no step map 240 is partitioned into a grid of cells 242, $242_{1-i}$ where each cell 242 represents a particular area in the environment 10 about the robot 100. For instance, each cell 242 is a three centimeter square. For ease of explanation, each cell 242 exists within an X-Y plane within the environment 10. When the perception system 200 generates the no-step map 240, the perception system 200 may generate a Boolean value map, for example as show in FIG. 5A, where the Boolean value map identifies no step regions 244 (e.g., shown as gray cells) and step regions 246 (e.g., shown as white cells). A no step region 244 refers to a region of one or more cells 242 where an obstacle O exists while a step region 246 refers to a region of one or more cells 242 where an obstacle O is not perceived to exist.

In some configurations, such as FIGS. 5B and 5C, the perception system 200 further processes the Boolean value map such that the no step map 240 includes a signed-distance field. Here, the signed-distance field for the no step map 240 includes a distance d to a boundary of an obstacle O (e.g., a distance d to a boundary of the no step region 244) and a vector v (e.g., defining nearest direction to the boundary of the no step region 244) to the boundary of an obstacle O. Although the signed distance field may be combined such that a cell 242 includes both a distance d and a vector v to the boundary of an obstacle O, FIGS. 5B and 5C represent each component separately for ease of explanation (i.e., FIG. 5B shows the distances d while FIG. 5C shows the vectors v). In a signed-distance field, a sign of a value indicates whether a cell 242 is within the boundary of an obstacle O (e.g., the sign of the distance is negative) or outside of the boundary of the obstacle O (e.g., the sign of the distance is positive). In other words, the further a cell 242 is from the boundary, the greater the distance value for the cell 242 (e.g., whether inside the boundary or outside the boundary). In some examples, the no step map 240 represents the distance d to the boundary of the obstacle O for a particular cell 242 as a count of a number of cells 242 between the particular cell 242 and the boundary of the obstacle O. In other examples, the no step map 240 represents the distance d to the boundary of the obstacle O as the actual distance such that the no step map 240 provides greater granularity (e.g., than a cell count) and thus accuracy to objects 14 for the robot 100 to maneuver about the environment 10. For instance, when a cell 242 is on the boundary of the obstacle O, the perception system 200 represents the distance d as zero without a sign. With a distance d to the boundary of an obstacle O and a vector v to the nearest boundary of the obstacle O, the no step map 240 is able to communicate (e.g., to the control system 170 of the robot 100) not only where to step and not to step, but also a potential place to step (e.g., within the step region 246). To illustrate, a normal gait pattern for the robot 100 may indicate that a foot of the robot 100 will be placed in a no step region 244. Because the control system 170 utilizes the no step map 240, the control system 170, in this example, is able to identify that the control system 170 should not place the foot in the no step region 244 as originally planned, but instead place the foot within the step region 246 (e.g., nearest group of cells 242 to the originally planned foot placement). In some examples, by interpreting the vectors v and distances d for a cell 242 within the no step map 240, the control system 170 is able to minimize disruption to the gait pattern of the robot 100 (e.g., help step without slipping during gait adjustments to maintain balance).

When generating the no step map 240, the perception system 200 may identify a no step region 244 and/or step region 246 for several different reasons. Some of the reasons may include a slope within the region, a potential risk of shin collisions within the region, a presence of pits within the region, a presence of no swing shadows within the region, and/or a likelihood of self-collisions for the robot 100 within the region. In some examples, the perception system 200 computes a slope within a region by using two different scale filters (e.g., Sobel filters) on the sensor data 134. With two different scales, a first filter may detect small-scale slopes, while a second filter detects large-scale slopes. The perception system 200 designates an area as a no step region 244 when both the small-scale slope is high (i.e., a first condition) and the small-scale slope is larger than the large-scale slope (i.e., a second condition). For instance, the perception system 200 is configured with a slope threshold such that when a value of the small scale slope satisfies the slope threshold (e.g., is greater than the slope threshold), the perception system 200 designates the small-scale slope as high (i.e., satisfies the first condition). The same slope threshold or another slope threshold may be configured to indicate a threshold difference between a value of the small scale slope value and a value of the large-scale slope. Here, when the difference between the value of the small scale slope value and the value of the large-scale slope satisfies the threshold difference (e.g., exceeds the threshold difference), the perception system 200 identifies the small-scale slope as larger than the large-scale slope (i.e., satisfies the second condition). When both the first condition and the second condition are satisfied for a given region, the perception system 200 designates the region as a no step region 244. In other words, a hill may be navigable by the robot 100 (e.g., because both the small-scale slope and the large-scale slope are large) while an edge of a stair is not navigable (e.g., because the small-scale slope is high and the large-scale slope is less than the small-scale slope). More generally, the perception system 200 is trying to identify areas where the slope is steeper than the surrounding area and also sufficiently steep (e.g., problematically steep for the robot 100 to maintain balance during movement).

Figure 5D:
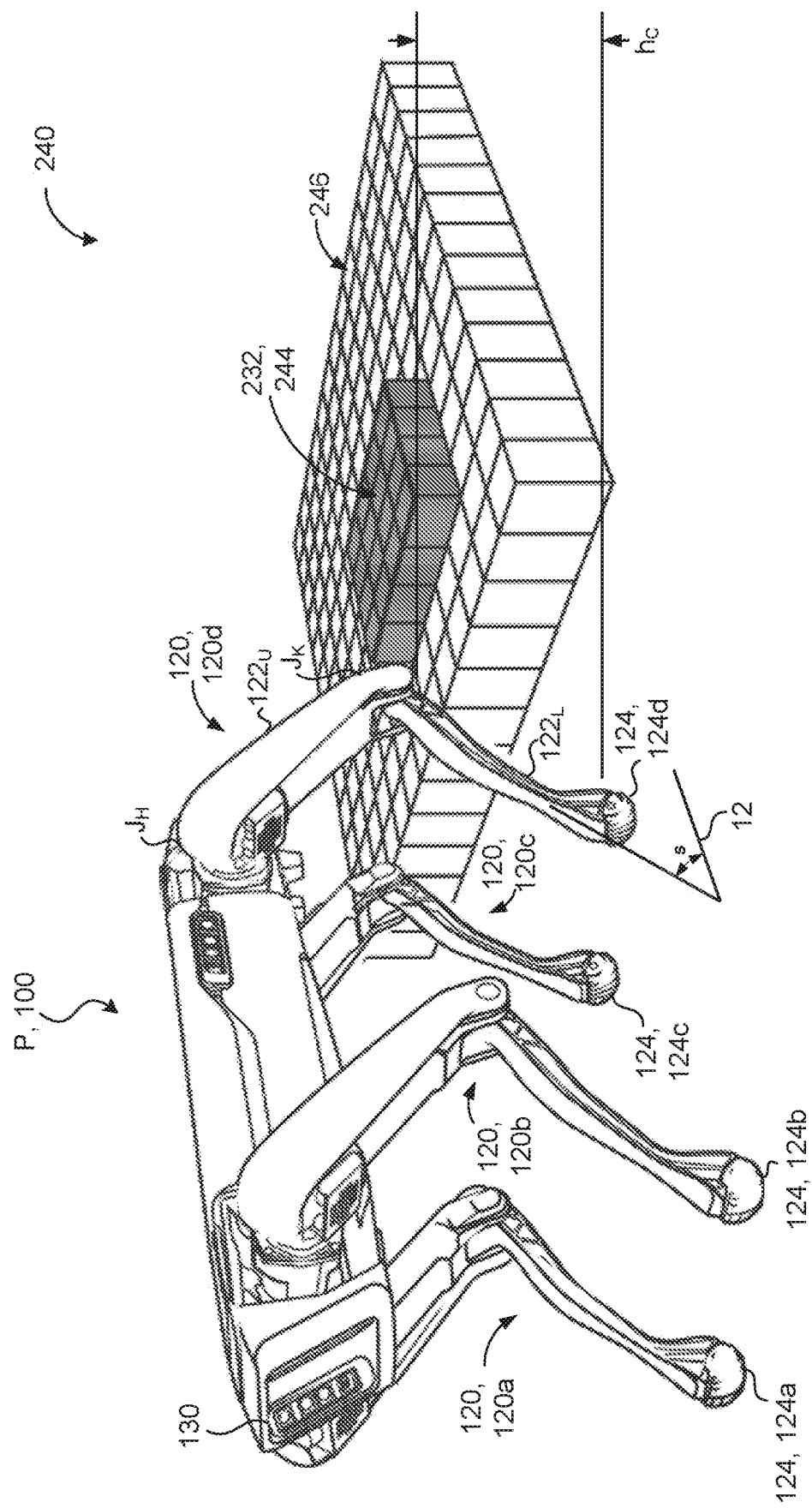
FIG. 5D is a perspective view of an example no step map based on a risk of shin collisions.

Referring to FIG. 5D, as previously mentioned, the perception system 200 may identify a region as a no step region 244 to avoid shin collisions. Generally, based on a structure of a leg 120 of the robot 100, a shin $122_L$ of the leg 120 has a particular slope s with respect to the ground surface 12. In some implementations, one or more legs 120 of the robot 100 are configured such that a joint that connects the leg 120 to the body 110 (i.e., a hip joint $J_H$) is forward of a knee joint $J_K$ in the sagittal plane of the body 110 of the robot 100. Here, the knee joint $J_K$ refers to a joint that connects an upper member 122, $122_U$ of the leg 120 to a lower member 122, $122_L$ (i.e., shin) of the leg 120 that includes the distal end 124. Based on this configuration, when the robot 100 moves faster, the distal end 124 steps further from the hip joint $J_H$ (i.e., further forward in the sagittal plane); resulting in the lower member $122_L$ (i.e., shin) of the leg 120 being more horizontal with respect to the ground surface 12 at faster speeds than slower speeds (or stationary). Here, when the robot 100 executes movement commands for a particular speed (e.g., from the control system 170), the commanded speed requires a minimum slope between the lower member $122_L$ and the ground surface 12 (i.e., a minimum shin slope). Due to this structural anatomy of the robot 100, the perception system 200 determines whether ground heights 232 of the ground-height map 230 would collide with the lower member $122_L$ as the robot 100 moves through the environment 10 at a desired speed. When the perception system 200 determines that a ground height 232 for a cell 242 would likely cause a collision, the perception system 200 designates that cell 242 as a no step region 244. For instance, based on the anatomy of the leg 120 (i.e., known dimensions of the leg 120) and the minimal shin slope s during motion of the robot 100, the perception system 200 determines a collision height $h_C$ for a leg 120 of the robot 100 and compares this collision height $h_C$ to the ground heights 232 of the ground-height map 230. In some configurations, when comparing the collision height $h_C$ and a ground height 232, the perception system 200 identifies any cell with a ground height 232 greater than or equal to the collision height $h_C$ as a no step region 244 for the no step map 240.

In some examples, for each cell 242, the perception system 200 samples nearby or adjacent cells 242 along a direction of the lower member $122_L$. In other words, the perception system 200 identifies cells 242 that would be underneath the lower member $122_L$ based on a cell 242 (referred to here as a footstep cell) where the foot of the robot 100 is located or theoretically to be located (e.g., based on a fixed yaw for the robot 100). With identified cells 242, the perception system 200 determines the collision height $h_C$ as the lowest expected height of the lower member $122_L$ over the course of a stride of the leg 120 (i.e., minimum shin slope s) and identifies any of these cells 242 (i.e., cells that would be under the leg 120) that would interfere with the minimum shin slope s. When any of the cells 242 would cause interference, the perception system 200 identifies the footstep cell as an illegal place to step (i.e., a no step cell/region).

Since the minimum shin slope s may change as the speed of the robot 100 changes, the perception system 200 may adjust the no step map 240 whenever the control system 170 executes or modifies the speed for the robot 100 (e.g., a leg 120 of the robot 100) or at some frequency interval subsequent to a speed input by the control system 170. In some examples, the perception system 200 additionally accounts for a current yaw (i.e., rotation about a z-axis) of the body 110 of the robot 100 and/or the direction of motion for the robot 100 when determining whether a collision will occur for a leg 120 of the robot 100. In other words, a wall to a side of the robot 100 does not pose a risk of collision with the robot 100 as the robot 100 moves parallel to the wall, but the wall would pose a collision risk when the robot 100 moves perpendicular to the wall.

For particular terrain, such as stairs (e.g., shown in FIGS. 5H and 5I), when the perception system 200 combines shin collision avoidance and slope avoidance to generate the no step map 240, the perception system 200 risks being over inclusive when designating no step regions 244 of the no step map 240. To prevent the perception system 200 from being over inclusive and thereby preventing the robot 100 from traversing stairs, in some implementations, the perception system 200 is configured to ensure that there is a step region 246 (e.g., at least a one-cell wide step region 246) on each stair for a detected staircase. In some examples, the perception system 200 forms the step region 246 on each stair by determining a least dangerous no step condition. In some implementations, for stairs, the least dangerous no step condition is shin collisions. In these implementations, the perception system 200 ignores potential shin collisions within the stair area of the ground-height map 230. For instance, the perception system 200 ignores potential shin collisions that fail to satisfy a shin collision threshold. Here, the shin collision threshold demarcates a difference between the shin collision height $h_C$ and the ground height 232 that should indicate high risk of a shin collision (e.g., a wall) and a low risk of a shin collision (e.g., a riser of a stair). To ensure at least the one-cell wide step region 246 per stair, the shin collision threshold may be configured based building standard dimensions for staircases. In some examples, shin collisions are the least dangerous no step collision because shin collision are based on an assumed angle, yet the control system 170 may adjust the angle of the shins by changing the body 110 of the robot 100 relative to the legs 120 of the robot 100.

Optionally, the perception system 200 is configured to designate areas of sensor data 134 that indicate a narrow pit 236 or trench as no step regions 244 when generating the no step map 240. Generally speaking, the perception system 200 should remove or fill a narrow pit 236 when generating the ground height map 230. In some examples, since the perception system 200 generates the no step map 240 based on the ground-height map 230, a residual narrow pit 236 may prove problematic for the robot 100. In these examples, the perception system 200 avoids narrow pits 236 perceived when generating the no step map 240 by designating narrow pits 236 as no step regions 244. Although the perception system 200 is configured fill narrow pits 236 during generation of the ground-height map 230 (i.e., removing these pits 236 by processing techniques), by designating narrow pits 236 as no step regions 244, the no step map 240 ensures that potential bad data areas do not cause issues for the robot 100 when the robot 100 is moving about the environment 10.

Figure 5E:
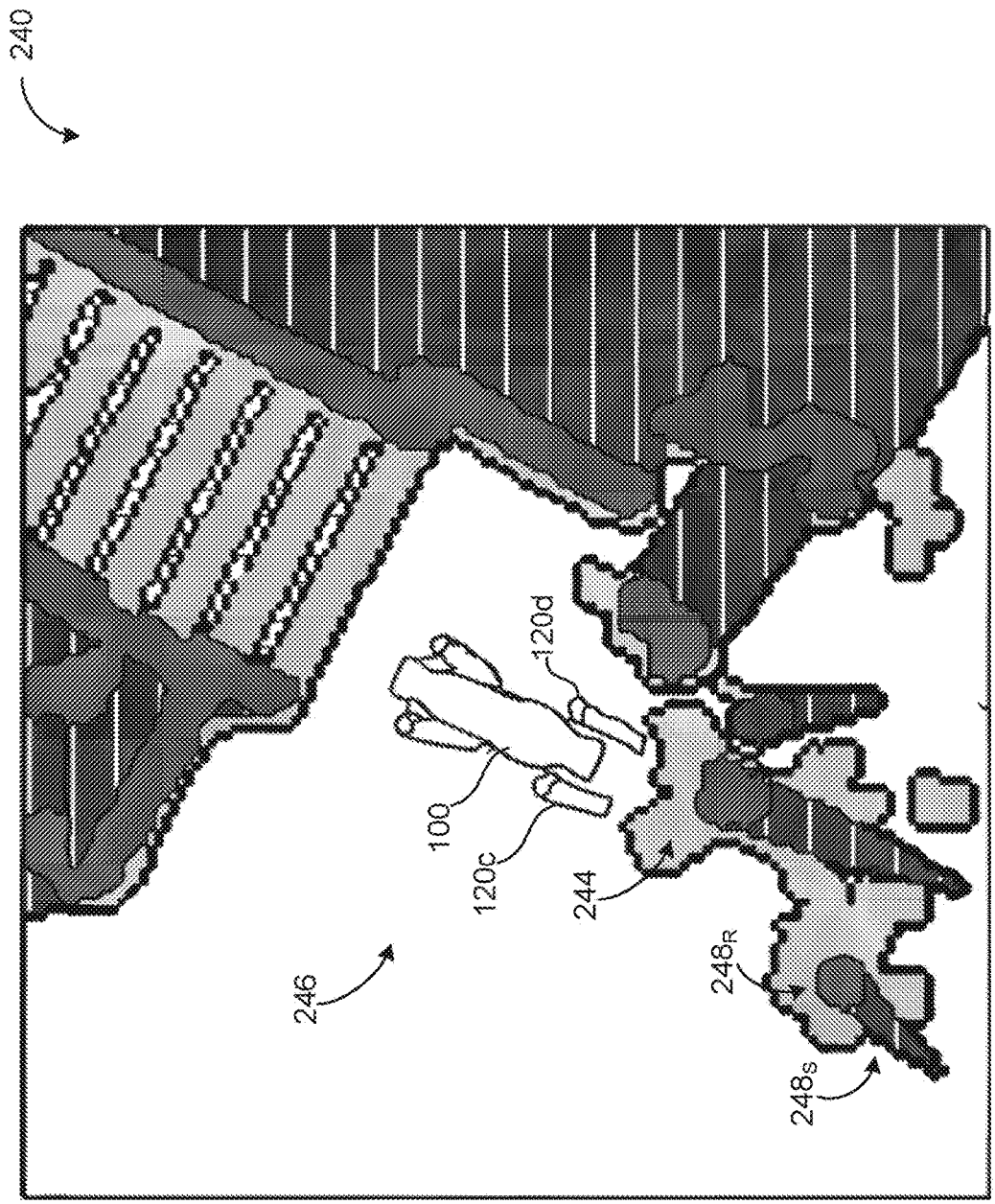
FIG. 5E is a schematic view of an example no step map generated by the robot of FIG. 1A.

In some examples, such as FIG. 5E, the perception system 200 includes no swing regions $248_R$ and no swing shadows $248_S$ within the no step map 240. A no swing region $248_R$ refers an area with an obstacle that the robot 100 is unable to travel through (i.e., a body obstacle). For example, within the environment 10 there is an object 14 (e.g., a log—though not shown) on the ground surface 12, but the robot 100 cannot transfer one or more legs 120 over and/or around the object (e.g., lift its leg 120 high enough to traverse the object 14). Even though there is flat ground on the other side of the object 14, there is no way for the robot 100 to step to the other side based on a current location of the robot 100. Here, the perception system 200 identifies the object 14 as a no swing region $248_R$ and the other side of the object 14 as a no swing shadow $248_S$ because the robot 100 is unable to enter the area on the other side of object 14. In other words, a no swing shadow $248_S$ designates an area that the robot 100 cannot physically enter based on a current position and/or rotation (e.g., yaw) due to an obstacle (i.e., an area not accessible to the robot 100 based on a current pose P of the robot 100, but accessible to the robot 100 in a different pose P). For instance, FIG. 5E indicates that areas adjacent the rear legs 120c-d of the robot 100 include no swing regions $248_R$ and no swing shadows $248_S$ because the robot 100 would have to move one leg 120 through another leg 120. Here, the colored patterns of FIG. 5E indicate the following: step regions 246 are white or cross-hatched white (e.g., on the stairs); no step regions 244 (i.e., regions that are no-step for reasons other than being no swing or no swing shadows) are light gray; no swing regions $248_R$ are dark gray; and no swing shadows $248_S$ are black with diagonal white lines. In some implementations, the perception system 200 forms a no swing shadow $248_S$ using a flood-fill algorithm emanating at a convex hull of the distal ends 124 of the legs 120 of the robot 100.

Figure 5F:
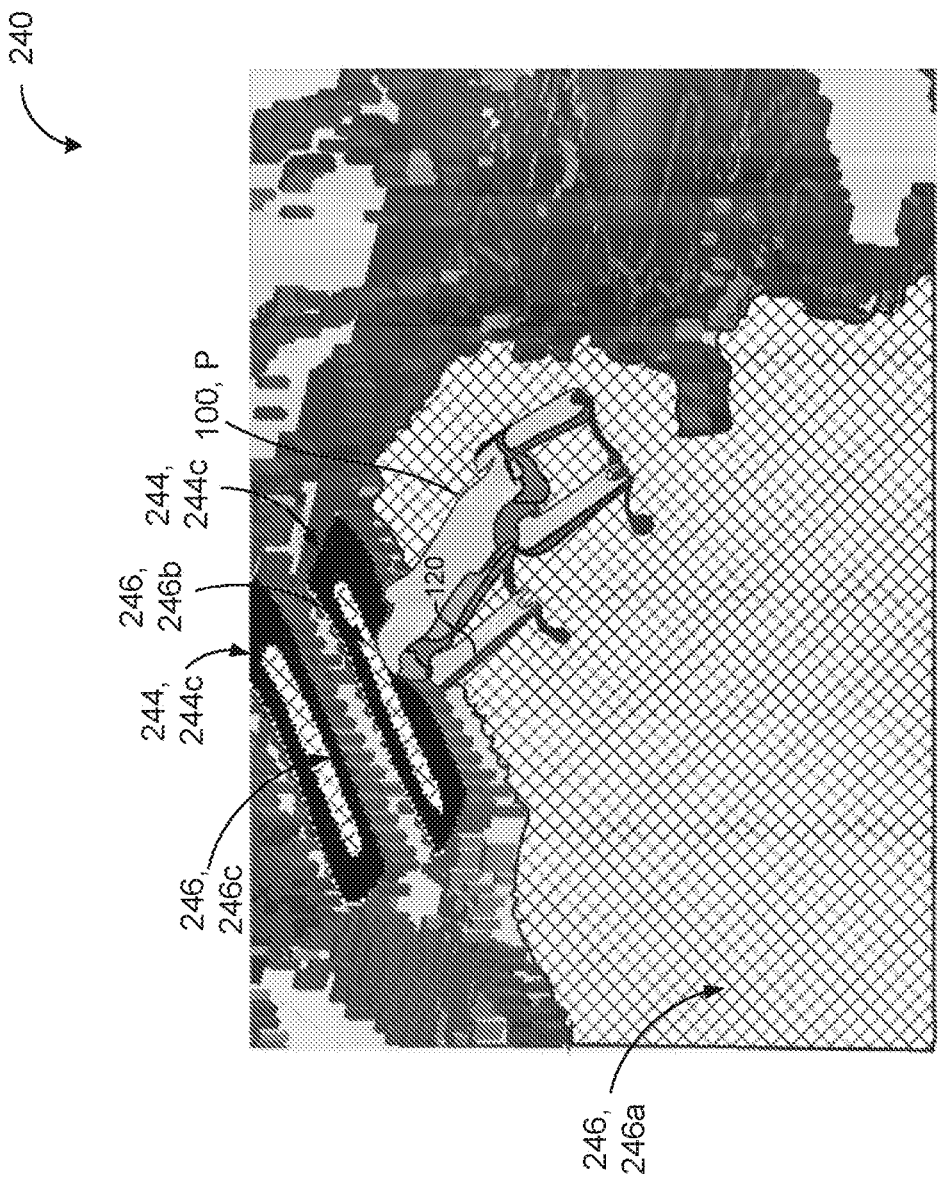
FIGS. 5F and 5G are perspective views of example no step maps based on one or more feet of the robot of FIG. 1A.
Figure 5G:
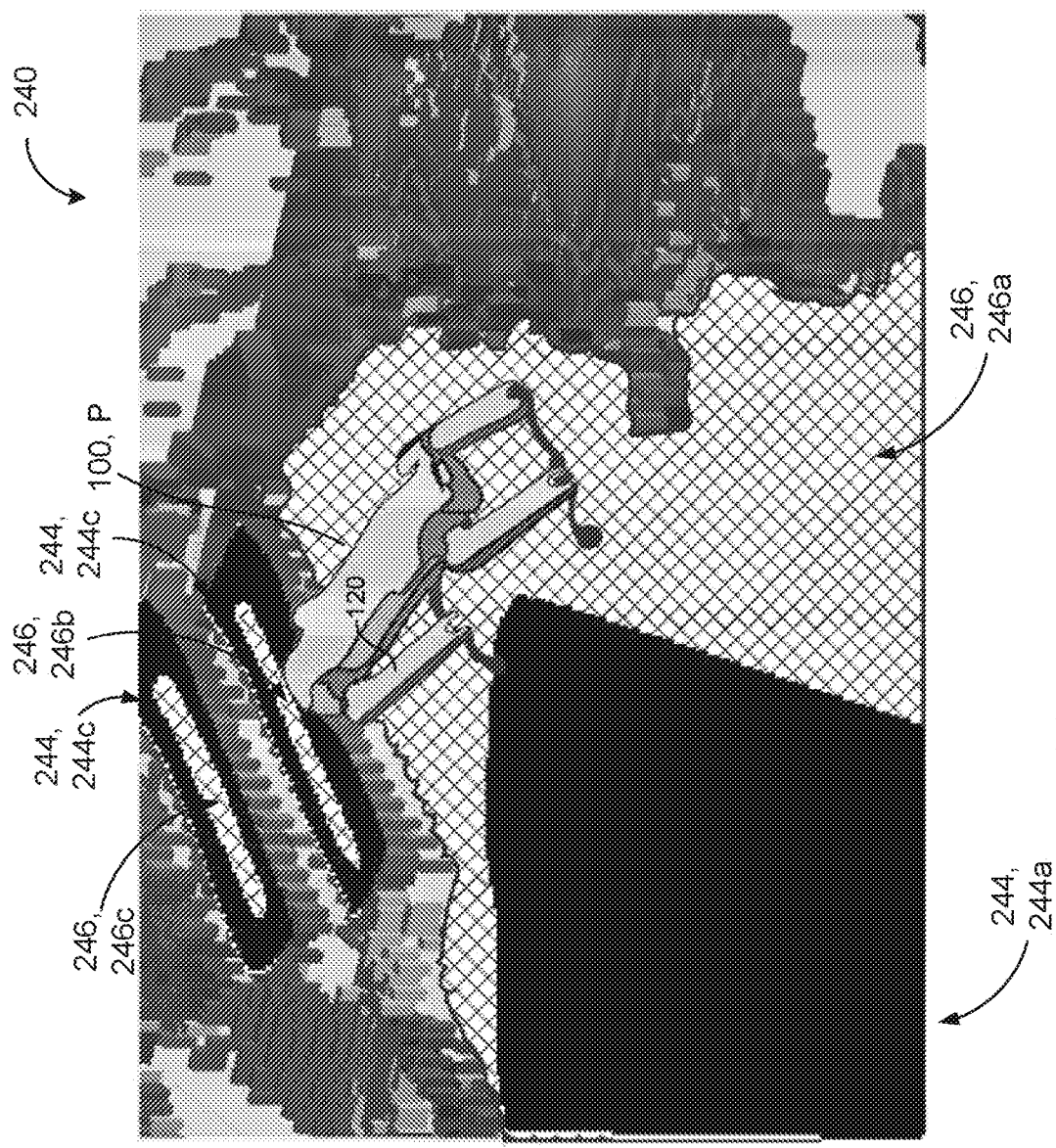

Referring to FIGS. 5F and 5G, additionally or alternatively, the perception system 200 generates a no step map 240 for one or more individual legs 120 of the robot 100 at the current step position of the robot 100. Normally, the no step map 240 is generically valid for all legs 120 of the robot 100. For instance, FIG. 5F depicts a no step map 240 for all legs 120 with a cross-hatched white area illustrating three step regions 246, 246a-c. More particularly, a first step region 246, 246a indicates that the legs 120 may step in a large area on the floor before the stairs. Yet there may be some configurations where the control system 170 is concerned about collisions between legs 120 (also referred to as self-collisions). Comparing FIG. 5F to FIG. 5G, FIG. 5G illustrates a no step map 240 specifically for the front-right leg 120 of the robot 100. In this particular no step map 240, the perception system 200 generates no step regions 244 (shown in black) to additionally identify an area where, if the front-right leg 120 of the robot 100 stepped in that area, the movement of the front-right leg 120 to this area would cause a collision between legs 120. For instance, the perception system 200 generates a first no step region 244, 244a near the left-front leg 120 and left of the left-front leg 120. In some implementations, the perception system 200 generates these no step regions 244 using a similar technique to the no swing shadows $248_S$. In some configurations, the perception system 200 generates these no step regions 244 using a pre-defined shape that is quicker to compute than a technique similar to the no swing shadows $248_S$.

Figure 5I:
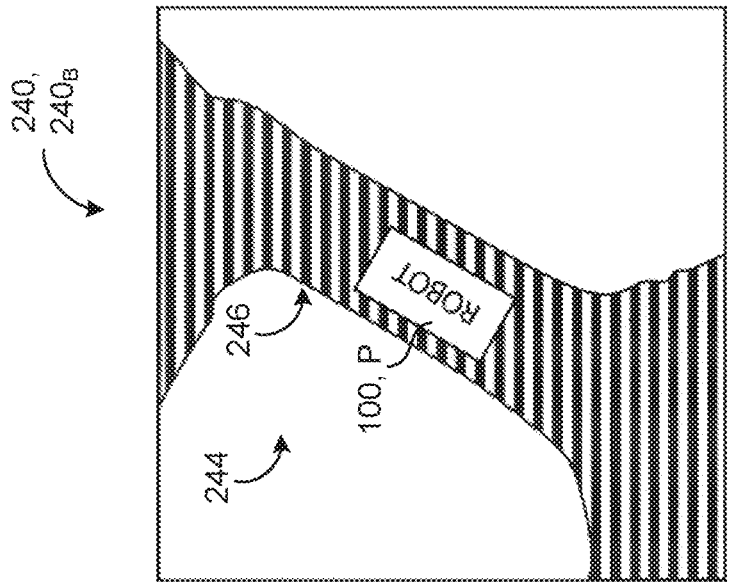
FIGS. 5H and 5I are schematic views of examples of no step maps generated by the robot of FIG. 1A.
Figure 5H:
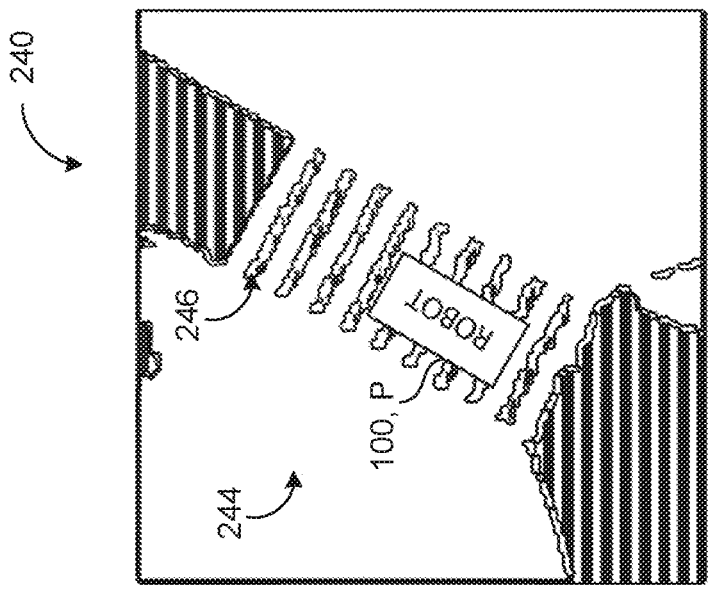

Referring to FIGS. 5H and 5I, in some implementations, the perception system 200 further processes the no step map 240 to indicate a distinction between locations where the robot 100 may move and locations where the robot 100 cannot move. More particularly, the no step map 240 indicates no step regions 244 where the robot 100 may have to step over in order to move to a step region 246 of the map 240. For example, FIG. 5H depicts the robot 100 traversing a staircase with portions of each stair having no step regions 244 (e.g., shown as white area) such a leg 120 of the robot 100 steps over these no step regions 244 to place a distal end 124 of the leg 120 into a step region 246 (e.g., shown as black and white diagonal patterned areas). Even though these no step regions 244 may be used by the control system 170 for some functionality (e.g., movement planning), other aspects of the robot 100 and/or control system 170 may not need such granularity. In other words, one or more controllers of the control system 170 may prefer to know more generally whether a section of the map 240 is navigable by the robot 100 or not. Therefore, in some examples, the perception system 200 generates a big-regions no step map 240, $240_B$ that indicates whether an area of the map 240 is navigable even though some portions of the area may have no step regions 244. To generate the big-regions no step map $240_B$, the perception system 200 first performs morphological erosion on the no step map 240 followed subsequently by morphological dilation. Generally speaking, the erosion technique strips away boundaries of a region (e.g., removes a small no step region 244) and then the dilation technique expands a more dominant step region 246; resulting in a more general distinction of whether an area is navigable for the robot 100 (e.g., as shown in FIG. 5I). In other words, the techniques seek to remove small regions without altering a large region. In some configurations, the robot 100 uses the big-regions no step map $240_B$ in conjunction with other maps 210, 220, 230 to convey different information to parts of the control system 170.

Figure 6:
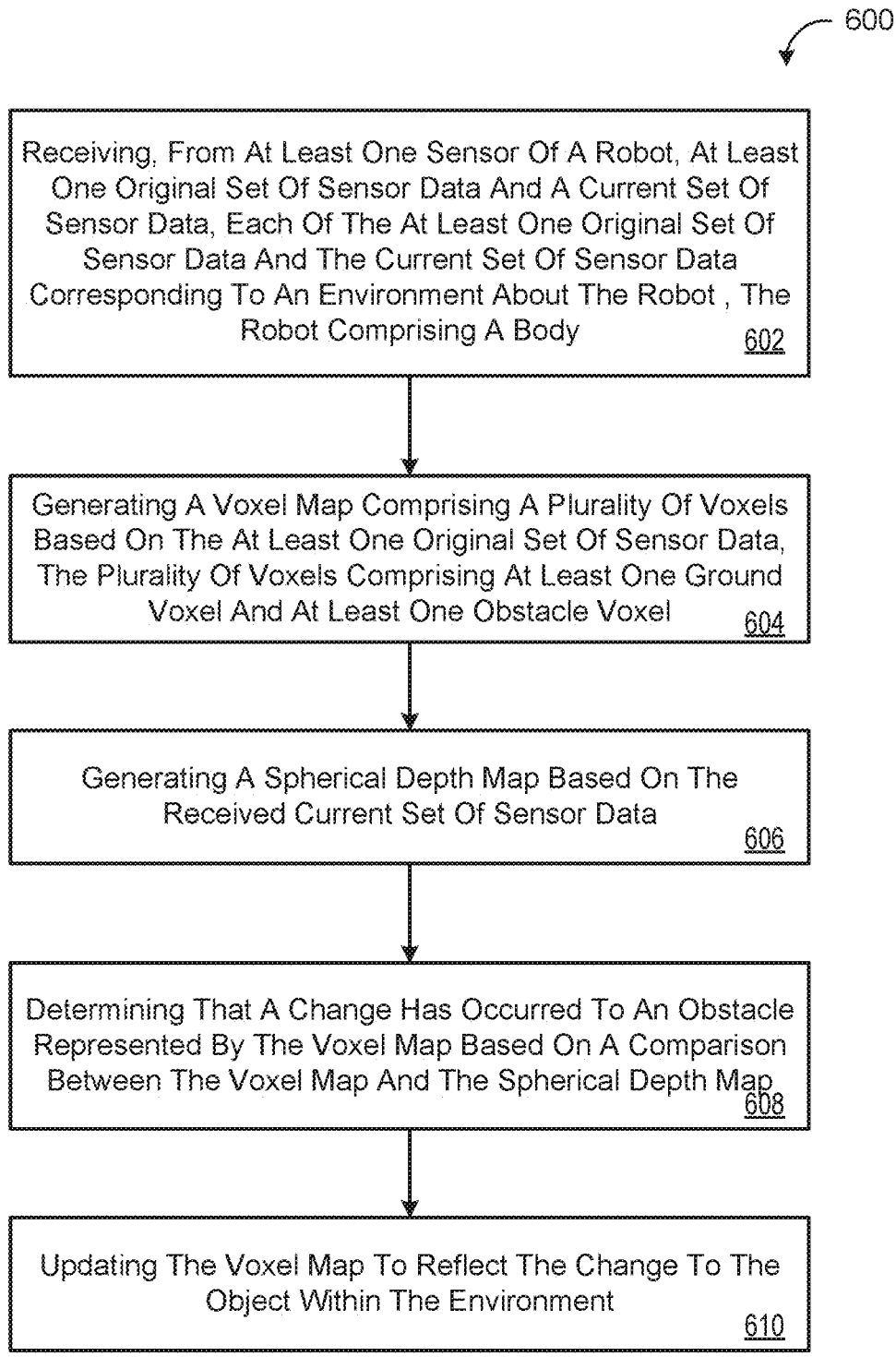
FIGS. 6-9 are example arrangements of operations for a robot to generate a maps to traverse the environment about the robot.

FIG. 6 is an example of a method 600 of generating the voxel map 210. At operation 602, the method 600 receives at least one original set of sensor data 134 and a current set of sensor data 134. Each of the at least one original set of sensor data 134 and the current set of sensor data 134 corresponds to an environment 10 about the robot 100 from at least one sensor 132. Here, the robot 100 includes a body 110 and legs 120. At operation 604, the method 600 includes generating a voxel map 210 including a plurality of voxels 212 based on the at least one original set of sensor data 134. The plurality of voxels 212 includes at least one ground voxel 212 and at least one obstacle voxel 212. At operation 606, the method 600 generates a spherical depth map based on the current set of sensor data 134. At operation 608, the method 600 includes determining that a change has occurred to an obstacle represented by the voxel map 210 based on a comparison between the voxel map 210 and the spherical depth map. At operation 610, the method 600 includes updating the voxel map 210 to reflect the change to the obstacle in the environment 10.

Figure 7:
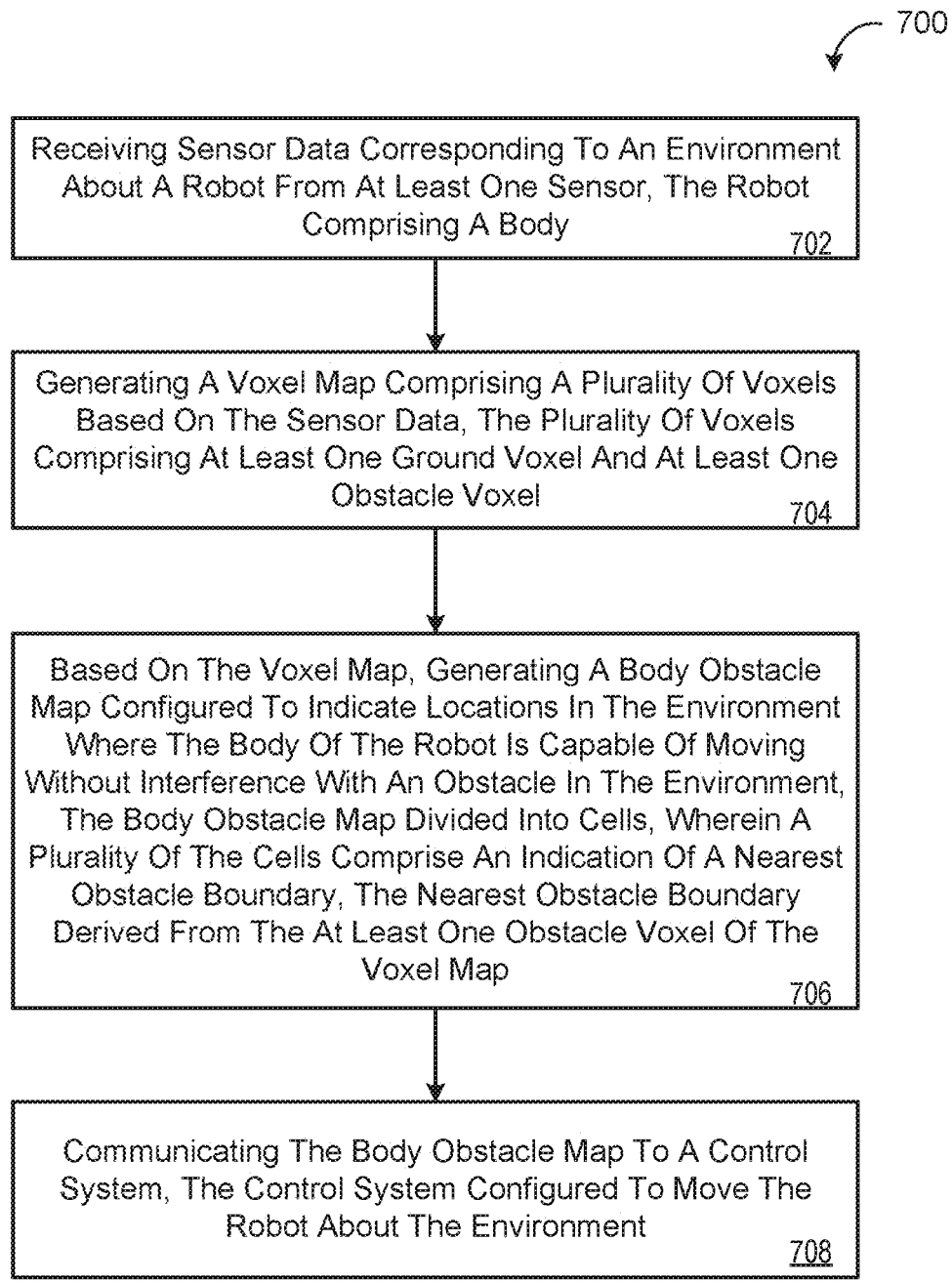

FIG. 7 is an example of a method 700 of generating the body obstacle map 220. At operation 702, the method 700 receives sensor data 134 corresponding to an environment 10 about the robot 100 from at least one sensor 132. Here, the robot 100 includes a body 110 and legs 120. At operation 704, the method 700 generates a voxel map 210 including a plurality of voxels 212 based on the sensor data 134 where the plurality of voxels 212 includes at least one ground voxel $212_G$ and at least one obstacle voxel $212_{OB}$. At operation 706, based on the voxel map 210, the method 700 generates a body obstacle map 220 configured to indicate locations in the environment 10 where the body 110 of the robot 100 is capable of moving without interference with an obstacle in the environment 10. The body obstacle map 220 is divided into cells 222 where a plurality of the cells 222 include an indication of a nearest obstacle O. Here, the nearest obstacle O is derived from at least one obstacle O of the voxel map 210. At operation 708, the method 700 communicates the body obstacle map 220 to a control system 170 of the robot 100. The control system 170 is configured to move the robot 100 about the environment 10.

Figure 8:
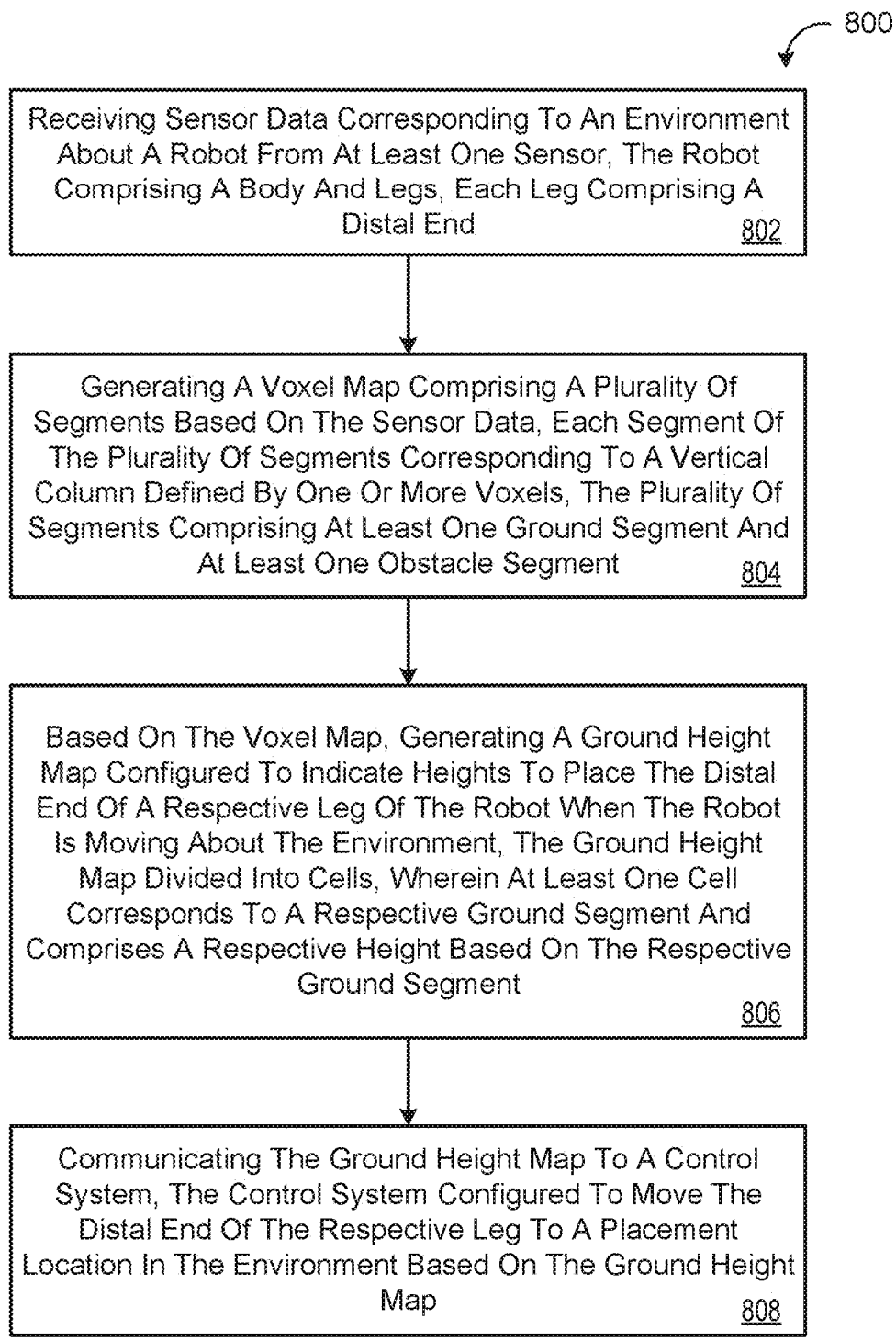

FIG. 8 is an example of a method 800 of generating the ground height map 230. At operation 802, the method 800 receives sensor data 134 corresponding to an environment 10 about the robot 100 from at least one sensor 132. Here, the robot 100 includes a body 110 and legs 120 where each leg 120 includes a distal end 124. At operation 804, the method 800 generates a voxel map 210 including a plurality of segments 214 based on the sensor data 134 where the plurality of segments 214 includes at least one ground segment $214_G$ and at least one obstacle segment $214_{OB}$. Each segment 214 of the plurality of segments 214 corresponds to a vertical column defined by one or more voxels 212. At operation 806, based on the voxel map 210, the method 800 generates a ground height map 230 configured to indicate heights to place the distal end 124 of a respective leg 120 of the robot 100 when the robot 100 is moving about the environment 10. Here, the ground height map 230 is divided into cells where at least one cell corresponds to a respective ground segment $214_G$ and includes a respective height 232 based on the respective ground segment $214_G$. At operation 808, the method 800 communicates the ground height map 230 to a control system 170 of the robot 100 where in the control system 170 is configured to move the distal end 124 of the respective leg 120 to a placement location in the environment 10 based on the ground height map 230.

Figure 9:
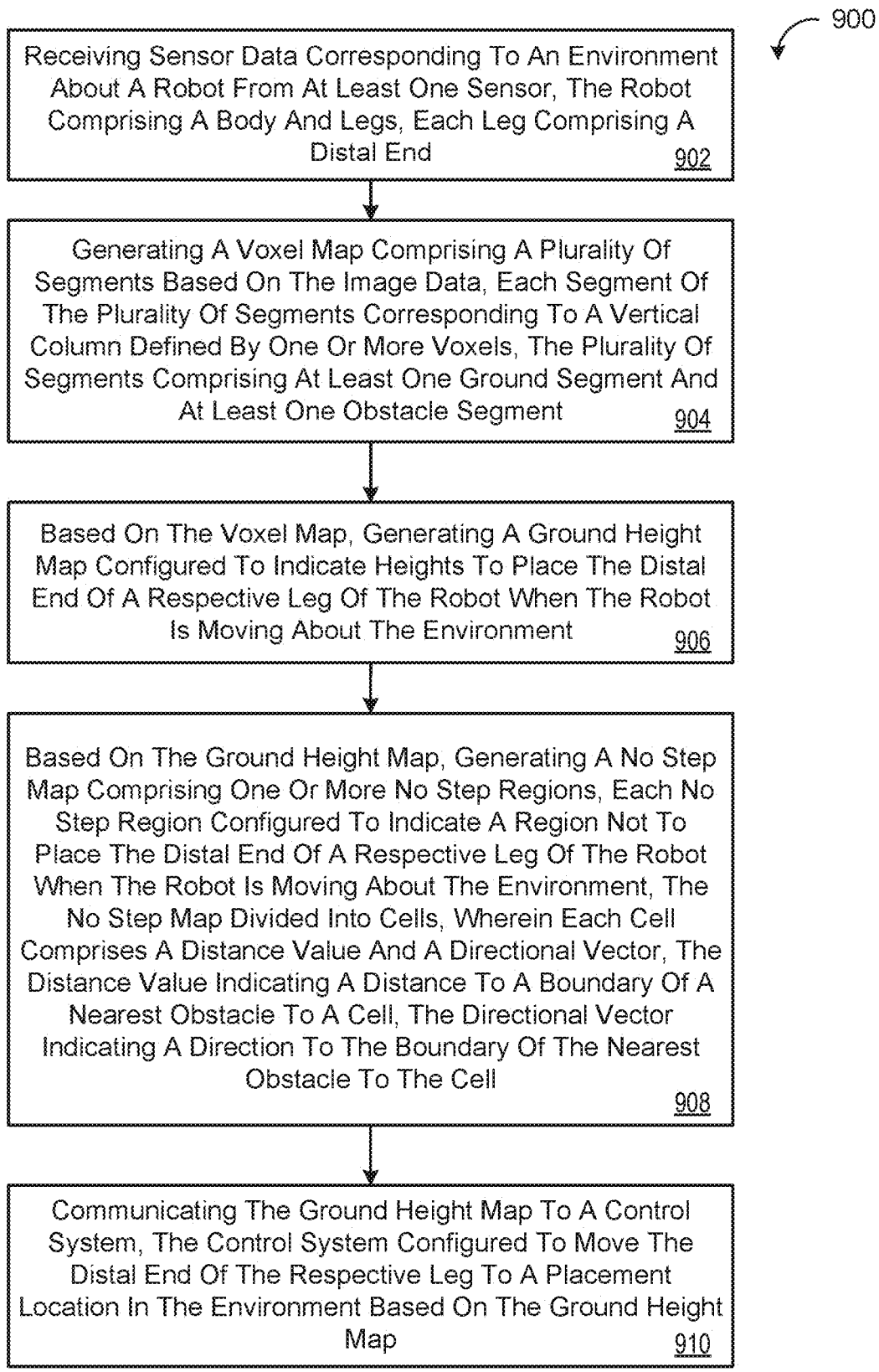

FIG. 9 is an example of a method 900 of generating the no step map 240. At operation 902, the method 900 receives sensor data 134 corresponding to an environment 10 about the robot 100 from at least one sensor 132. The robot including a body 110 and legs 120 where each leg 120 includes a distal end 124. At operation 904, the method 900 generates a voxel map 210 including a plurality of segments 214 based on the sensor data 134 where the plurality of segments 214 includes at least one ground segment $214_G$ and at least one obstacle segment $214_{OB}$. Each segment 214 of the plurality of segments 214 corresponds to a vertical column defined by one or more voxels 212. At operation 906, based on the voxel map 210, the method 900 generates a ground height map 230 configured to indicate heights to place the distal end 124 of a respective leg 120 of the robot 100 when the robot 100 is moving about the environment 10. At operation 908, based on the ground height map 230, the method 900 generates a no step map 240 including one or more no step regions 244. Each no step region 244 configured to indicate a region not to place the distal end 124 of a respective leg 120 of the robot 100 when the robot 100 is moving about the environment 10. Here, the no step map is divided into cells 242 where each cell 242 includes a distance value and a directional vector v. The distance value indicating a distance to a boundary of a nearest obstacle to a cell 242 and the directional vector v indicating a direction to the boundary of the nearest obstacle to the cell 242. At operation 910, the method 900 communicates the no step map 240 to a control system 170 where the control system 170 is configured to move the distal end 124 of the respective leg 120 to a placement location in the environment 10 based on the no step map 240.

Figure 10:
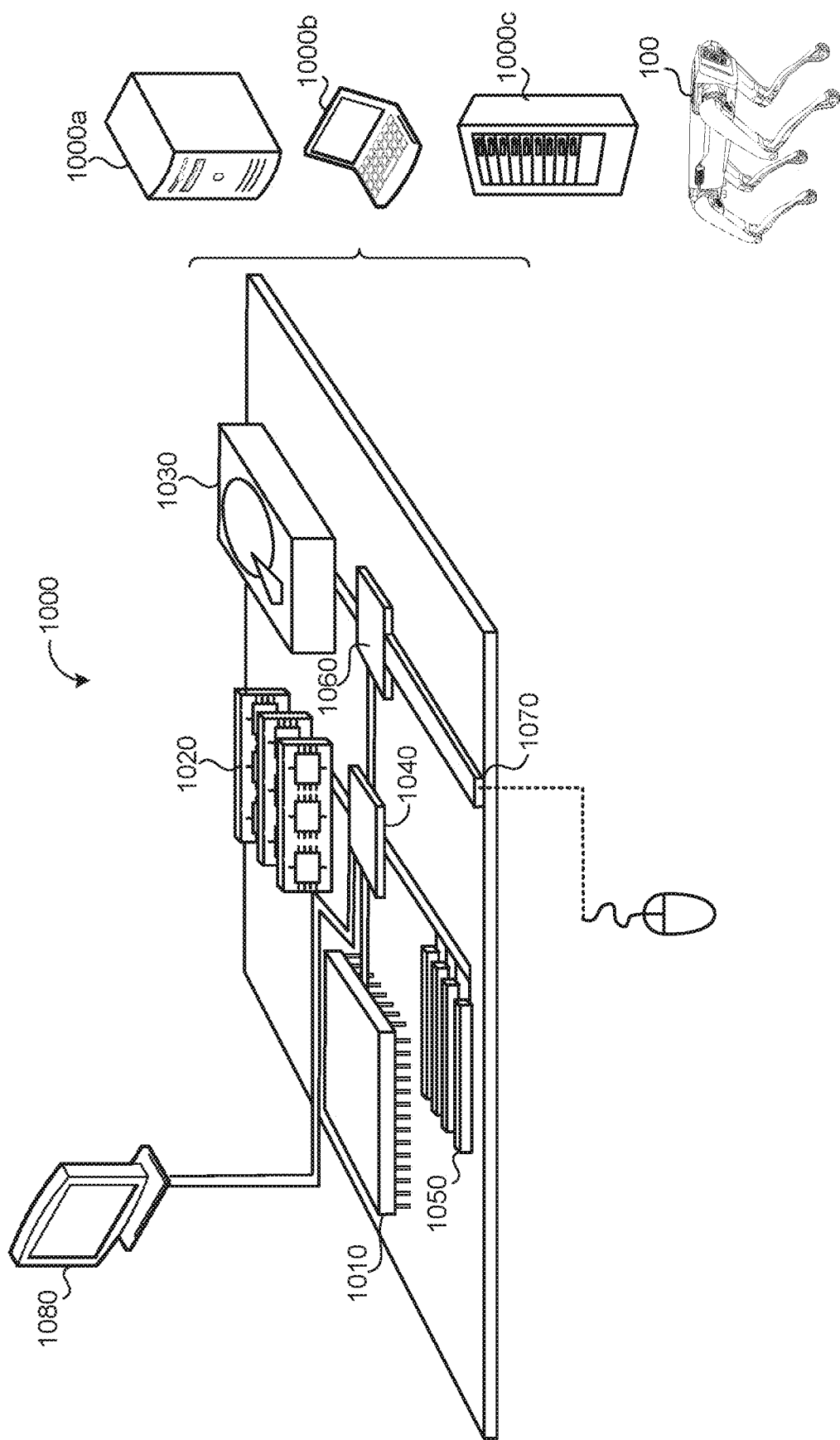
FIG. 10 is a schematic view of an example computing device that may be used to implement the systems and methods described herein.

FIG. 10 is schematic view of an example computing device 1000 that may be used to implement the systems (e.g., the sensor system 130, the control system 170, the perception system 200, etc.) and methods (e.g., methods 600, 700, 800, 900) described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010 (e.g., data processing hardware 142, 162), memory 1020 (e.g., memory hardware 144, 164), a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000*a* or multiple times in a group of such servers 1000*a*, as a laptop computer 1000*b*, as part of a rack server system 500*c*, or as part of the robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure.

What is claimed is:

1. A method comprising:
   obtaining, at data processing hardware, a voxel map generated based on a first set of sensor data, wherein the voxel map indicates a height associated with a particular location;
   obtaining, at the data processing hardware, a depth map generated based on a second set of sensor data, wherein the voxel map represents the first set of sensor data in a first format and the depth map represents the second set of sensor data in a second format that is different from the first format, wherein the depth map indicates a range of heights associated with the particular location;
   performing, by the data processing hardware, a comparison of the height indicated by the voxel map to the range of heights indicated by the depth map based on the first format and the second format;
   identifying, by the data processing hardware, a modification of an object of the voxel map based on the comparison of the height indicated by the voxel map to the range of heights indicated by the depth map;
   updating, by the data processing hardware, the voxel map based on the modification of the object of the voxel map to obtain an updated voxel map; and
   instructing, by the data processing hardware, navigation by a robot according to the updated voxel map.

2. The method of claim 1, wherein the data processing hardware comprises data processing hardware of the robot.

3. The method of claim 1, further comprising obtaining at least one of the first set of sensor data or the second set of sensor data from at least one sensor.

4. The method of claim 1, wherein the first set of sensor data is an original set of sensor data and the second set of sensor data is a current set of sensor data.

5. The method of claim 1, wherein the first set of sensor data is received by the data processing hardware prior to the data processing hardware receiving the second set of sensor data.

6. The method of claim 1, wherein the comparison of the height indicated by the voxel map to the range of heights indicated by the depth map comprises a comparison of one or more columns of the voxel map to one or more columns of the depth map.

7. The method of claim 1, wherein the depth map comprises a spherical representation of an environment of the robot.

8. The method of claim 1, wherein the voxel map comprises a representation of an environment of the robot as a plurality of voxels.

9. The method of claim 1, wherein obtaining the voxel map comprises generating the voxel map, and wherein obtaining the depth map comprises generating the depth map.

10. The method of claim 1, wherein instructing navigation by the robot according to the updated voxel map comprises:
identifying one or more locations for placement of a foot of the robot based on the updated voxel map; and
instructing movement by the robot according to the one or more locations.

11. The method of claim 1, wherein the robot is a legged robot, and wherein the updated voxel map indicates one or more objects that may interfere with movement of the legged robot.

12. The method of claim 1, wherein updating the voxel map based on the modification of the object of the voxel map comprises removing, from the voxel map, one or more voxels corresponding to the object.

13. The method of claim 1, wherein the depth map comprises a representation of the second set of sensor data, the representation comprising one or more structures defined by two or more points of the second set of sensor data.

14. The method of claim 1, wherein the voxel map comprises a three-dimensional grid.

15. The method of claim 1, wherein the robot is a legged robot, and wherein the updated voxel map indicates one or more objects that may interfere with movement of the legged robot.

16. The method of claim 1, further comprising:
identifying one or more first voxels based on identifying the modification of the object of the voxel map; and
identifying, using one or more heuristics, one or more second voxels associated with the object,
wherein updating the voxel map comprises:
removing the one or more first voxels and the one or more second voxels from voxel map.

17. Non-transitory computer-readable media including computer-executable instructions that, when executed by data processing hardware of a computing system, cause the computing system to:
obtain a voxel map generated based on a first set of sensor data, wherein the voxel map indicates a height associated with a particular location;
obtain a depth map generated based on a second set of sensor data, wherein the voxel map represents the first set of sensor data in a first format and the depth map represents the second set of sensor data in a second format that is different from the first format, wherein the depth map indicates a range of heights associated with the particular location;
perform a comparison of the height indicated by the voxel map to the range of heights indicated by the depth map based on the first format and the second format;
identify a modification of an object of the voxel map based on the comparison of the height indicated by the voxel map to the range of heights indicated by the depth map;
update the voxel map based on the modification of the object of the voxel map to obtain an updated voxel map; and
instruct navigation by a robot according to the updated voxel map.

18. The non-transitory computer-readable media of claim 17, wherein the computing system comprises a computing system of the robot.

19. The non-transitory computer-readable media of claim 17, wherein execution of the computer-executable instructions by the data processing hardware of the computing system, further causes the computing system to obtain at least one of the first set of sensor data or the second set of sensor data from at least one sensor.

20. The non-transitory computer-readable media of claim 17, wherein the first set of sensor data is an original set of sensor data and the second set of sensor data is a current set of sensor data.

21. A computing system comprising:
memory; and
one or more processing devices coupled to the memory and configured to:
obtain a voxel map generated based on a first set of sensor data, wherein the voxel map indicates a height associated with a particular location;
obtain a depth map generated based on a second set of sensor data, wherein the voxel map represents the first set of sensor data in a first format and the depth map represents the second set of sensor data in a second format that is different from the first format, wherein the depth map indicates a range of heights associated with the particular location;
perform a comparison of the height indicated by the voxel map to the range of heights indicated by the depth map based on the first format and the second format;
identify a modification of an object of the voxel map based on the comparison of the height indicated by the voxel map to the range of heights indicated by the depth map;
update the voxel map based on the modification of the object of the voxel map to obtain an updated voxel map; and
instruct navigation by a robot according to the updated voxel map.

22. The computing system of claim 21, wherein the computing system comprises a computing system of the robot.

* * * * *